US008832307B2

(12) United States Patent
Furutono et al.

(10) Patent No.: US 8,832,307 B2
(45) Date of Patent: Sep. 9, 2014

(54) TELEPHONY SYSTEM, CONNECTION CONTROL METHOD, CONNECTION CONTROL DEVICE AND RECORDING MEDIUM

(75) Inventors: Tomoyuki Furutono, Fukuoka (JP); Junji Tagane, Fukuoka (JP); Akio Koga, Fukuoka (JP); Ryuji Oda, Fukuoka (JP); Masahiro Tanaka, Fukuoka (JP); Kaori Chigusa, Fukuoka (JP); Minoru Nishida, Fukuoka (JP); Norimichi Hiroshige, Fukuoka (JP); Ryuji Fukuhara, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 1851 days.

(21) Appl. No.: 11/839,246

(22) Filed: Aug. 15, 2007

(65) Prior Publication Data
US 2008/0043989 A1 Feb. 21, 2008

(30) Foreign Application Priority Data
Aug. 17, 2006 (JP) ................................ 2006-222670

(51) Int. Cl.
*G06F 15/16* (2006.01)
*H04M 3/36* (2006.01)
*H04M 3/42* (2006.01)
*H04M 3/523* (2006.01)

(52) U.S. Cl.
CPC .......... *H04M 3/367* (2013.01); *H04M 3/42195* (2013.01); *H04M 3/5238* (2013.01)
USPC ... 709/236; 379/249; 379/265.1; 379/266.01; 379/266.04; 379/266.06

(58) Field of Classification Search
USPC ................ 709/236; 379/249, 265.01, 266.01, 379/266.04, 266.06
See application file for complete search history.

(56) References Cited

U.S. PATENT DOCUMENTS

| | | | | |
|---|---|---|---|---|
| 5,987,117 A | * | 11/1999 | McNeil et al. | 379/265.1 |
| 6,044,146 A | * | 3/2000 | Gisby et al. | 379/266.02 |
| 6,122,358 A | | 9/2000 | Shoji et al. | |
| 6,144,636 A | * | 11/2000 | Aimoto et al. | 370/229 |
| 7,542,561 B1 | * | 6/2009 | Jabbour et al. | 379/265.01 |
| 7,746,999 B2 | * | 6/2010 | Williams et al. | 379/266.01 |
| 2003/0112802 A1 | * | 6/2003 | Ono et al. | 370/389 |

FOREIGN PATENT DOCUMENTS

| | | |
|---|---|---|
| JP | 64-089646 | 4/1989 |
| JP | 3-96048 | 4/1991 |
| JP | 09-130855 | 5/1997 |
| JP | 10-093708 | 4/1998 |

(Continued)

OTHER PUBLICATIONS

Japanese Office Action mailed Feb. 1, 2011, from the corresponding Japanese Application.

*Primary Examiner* — Andrew Georgandellis
(74) *Attorney, Agent, or Firm* — Katten Muchin Rosenman LLP

(57) ABSTRACT

When a connection control device determines that the connection control device is in a congested state, based on whether a usage of at least one of hardware resources necessary for call processing to establish a call connection is equal to or more than a predetermined threshold value, the CPU of the connection control device forcefully disconnects an established call connection after a connection available time elapses, and, when an INVITE message is transmitted from a terminal device, the CPU of the connection control device receives the INVITE message, calculates the wait time, creates and transmits a response message stating the wait time, and stores the message as a reserved call on a reservation list.

34 Claims, 26 Drawing Sheets

(56) References Cited

FOREIGN PATENT DOCUMENTS

| | | |
|---|---|---|
| JP | 10-93717 | 4/1998 |
| JP | 2000-270100 | 9/2000 |
| JP | 2002-232563 | 8/2002 |
| JP | 2005-328223 | 11/2005 |

* cited by examiner

FIG. 7

(a) INVITE sip:UserJ@east.net SIP/2.0

(b) Via:SIP/2.0/UDP west.net:5060;branch=z9hG4bK776as3
Max-Forwards:70
From:Ken<sip:UserD@west.net>;tag=r18f061962
To:Maki<sip:UserJ@east.net>
Call-ID:30017891@west.net
CSeq:1 INVITE
Contact:<sip:UserD@10.11.12.13>
Content-type:application/sdp
Content-Length:138

(c) v=0
o=UserD 2890842807 2890842807 IN IP4 west.net
s=Voice Session
c=IN IP4 10.11.12.13
t=0 0
m=audio 50000 RTP/AVP 0
a=rtpmap:0 PCMU/8000

FIG. 9

(a) SIP/2.0 503 Service Unavailable
Via:SIP/2.0/UDP 192.168.2.130
From:"UserQ"<sip:UserQ@west.net>;tag=t1234aa
To:"UserR"<sip:UserR@east.net>
Call-ID:973750786@west.net
CSeq:1 INVITE
(b) Call-After:56
Contact:<sip:UserQ@192.168.2.130:5060>
Content-Length:0

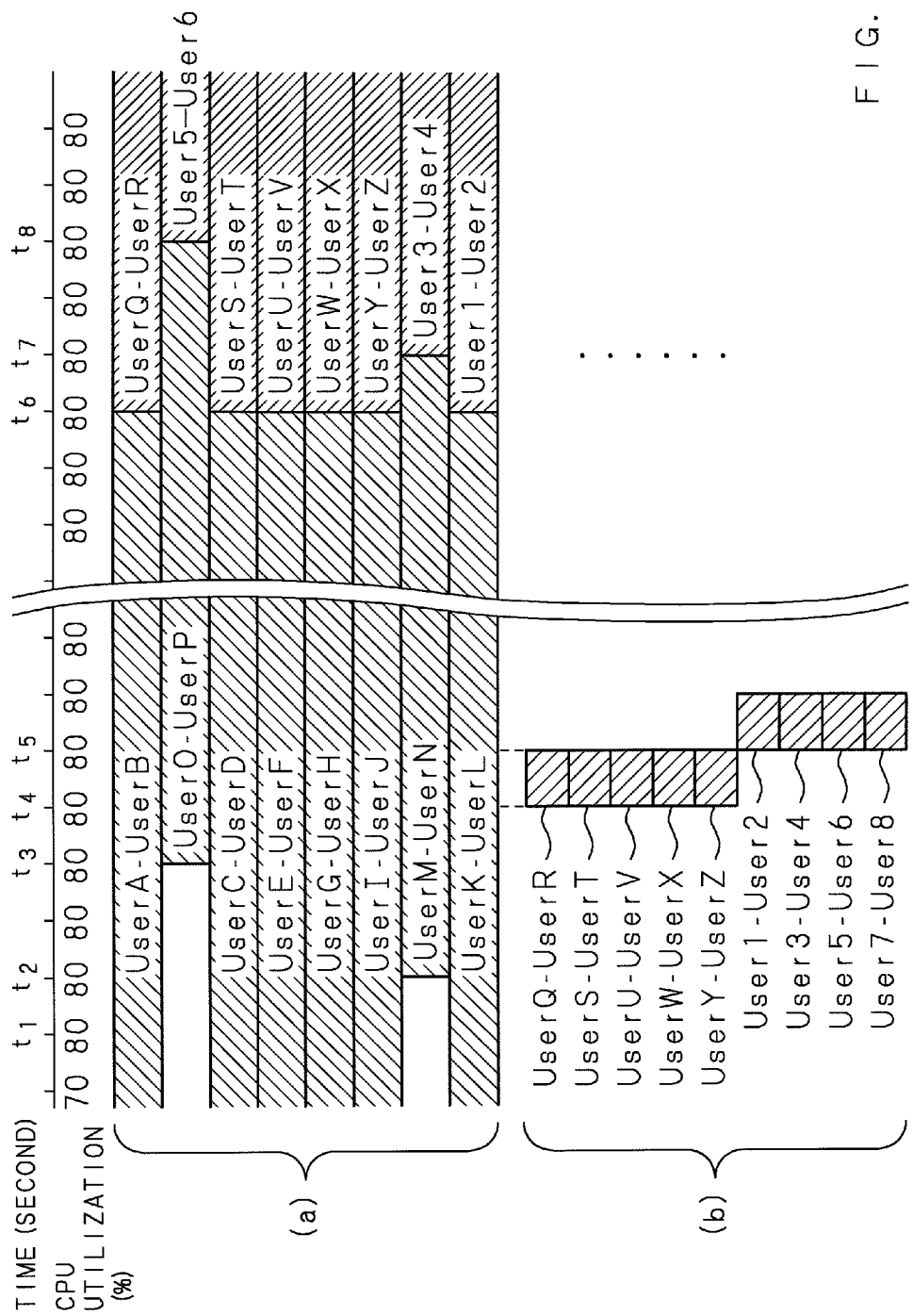

F I G. 1 2

| RESERVATION TIME | SOURCE(From) | DESTINATION (To) |
|---|---|---|
| $t_6$ | UserQ@west. net | UserR@east. net |
| $t_6$ | UserS@west. net | UserT@east. net |
| $t_6$ | UserU@west. net | UserV@east. net |
| $t_6$ | UserW@west. net | UserX@east. net |
| $t_6$ | UserY@west. net | UserZ@east. net |
| $t_6$ | User1@west. net | User2@east. net |
| $t_7$ | User3@west. net | User4@east. net |
| $t_8$ | User5@west. net | User6@east. net |
| ... | ... | ... |

F I G. 1 9

(a) SIP/2.0 302 Moved Temporarily
Via:SIP/2.0/UDP 192.168.2.130
From:"UserQ"<sip:UserQ@west.net>;tag=t1234aa
To:"UserR"<sip:UserR@east.net>
Call-ID:973750786@west.net
CSeq:1 INVITE
(b) Contact:<sip:UserQ@192.168.5.180:5060>
Content-Length:0

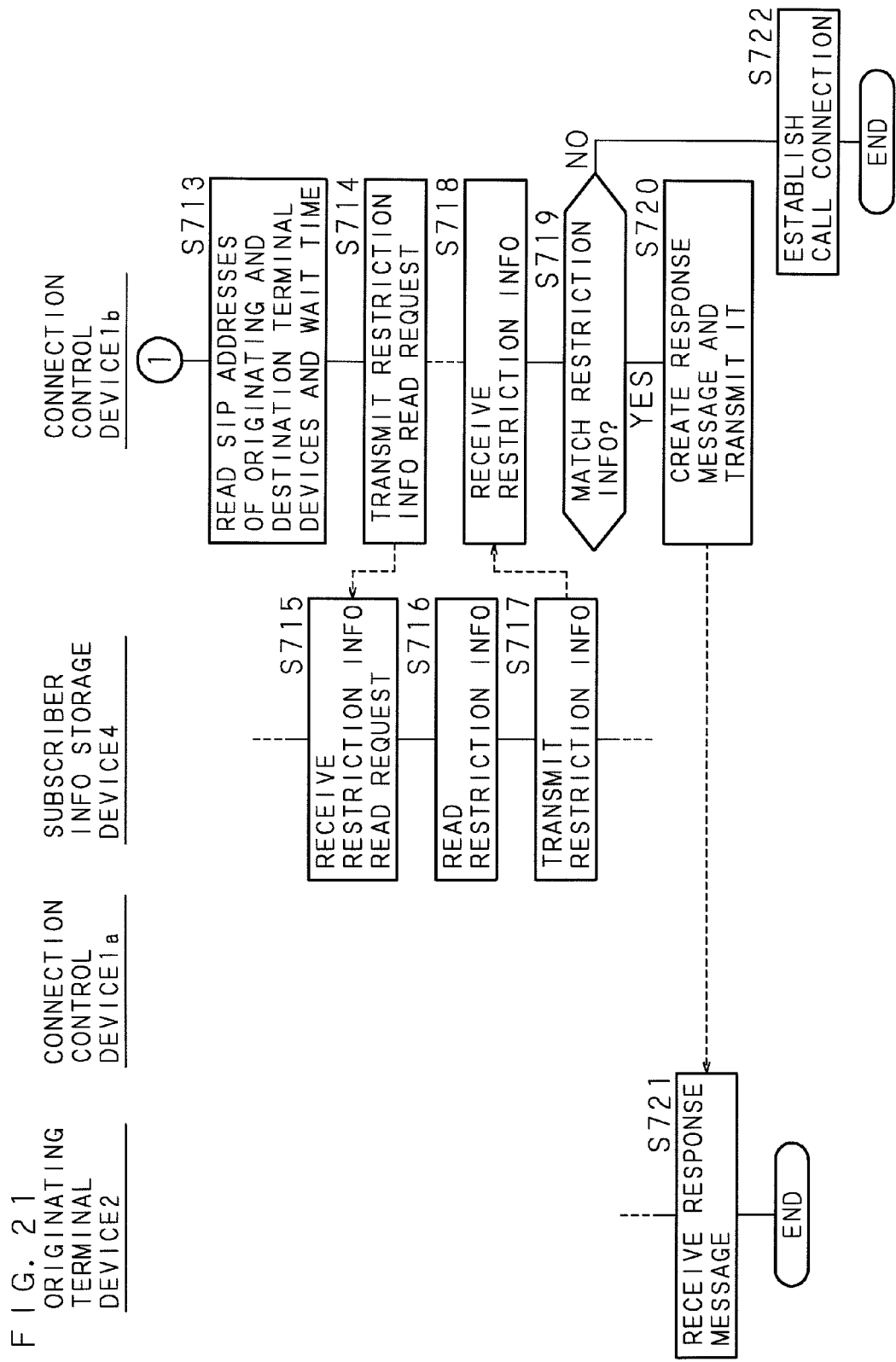

FIG. 22

```
INVITE sip:UserJ@east.net SIP/2.0
Via:SIP/2.0/UDP west.net:5060;branch=z9hG4bK776as3
Max-Forwards:70
From:Ken<sip:UserD@west.net>;tag=r18f061962
To:Maki<sip:UserJ@east.net>
Call-ID:30017891@west.net
CSeq:1 INVITE
Contact:<sip:UserD@10.11.12.13>
Content-type:application/sdp
Content-Length:138
```
(a) Priority:emergency

```
v=0
o=UserD 2890842807 2890842807 IN IP4 west.net
s=Voice Session
c=IN IP4 10.11.12.13
t=0 0
m=audio 50000 RTP/AVP 0
a=rtpmap:0 PCMU/8000
```

F I G. 2 6

(a)
```
INFO sip:UserQ@west.net SIP/2.0
```
Via:SIP/2.0/UDP 192.168.2.130
User-Agent:Pingtel/2.1.8
Max-Forwards:70
From:"UserQ"<sip:UserQ@west.net>;tag=t1234aa
To:"UserR"<sip:UserR@east.net>
Call-ID:973750786@west.net
CSeq:1 INFO
(b)
```
X-Poss-Timer:60
```
Content-Type:application/sdp
Content-Length:0 v=0
o=Pingtel 5 5 IN IP4 192.168.2.10
s=phone-call
c=IN IP4 192.168.2.110
t=0 0
m=audio 8766 RTP/AVP 96 97 0 8 18 98
a=rtpmap:98 telephone-event/8000/1

TELEPHONY SYSTEM, CONNECTION CONTROL METHOD, CONNECTION CONTROL DEVICE AND RECORDING MEDIUM

CROSS-REFERENCE TO RELATED APPLICATION

This non-provisional application claims priority under 35 U.S.C. §119(a) on Patent Application No. 2006-222670 filed in Japan on Aug. 17, 2006, the entire contents of which are hereby incorporated by reference.

BACKGROUND

1. Technical Field

The present invention relates to a telephony system comprising terminal devices and a connection control device for establishing a call connection between the terminal devices based on a connection request received from the terminal device, in which, when the connection control device is in a congested state, newly received connection requests are stored in the order they are received and the wait time until a connection becomes certainly available is notified, and also relates to a connection control method, a connection control device for use in the telephony system, and a recording medium storing a computer program for causing a computer to function as a connection control device.

2. Description of Related Art

In the case where the amount of calling increases temporarily, such as when a disaster happens or when ticket reservation is started, a switchboard may fall into a congested state in which call processing is delayed due to a lack of hardware resources required for call processing to establish call connections, and calls are hard to be established. Considering such a situation, the switchboard is generally designed to give a message such as "A connection is hard to be established." to the caller and reject the establishment of a call connection if a new incoming call is detected when the amount of calling became larger than a predetermined threshold value.

However, if only a message informing that a call is hard to be established is simply given, the callers who were rejected for establishing call connections often repeat calling again, and therefore the congested state of the switchboard is not solved. Moreover, since the callers are unable to know when calls become available, they may further repeat calling, and hence the congested state is not solved.

During the congested state, a decision as to whether a call connection is established or the establishment of a call connection is rejected in response to an incoming call is made based not on the order the incoming call was detected by the switchboard, but on the detection timing, and therefore the callers may feel unfairness such as unequal opportunity to establish calls.

Hence, there is disclosed a technique to solve the problem of callers' unequal opportunity to establish calls by classifying subscribers according to mobile communication systems and further assigning a priority order to each class to differentiate the connection available time and limit the connection time based on the priority orders (Japanese Patent Application Laid-Open No. 09-130855 (1997)).

There is also disclosed a technique to solve the unequal connection opportunity by storing the phone number of a caller of an incoming call which is not automatically responded because all operators are busy in a system, such as a call center for ticket reservation, in which the operators are supposed to respond to incoming calls, notifying the caller of an average wait time, and calling back the stored caller's number when an operator is free (Japanese Patent Application Laid-Open No. 10-093717 (1998)).

As a technique of limiting connections to solve the congested state, there is disclosed a technique in which, when a switchboard accommodating a destination telephone terminal device is in a congested state, the message of the caller and the phone number of the called party are stored in a switchboard accommodating the source telephone terminal device without transmitting an incoming call to the destination switchboard, and after solving the congested state in the destination switchboard, the presence of the stored message is notified and the message is transferred to the destination telephone terminal device (Japanese Patent Application Laid-Open No. 10-093708 (1998)).

Moreover, there is disclosed a technique capable of completing a reservation within a short processing time by separately providing a reservation line for receiving reservations to establish call connections, receiving an incoming call by a terminal device through the reservation line when a congested state occurs, making a reservation to store the caller number of the caller of the received incoming call and the connection available time, and notifying the caller of the connection available time, and also capable of solving the congested state by preventing the caller from repeatedly calling until the connection available time (Japanese Patent Application Laid-Open No. 64-089646 (1989)).

There is also disclosed a technique for solving the congested state by determining and limiting the connection time when the congested state occurs, forcefully disconnecting an established call connection exceeding the connection time by a switchboard, rejecting the establishment of a call connection for a newly detected incoming call, and notifying the caller of the connection available time estimated based on statistics in case of rejection (Japanese Patent Application Laid-Open No. 2002-232563).

By the way, with the advancement of VoIP (Voice over Internet Protocol) technique capable of converting voice into digital data and exchanging data over a packet switched network, services for providing an IP (Internet Protocol) telephony system, which enables a call by establishing a call connection through a packet switched network, such as the Internet, instead of a conventional fixed telephone network, have been spread.

The IP telephony system enables a call by establishing a call connection when a terminal device, such as a computer having the function of converting voice into digital data or a router, and a connection control device for establishing a call connection between terminal devices exchange data based on Session Initiation Protocol (hereinafter referred to as SIP). SIP is rules which define a method of describing a message represented by text data and a message exchange method. By exchanging messages based on SIP between the terminal devices and the connection control device, services such as the establishment of a call connection or error notice are realized.

SUMMARY

However, like the above-mentioned switchboard in the fixed telephone network, a connection control device performing the function of a switchboard in an IP telephone network sometimes falls into a congested state. Therefore, the connection control device constituting an IP telephony system also needs to use a technique for solving the above-mentioned congested state.

However, the technique disclosed in Japanese Patent Application Laid-Open No. 09-130855 (1997)) only limits the connection time and differentiates the connection available time according to each class. The technique disclosed in Japanese Patent Application Laid-Open No. 09-130855 (1997)) does not take into account the fact that, when a caller is rejected to establish a call connection, there is a high possibility that the caller may repeat calling because he or she does not know when, for example, how many minutes or how many hours later, the establishment of a call connection becomes available. Also there is a high possibility that after a forceful disconnection of a call, the person who made that call may make a call again, and therefore the congested state cannot be solved early by just limiting the connection time.

The technique disclosed in Japanese Patent Application Laid-Open No. 10-093717 (1998)) considers a situation where there are not enough operators for responding to calls, but does not take into account a situation where the switchboard falls into a congested state. Moreover, with this technique, the average wait time to be notified is only rough time information, and an operator decides when she or he will call back, or whether call connections are established in the order in which reservations were made. Therefore, it is hard to say that this technique solves the problem of unequal opportunity to establish calls.

According to the technique disclosed in Japanese Patent Application Laid-Open No. 10-093708 (1998)), when a congested state occurs, a message is stored in the switchboard, and the stored message is transmitted to a destination telephone terminal device after the congested state is solved. Hence, a direct call cannot be made, and it is impossible to know when the congested state will be solved and when the message will be transmitted.

With the technique disclosed in Japanese Patent Application Laid-Open No. 64-089646 (1989), it is necessary to further use a reservation system, and a caller is further required to store a reservation time by himself or herself and make a call at the reservation time by himself or herself. Thus, the caller has to go through complicated procedures.

The technique disclosed in Japanese Patent Application Laid-Open No. 2002-232563 does not take into account the fact that, when the switchboard is in a congested state, the caller may further repeat calling. Moreover, the connection available time notified to the caller is only rough time information and does not certainly guarantee the caller a connection, and whether or not the establishment of a connection is decided depending on the timing of calling performed again. Therefore, it is hard to say that the problem of unequal opportunity to establish calls is solved.

In order to solve the above problems, it is a main object to provide a telephony system and a connection control method having a structure in which, when a connection control device in the telephony system is in a congested state in which call processing is delayed due to a lack of hardware resources necessary for call processing, a connection available time until disconnection of an established call connection is set, and, when a connection request is received during the congested state, information about the connection request is stored in the order received, a wait time until the establishment of a call connection becomes certainly available is calculated based on the order in which connection requests are received and the connection available time, and the wait time is transmitted, whereby it is possible to certainly solve the congested state by forcefully disconnecting an already established call connection and storing the information about a connection request received during the congested state without performing call processing for the connection request, and it is possible to solve the problem of unequal opportunity to establish calls by ensuring the time at which the establishment of a call connection becomes available for a connect request in the order in which connection requests are received, after forcefully disconnecting an already established call connection; a connection control device for use in the telephony system; and a recording medium storing a computer program for causing a computer to function as a connection control device.

Another object is to provide a telephony system with a structure in which the connection control device automatically establishes a call connection corresponding to a connection request after elapse of the wait time for each stored information about a connection request, whereby it is possible to automatically establish call connections in the order of connection requests received by the connection control device without asking the callers to make calls by themselves, and it is possible to solve the problem of unequal opportunity to establish calls among users.

A further object is to provide a telephony system with a structure comprising a plurality of connection control devices, wherein a connection request received and stored when one connection control device is in a congested state in which call processing is delayed due to a lack of hardware resources necessary for call processing is also stored in other connection control device, and, when the connection request received by other connection control device is the same as a stored connection request, it is discarded, whereby, even when the caller makes a call again without waiting for the notified wait time, a determination is made that this is the same connection request as a connection request which has already been stored in other connection control device and the connection request is discarded to prevent the same connection request as the already stored connection request from being transmitted to the connection control device in the congested state, thereby solving the congested state early, and capable of solving the problem of unequal opportunity to establish calls by discarding a connection request for which call opportunity has already been ensured.

A further object is to provide a telephony system with structure comprising a storing device for storing a connection request, and capable of receiving a list of connection requests stored in the storing device by a connection control device, whereby it is possible to refer to already stored connection requests even from a connection control device different from a connection control device in a congested state, and it is possible to split the process of discarding a connection request, or call processing for establishing a call connection.

A further object is to provide a telephony system with a structure in which a connection control device in a congested state transmits a connection request to a separately provided storing device, the storing device stores the received connection request as a connection list, and, when a connection control device other than the connection control device in a congested state receives a connection request, it receives the connection list stored in the storing device, and discards the connection request if the received connection request matches a connection request included in the connection list, whereby the connection control device can solve the congested state early by preventing the same connection request as a connection request stored in the storing device from being transmitted to the connection control device in a congested state, and can solve the problem of unequal opportunity to establish calls by discarding a connection request for which call opportunity has already been ensured.

A further object is to provide a telephony system with a structure in which until a predetermined time elapses after a call connection corresponding to a stored connection request is established, when the same connection request as an established call connection is newly received, the connection request is discarded, whereby, when the caller repeats calling again after establishing a call connection, it is possible to discard the connection request to ensure an opportunity for establishing a call connection between other terminal devices, and it is possible to solve the problem of unequal opportunity to establish calls.

A further object is to provide a telephony system with a structure in which, when a connection request contains priority call information representing a call given priority for connection, priority is given to establish a call connection for the connection request containing priority call information by switching the order in which connection requests were stored, whereby it is possible to establish a call connection for a call given priority for connection, such as an emergency call, even when a connection control device is in a congested state.

A telephony system according to a first aspect is a telephony system comprising: a plurality of terminal devices; and a connection control device capable of communicating with the terminal devices, wherein one terminal device includes means for transmitting a connection request for requesting establishment of a call connection with other terminal device to the connection control device, the connection control device includes: means for receiving the connection request; and means for establishing a call connection corresponding to the received connection request, and characterized in that the connection control device comprises: congestion determining means for determining whether or not the connection control device is in a congested state, based on whether a usage of at least one of hardware resources necessary for call processing to establish a call connection is equal to or more than a predetermined threshold value; setting means for setting a connection available time until disconnecting an established call connection, when determined that the connection control device is in a congested state; means for measuring a connection time of an established call connection; means for disconnecting an established call connection when the connection time exceeds the connection available time; means for storing, if a connection request is received from one terminal device when determined that the connection control device is in a congested state, connection information containing terminal identification information identifying each of originating and destination terminal devices corresponding to the received connection request according to an order in which connection requests are received; calculating means for calculating a wait time until establishment of a call connection between terminal devices corresponding to the stored connection information becomes available, based on the connection available time and the order in which connection requests are received; and means for transmitting time information indicating the wait time to other device.

A telephony system according to a second aspect is characterized in that the connection control device further includes: means for storing the time information indicating the wait time for each stored connection information; determining means for determining whether or not the wait time has elapsed; and means for establishing a call connection between the corresponding terminal devices when the determining means determines that the wait time has elapsed.

A telephony system according to a third aspect is characterized by comprising a plurality of the connection control devices, wherein one connection control device further includes means for transmitting, if a connection request is received from one terminal device when the congestion determining means determines that the connection control device is in a congested state, connection information and time information indicating the wait time corresponding to the received connection request to other connection control device, other connection control device further includes means for storing the connection information and time information received from the one connection control device; means for determining, when a connection request from one terminal device is received, whether or not terminal identification information about originating and destination terminal devices corresponding to the received connection request matches that in the stored connection information; means for determining whether or not the corresponding wait time has elapsed, when determined that they match; and means for discarding the received connection request if the wait time has not elapsed.

A telephony system according to a fourth aspect is characterized by further comprising a storing device capable of communicating with the connection control device and storing connection information, wherein the connection control device further transmits the stored connection information and time information corresponding to the connection information to the storing device, the storing device includes: means for receiving the connection information and time information corresponding to the connection information from the connection control device; means for storing terminal identification information identifying each of the originating and destination terminal devices corresponding to the received connection information and the time information corresponding to the connection information as a connection list; and means for transmitting the connection list to the connection control device.

A telephony system according to a fifth aspect is characterized in that the connection control device further includes: means for receiving the connection list from the storing device when the connection control device receives a connection request from one terminal device; means for determining whether or not the terminal identification information about the originating and destination terminal devices corresponding to the received connection request matches that in the connection information included in the received connection list; means for reading the corresponding time information from the received connection list when determined that they match; means for determining whether or not a wait time shown by the read time information has elapsed; and means for discarding the received connection request if the wait time has not elapsed.

A telephony system according to a sixth aspect is characterized in that the connection control device further includes: means for measuring a post connection time since establishment of a call connection between terminal devices corresponding to the stored connection information; progress determining means for determining whether or not the post connection time has exceeded a predetermined time; and means for deleting the stored connection information after the progress determining means determines that the predetermined time has elapsed.

A telephony system according to a seventh aspect is characterized in that the connection control device further includes means for determining, when a connection request from one terminal device is received, whether or not the connection request contains priority call information representing a priority call given priority for connection; means for switching an order of the stored connection information to give priority to the received connection request when determined that the connection request contains priority call information; and means for trying to establish a call connection corresponding to the received connection request irrespectively of whether or not the connection control device is in a congested state.

A connection control method according to an eighth aspect is a connection control method for receiving from one terminal device a connection request for requesting establishment of a call connection with other terminal device and establishing a call connection corresponding to the received connection request, and characterized by comprising the steps of determining whether or not it is in a congested state, based on whether a usage of at least one of hardware resources necessary for call processing to establish a call connection is equal to or more than a predetermined threshold value; setting a connection available time until disconnecting an established call connection, when determined that it is in a congested state; measuring a connection time of an established call connection; disconnecting an established call connection when the connection time exceeds the connection available time; if a connection request is received from one terminal device when determined that it is in a congested state, storing connection information containing terminal identification information identifying each of originating and destination terminal devices corresponding to the received connection request according to an order in which connection requests are received; calculating a wait time until establishment of a call connection between terminal devices corresponding to the stored connection information becomes available, based on the connection available time and the order in which connection requests are received; and transmitting information indicating the wait time to other device.

A connection control device according to a ninth aspect is a connection control device including means for receiving from one terminal device a connection request for requesting establishment of a call connection with other terminal device, and means for establishing a call connection corresponding to the received connection request, and characterized by comprising: congestion determining means for determining whether or not the connection control device is in a congested state, based on whether a usage of at least one of hardware resources necessary for call processing to establish a call connection is equal to or more than a predetermined threshold value; setting means for setting a connection available time until disconnecting an established call connection, when determined that the connection control device is in a congested state; means for measuring a connection time of an established call connection; means for disconnecting an established call connection when the connection time exceeds the connection available time; means for storing, if a connection request is received from one terminal device when determined that the connection control device is in a congested state, connection information containing terminal identification information identifying each of originating and destination terminal devices corresponding to the received connection request according to an order in which connection requests are received; calculating means for calculating a wait time until establishment of a call connection between terminal devices corresponding to the stored connection information becomes available, based on the connection available time and the order in which connection requests are received; and means for transmitting time information indicating the wait time.

A recording medium according to a tenth aspect is characterized by a recording medium storing a computer program for causing a computer capable of communicating with a plurality of terminal devices to receive from one terminal device a connection request for requesting establishment of a call connection with other terminal device and establish a call connection corresponding to the received connection request, said computer program comprising: a step of causing the computer to determine whether or not it is in a congested state, based on whether a usage of at least one of hardware resources necessary for call processing to establish a call connection is equal to or more than a predetermined threshold value; a step of causing the computer to set a connection available time until disconnecting an established call connection, when a determination is made that it is in a congested state; a step of causing the computer to measure a connection time of an established call connection; a step of causing the computer to disconnect the established call connection when the connection time exceeds the connection available time; a step of causing the computer, if a connection request is received when determined that it is in a congested state, to store connection information containing terminal identification information identifying each of originating and destination terminal devices corresponding to the received connection request according to an order in which connection requests are received; a step of causing the computer to calculate a wait time until establishment of a call connection between terminal devices corresponding to the stored connection information becomes available, based on the connection available time and the order in which connection requests are received; and a step of causing the computer to transmit time information indicating the wait time.

In the first aspect, eighth aspect, ninth aspect and tenth aspect, when a connection control device for establishing a call connection determines that it is in a congested state in which call processing is delayed due to a lack of hardware resources necessary for call processing, such as when the CPU utilization becomes equal to or more than a predetermined ratio, when the memory usage becomes equal to or more than a predetermined amount, and when the number of established call connections becomes equal to or more than a predetermined number, the connection control device sets a connection available time until forcefully disconnecting an established call connection. The connection control device in a congested state measures the connection time of an established call connection, and forcefully disconnects the call connection when the connection time exceeds the connection available time. Moreover, when the connection control device in the congested state receives from a terminal device a connection request for requesting the establishment of a call connection with other terminal device, it stores information identifying the originating and destination terminal devices corresponding to the connection request in the order received. Further, the connection control device in the congested state calculates the wait time until the establishment of the corresponding call connection becomes available, based on the set connection available time and the order in which connection requests are received, and notifies the wait time, without performing the process of establishing a call connection in response to the received connection request. Thus, the connection control device in the congested state limits call processing so as to prevent a further increase in the usage of the hardware resource. In addition, since the connection control device in the congested state forcefully disconnects a call connection exceeding the connection available time, the usage of hardware resources, such as the CPU utilization, memory usage, and the number of call connections, returns to a state sufficient for call processing.

In the second aspect, the wait time calculated for each piece of the stored connection information is stored, and, after the stored wait time elapses, a call connection between terminal devices corresponding to the connection information is established by the connection control device. Since the wait time is calculated in the order in which connection requests are received, call connections are established in the order in which the connection requests are received.

In the third aspect, the connection information stored in a connection control device in a congested state in which call processing is delayed due to a lack of hardware resources necessary for call processing is transmitted to other connection control device. The other connection control device receives and stores the connection information. In the other connection control device, if the originating and destination terminal devices corresponding to a connection request received from the terminal device match the originating and destination terminal devices contained in the connection information which has already been stored, the connection request is discarded and is not transmitted. Therefore, the connection request will never be transmitted to the connection control device in a congested state.

In the fourth aspect, the connection information and time information corresponding to a connection request received by a connection control device in a congested state in which call processing is delayed due to a lack of hardware resources necessary for call processing are transmitted to the storing device and stored as a connection list. The storing device transmits the stored connection list to a plurality of connection control devices.

In the fifth aspect, the connection information and time information corresponding to a connection request received by a connection control device in a congested state in which call processing is delayed due to a lack of hardware resources necessary for call processing are transmitted to the storing device and stored as a connection list in the storing device. When a connection control device other than the connection control device in the congested state receives a connection request from a terminal device, the connection control device receives the connection list from the storing device and determines whether or not the originating and destination terminal devices corresponding to the received connection request match the originating and destination terminal devices corresponding to the connection information on the connection list received from the storing device. When the originating and destination terminal devices corresponding to the received connection list match the connection information on the connection list and the corresponding wait time has not elapsed, the connection request is discarded. Thus, if a connection request discarded from the connection control device in the congested state is transmitted to other connection control device before the wait time elapses, it is discarded, and a connection request which has already been stored and ensured an opportunity to establish a call connection will never be redundantly given an opportunity for call connection during the wait time.

In the sixth aspect, even after a call connection is established between terminal devices corresponding to connection information received and stored in a connection control device, the stored connection information is kept stored for a predetermined time without being deleted, and, if the terminal identification information about originating and destination terminal devices corresponding to a connection request received newly from a terminal device matches that in the stored connection information, the connection request is discarded. Therefore, for a connection request corresponding to terminal devices between which a call connection has already been established, an opportunity for call connection is not given redundantly within the predetermined time.

In the seventh aspect, when a connection request received by a connection control device contains priority call information, an attempt is made to establish a call connection corresponding to the connection request, irrespectively of whether or not it is in a congested state and the order in which the connection information is stored.

According to the first aspect, eighth aspect, ninth aspect and tenth aspect, when a connection control device falls into a congested state in which call processing is delayed due to a lack of hardware resources necessary for call processing, it sets a connection available time until disconnecting an established call connection, and forcefully disconnects the established call connection when the connection available time elapses. Moreover, when the connection control device in the congested state receives from one terminal device a connection request for requesting the establishment of a call connection with other terminal device, it stores connection information corresponding to the connection request in the order received, calculates the wait time based on the connection available time and the order in which connection requests are received, and transmits the wait time to the originating terminal device or other device.

Hence, in the connection control device in the congested state, no more call processing is performed, and therefore the usage of hardware resource of the connection control device will not be increased by call processing. In addition, after the connection available time elapses, the call connection is forcefully disconnected. It is thus possible to certainly solve the congested state. Moreover, when a connection control device in a congested state receives a connection request, it stores information about the connection request in the order received, ensures an opportunity for establishing a call connection, calculates the wait time based on the order in which connection requests are received and the connection available time, and transmits the wait time to the originating terminal device or other device. When the originating terminal device which received the wait time transmitted the same connection request after the elapse of the wait time, an already established call connection had been forcefully disconnected. Accordingly, there is an available hardware resource necessary for call processing to establish a new connection, and the connection control device establishes a call connection corresponding to the connection request, and thus it is possible to solve the problem of unequal opportunity for establishing call connections. Further, since the caller can know certainly the available time for calling, he or she will not repeat unnecessary calling, and therefore it is possible to solve the congested state early.

According to the second aspect, when the congested state is solved and there comes a time at which the establishment of a call connection is certainly available, a call connection corresponding to each connection request is automatically established in the order the connection requests were received. Hence, the callers do not need to make calls again by themselves. Moreover, since call connections are automatically established in the order in which the connection requests were received by the connection control device, it is possible to solve the problem of unequal opportunity to establish calls.

According to the third aspect, in the case where there are a plurality of connection control devices, when one connection control device is in a congested state, the one connection control device in the congested state transmits connection information about a connection request received from a terminal device and time information about the wait time to other connection control device, and the other connection control device stores the connection information and time information received from the connection control device in the congested state, and discards the connection request if terminal devices corresponding to a connection request received newly from a terminal device match terminal devices corresponding to the stored connection information. Thus, the connection information stored in one connection control device in the congested state is also be stored in a connection control device other than the one connection control device. Therefore, even when the same connection request is transmitted again from the originating terminal device, it is discarded by other connection control device, and is not transmitted to the connection control device in the congested state. Accordingly, when the caller repeats calling again, the connection request is soon discarded by a connection control device or other device belonging to the same network as the originating terminal device, thereby avoiding transmission of a connection request to the connection control device in the congested state. Hence, it is possible to reduce the burden of processing in the connection control device in the congested state, and it is possible to solve the congested state early. Further, by discarding a connection request redundant for a connection request which has already been stored in other connection control device and ensured an opportunity to establish the call during the wait time, it is possible to solve the problem of unequal opportunity to establish calls.

According to the fourth aspect, a storing device for storing connection information about a connection request and time information about the wait time is further provided, and it is possible to transmit and receive the list of connection information stored in the storing device to/from connection control devices. Hence, it is also possible to refer to the already stored connection information and time information from a connection control device different from a connection control device in a congested state, and it is possible to split the connection request transmitting or discarding processes between the connection control devices.

According to the fifth aspect, the connection information corresponding to a connection request received by a connection control device which has fallen into a congested state due to a lack of hardware resources necessary for call processing is transmitted to the storing device and stored as a connection list, and, when other connection control device newly receives a connection request, the other connection control device receives the connection list from the storing device and determines whether or not the originating and destination terminal devices corresponding to the newly received connection request match that in the connection information included in the connection list. If determined that they match, the other connection control device discards the newly received connection request. Hence, for the connection request received by other connection control device, it is possible to determine whether or not an opportunity for establishing a call connection has already been ensured by any connection control device. Thus, by discarding a connection request for which an opportunity to establish a call connection has already been ensured before transmitting it to other connection control device, it is possible to avoid unnecessary transmission and reception, and it is possible to solve the congested state early. Moreover, since connection requests which have already been stored and ensured opportunities for connection are discarded, an opportunity to establish a call connection is given to other connection request, and thus it is possible to solve the problem of unequal opportunity to establish calls.

According to the sixth aspect, when the same connection request as an already established call connection is received, the stored connection information is deleted after a predetermined time elapses after establishing the call connection once, and thus the connection request for the already established call connection is also stored until the predetermined time elapses, and then the connection request is discarded as being regarded as connection information about a call connection for which a connection opportunity is ensured. Therefore, even when the caller who already established a call repeats calling again, the call request is discarded, and a connection opportunity is given to other call connection, thereby solving the problem of unequal opportunity to establish calls.

According to the seventh aspect, when a connection request received from a terminal device represents a priority call, an attempt is made to establish a call connection corresponding to the connection request by giving priority to this call request, irrespectively or whether or not it is in a congested state and the order in which the connection information was stored with respect to connection requests received during the congested state, and thus it is possible to establish a call connection which should be given priority for connection, such as an emergency call.

The above and further objects and features will more fully be apparent from the following detailed description with accompanying drawings.

BRIEF DESCRIPTION OF THE SEVERAL VIEWS OF THE DRAWINGS

FIG. 7 is an explanatory view showing one example of an INVITE message created by a terminal device to request the establishment of a call connection with other terminal device in the telephony system of Embodiment 1;

FIG. 9 is an explanatory view showing one example of a response message transmitted by the CPU of the connection control device in response to an INVITE message received during a congested state in the telephony system of Embodiment 1;

FIG. 11 is an explanatory view showing an example of a method of calculating the wait time by the CPU of the connection control device in a congested state in Embodiment 1;

FIG. 12 is an explanatory view showing one example of a reservation list stored in a storage section by the CPU of the connection control device in Embodiment 1;

FIG. 19 is an explanatory view showing one example of a response message transmitted to the originating terminal device when a connection control device of Embodiment 4 is in a congested state;

FIG. 21 is a flowchart showing the procedure for discarding a connection request based on restriction information in a terminal device, a connection control device and a subscriber information storing device of the telephony system of Embodiment 4;

FIG. 22 is an explanatory view showing one example in which priority call information is described in an INVITE message transmitted by a terminal device of Embodiment 5;

FIG. 26 is an explanatory view showing one example of a request message transmitted by a connection control device of Embodiment 7 before disconnecting an established call connection.

DETAILED DESCRIPTION

The following description will explain in detail some embodiments based on the drawings.

Embodiment 1

Figure 1:
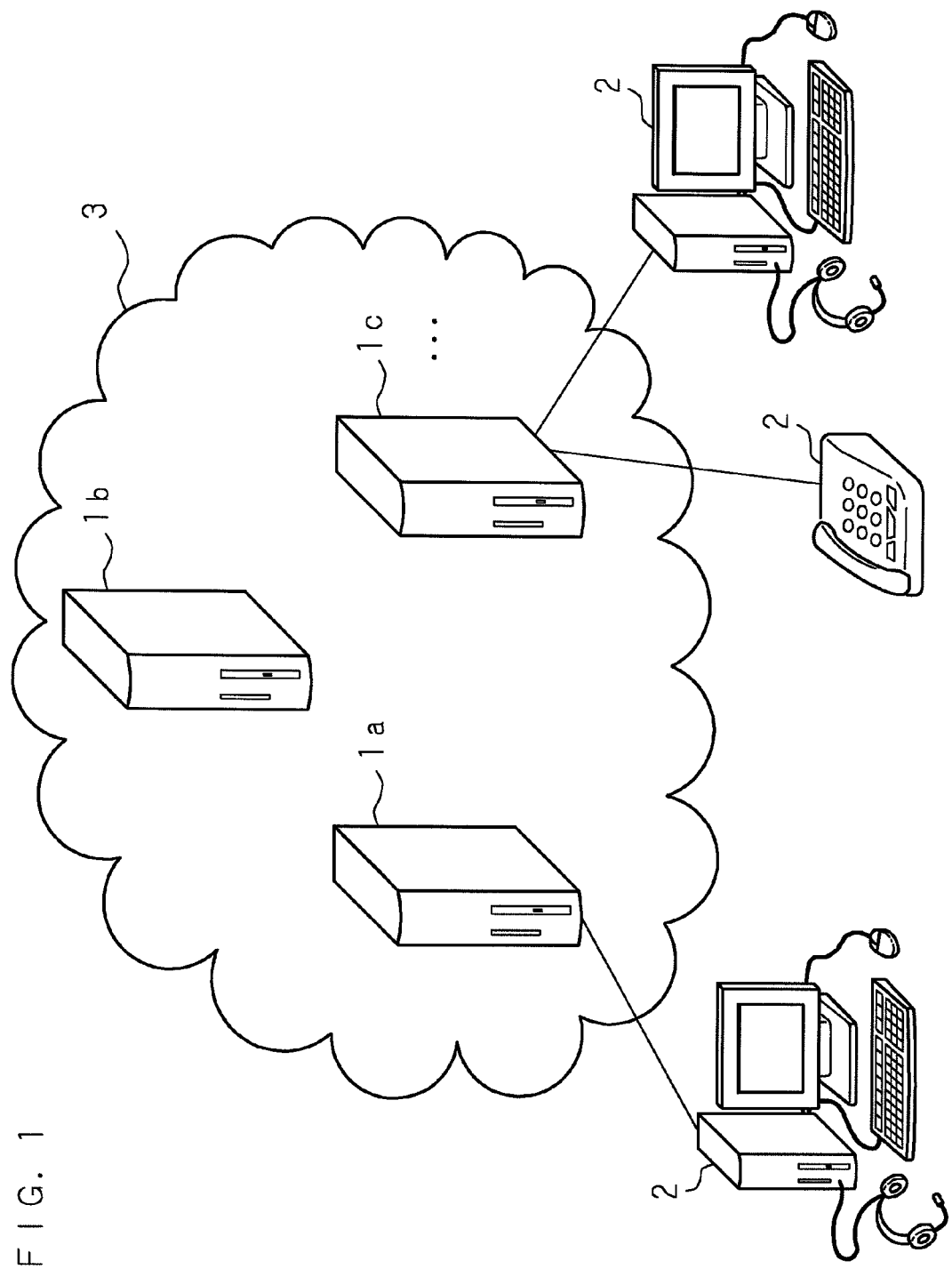
FIG. 1 is a structural view showing conceptually a telephony system of Embodiment 1.

FIG. 1 is a structural view showing conceptually a telephony system of Embodiment 1. The telephony system comprises at least connection control devices $1a$, $1b$, $1c$ . . . , terminal devices 2, 2, . . . , and a packet switched network 3. The connection control devices $1a$, $1b$, $1c$, . . . perform call processing such as the establishment or disconnection of a call connection between terminal devices 2, 2, . . . , such as telephone terminals or PCs (personal computers) having telephone functions, through the packet switched network 3 to realize an IP (Internet Protocol) telephony system which enables a call between users using the terminal devices 2, 2, . . . .

The connection control devices $1a$, $1b$, $1c$, . . . are server computers which perform a packet switching function and call processing such as the establishment of a call connection between the terminal devices 2, 2, . . . over the packet switched network 3 such as the Internet. Moreover, the connection control devices $1a$, $1b$, $1c$, . . . can communicate with each other through the packet switched network 3. The connection control devices $1a$, $1b$, $1c$, and the terminal devices 2, 2, . . . perform call processing, such as the establishment of a call connection, by mutually exchanging messages based on a session initiation protocol (hereinafter referred to as the SIP).

Figure 2:
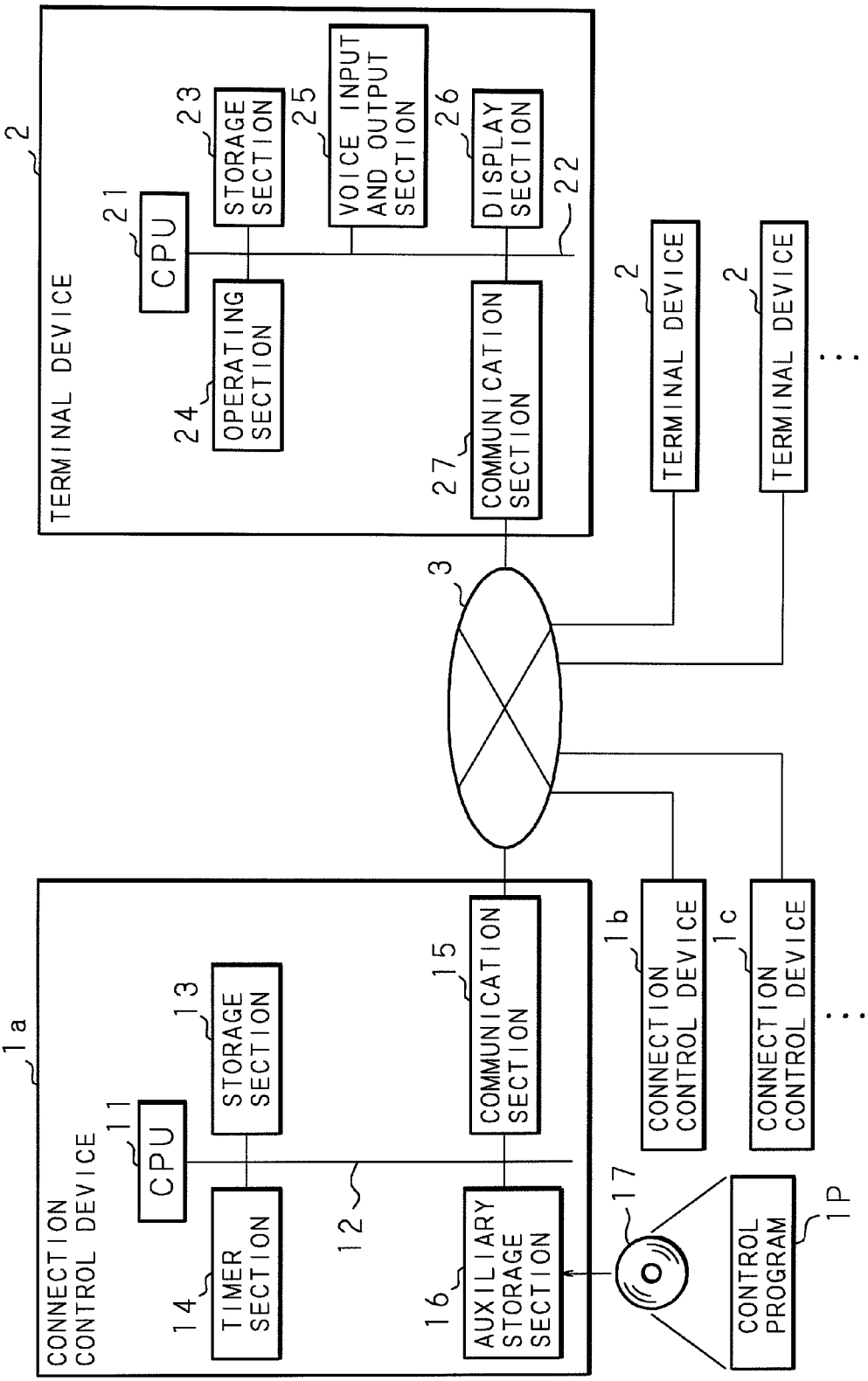
FIG. 2 is a block diagram showing the internal structures of a connection control device and a terminal device in the telephony system of Embodiment 1.

FIG. 2 is a block diagram showing the internal structures of the connection control devices $1a$, $1b$, $1c$, . . . and the terminal devices 2, 2, . . . in the telephony system of Embodiment 1. The connection control device $1a$ comprises at least a CPU 11 for controlling the entire device, an internal bus 12 for connecting various later-described hardware devices, a storage section 13 such as a hard disk for storing various kinds of information, a timer section 14 capable of measuring time, a communication section 15 (receiving section, transmitting section) for connecting to the packet switched network 3, and an auxiliary storage section 16 using a removable recording medium 17 such as a DVD and a CD-ROM. Since other connection control devices $1b$, $1c$, . . . have the same structure as the connection control device $1a$, the detailed explanations thereof will be omitted.

Stored in the storage section 13 is a control program 1P obtained from the removable recording medium 17, such as a DVD and a CD-ROM, for operating the PC as the connection control device $1a$. When the CPU 11 reads and executes the control program 1P, the server computer operates as the connection control device $1a$. Moreover, the connection control device $1a$ is connected to the packet switched network 3 through the communication section 15, and the CPU 11 exchanges messages based on SIP with other connection control devices $1b$, $1c$, . . . and terminal devices 2, 2, . . . through the communication section 15.

Each of the terminal devices 2, 2, . . . comprises at least a CPU 21 such as a CPU for controlling the entire device; an internal bus 22 for connecting later-described various hardware devices; a storage section 23 such as a hard disk for storing various kinds of information including control programs for the terminal devices 2, 2, . . . and data; an operating section 24 such as a mouse and a keyboard; a voice input and output section 25 such as a microphone and a speaker for call; a display section 26 such as a monitor; and a communication section 27 (transmitting section) for connecting to the packet switched network 3.

The CPU 21 reads from the storage section 23 a control program for operating the device as a terminal device for creating a message based on SIP and transmitting/receiving the message, and executes the control program. The CPU 21 receives a user's calling operation and responding operation to an incoming call through the operation section 24. Moreover, the CPU 21 exchanges messages based on SIP with the connection control devices 1a, 1b, 1a and terminal devices 2, 2, . . . through the communication section 27.

Figure 3:
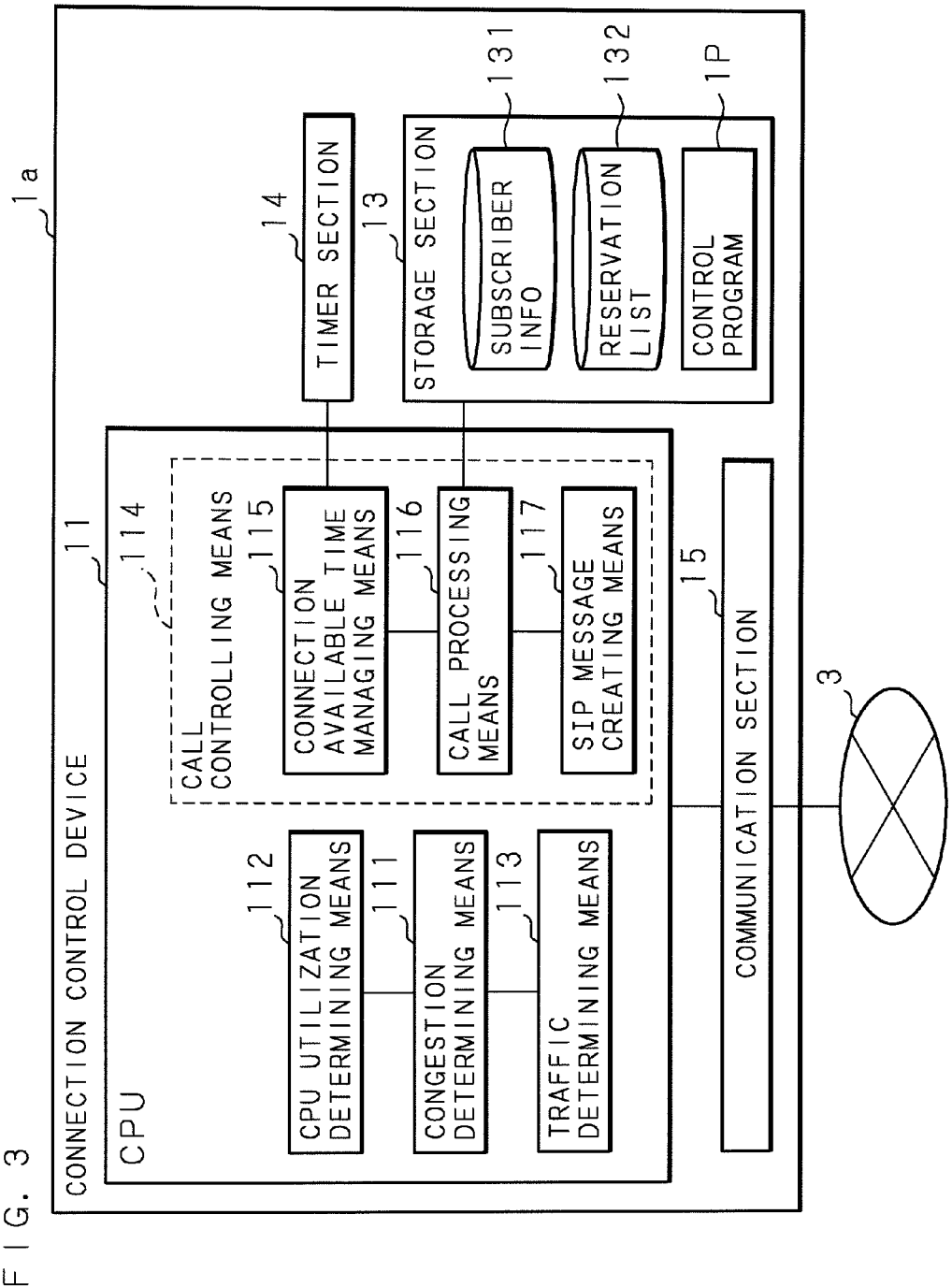
FIG. 3 is a functional block diagram showing the structure of the connection control device in the telephony system of Embodiment 1.

Next, the connection control device 1a will be explained in further detail. FIG. 3 is a functional block diagram showing the structure of the connection control device 1a in the telephony system of Embodiment 1.

The CPU 11 functions as later-described respective means by reading the control program 1P from the storage section 13 and executing it. Note that specific functions among the functions of the respective means may be prerecorded in a call control section composed of hardware such as an IC chip so that the CPU 11 realizes the respective functions by high-speed processing by working together with the call control section.

By reading the control program 1P from the storage section 13, the CPU 11 functions as congestion determining means 111, CPU utilization determining means 112, traffic determining means 113, and call controlling means 114.

The congestion determining means 111 determines whether or not the device is in a congested state in which call processing such as the establishment of a call connection is delayed, based on whether the usage of at least one of hardware resources of the connection control devices 1a, 1b, 1c, . . . is equal to or higher than a predetermined threshold value. The CPU utilization determining means 112 determines whether the CPU utilization of the CPU 11 is equal to or higher than a predetermined threshold value. The traffic determining means 113 determines whether the traffic, such as the volume of messages or the volume of packets the connection control device 1a exchanges with the terminal devices 2, 2, . . . or other connection control devices 1b, 1c, . . . , is equal to or greater than a predetermined volume. The congestion determining means 111 determines whether or not the connection control device 1a is in a congested state, based on the determination results from the CPU utilization determining means 112 and traffic determining means 113.

By reading and executing the control program 1P, the CPU 11 of the connection control device 1a functions as the congestion determining means 111, CPU utilization determining means 112 and traffic determining means 113, and determines whether or not the connection control device 1a is in a congested state. Note that the congestion determining means 111 may further comprise a memory usage determining section for setting a threshold value for memory usage and determining whether the memory usage is equal to or greater than the threshold value so as to determine whether or not the connection control device 1a is in a congested state.

As described later, the call controlling means 114 is composed of connection available time managing means 115 for performing a process related to a connection available time until forcefully disconnecting an established call connection, call processing means 116 for performing analyzing and responding processes, etc. with respect to a received message based on SIP, and SIP message creating means 117 for creating a message based on SIP. By reading and executing the control program 1P from the storage section 13, the CPU 11 functions as the connection available time managing means 115, call processing means 116 and SIP message creating means 117, and executes call processing such as the establishment or disconnection of a call connection.

Various kinds of information such as subscriber information 131 and a reservation list 132 are stored in a part of the storage area in the storage section 13. The subscriber information 131 is information such as unique phone numbers set for users of IP telephone services, user accounts for identifying the users by a string of characters, and SIP addresses for identifying the terminal devices 2, 2, . . . used by the respective users. As described later, the reservation list 132 is a list of reserved calls stored with respect to connection request messages received when the connection control devices 1a, 1b, 1c, . . . are in a congested state.

Next, the following description will explain an outline of a process performed normally to establish a call connection between terminal devices 2, 2, . . . by the connection control devices 1a, 1b, 1c, . . . and terminal devices 2, 2, . . . in the telephony system.

For the terminal devices 2, 2, . . . used by the users, SIP addresses for identifying the respective terminal devices 2, 2, . . . are set based on the phone numbers unique to the users, or the user accounts, and a domain for identifying a network to which the terminal devices 2, 2, . . . belong.

When the users use the terminal devices 2, 2, . . . , the terminal devices 2, 2, . . . transmit the stored phone numbers unique to the users, or user accounts, and the set SIP addresses together with unique terminal identifying information to the connection control devices 1a, 1b, 1c, . . . belonging to the same network. The connection control devices 1a, 1b, 1c, . . . specify the IP addresses of the terminal devices 2, 2, . . . from the received terminal identifying information, and store the received phone numbers or user accounts and the SIP addresses in association with the specified IP addresses in advance.

The following will explain the process of establishing a call connection by the connection control devices 1a, 1b, 1c, . . . in response to a user's calling operation in a state in which the connection control devices 1a, 1b, 1c, . . . store the SIP addresses of the terminal devices 2, 2, . . . belonging to the same network and are capable of communicating with the respective terminal devices 2, 2, . . . based on the SIP addresses.

Figure 4:
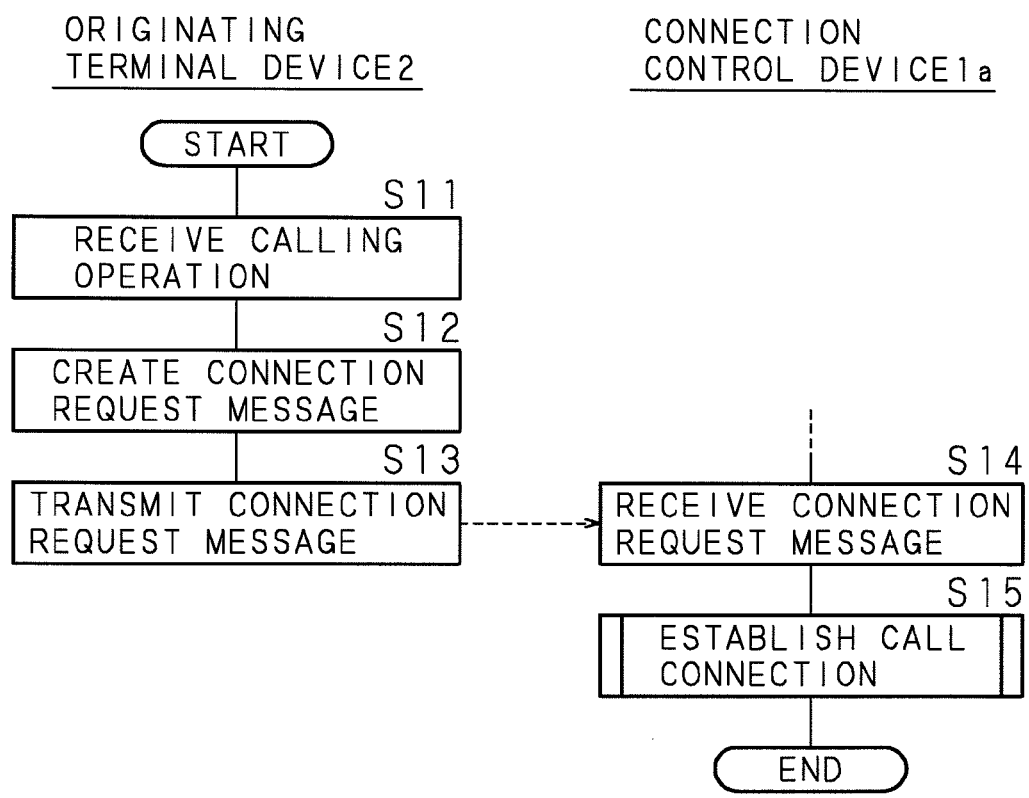
FIG. 4 is a flowchart showing the procedure to be performed when the CPU of the connection control device receives a connection request message from one terminal device in the telephony system of Embodiment 1.

FIG. 4 is a flowchart showing the procedure to be performed by the CPU 11 of the connection control device 1a when a connection request message is received from one terminal device 2 in the telephony system of Embodiment 1.

The CPU 21 of the originating terminal device 2 used by a user receives the user's calling operation through the operating means (step S11), creates a connection request message (step S12), and transmits the created connection request message through the communication section 27 to the connection control device 1a belonging to the same network (step S13).

When it is possible to specify the SIP address of the destination terminal device 2 used by the called user in creating the connection request message, the originating terminal device 2 creates a connection request message addressed to the specified SIP address.

When the SIP address of the destination terminal device 2 used by the called user could not be specified in creating the connection request message, the originating terminal device 2 can obtain the SIP address from the connection control devices 1a, 1b, 1c, . . . storing the phone number or the user account and the SIP address in association with the IP address in advance, based on the phone number of the called user or the user account inputted by the user's calling operation. In this case, the originating terminal device 2 creates a connection request message addressed to the SIP address of the destination terminal device 2 obtained from the connection control devices 1a, 1b, 1c, . . . .

Note that the originating terminal device 2 may transmit the connection request message addressed to the phone number or the user account of the called user, and the connection control device 1a which received this connection request message may specify the SIP address from the phone number or the user account in the received connection request message, reset the specified SIP address as a destination, and transmit the connection request message to the connection control device belonging to the same network as the destination terminal device 2.

The CPU 11 of the connection control device 1a receives the connection request message from the originating terminal device 2 (step S14), and establishes a call connection corresponding to the received connection request message by the function of the call controlling means 114 (step S15).

Figure 5:
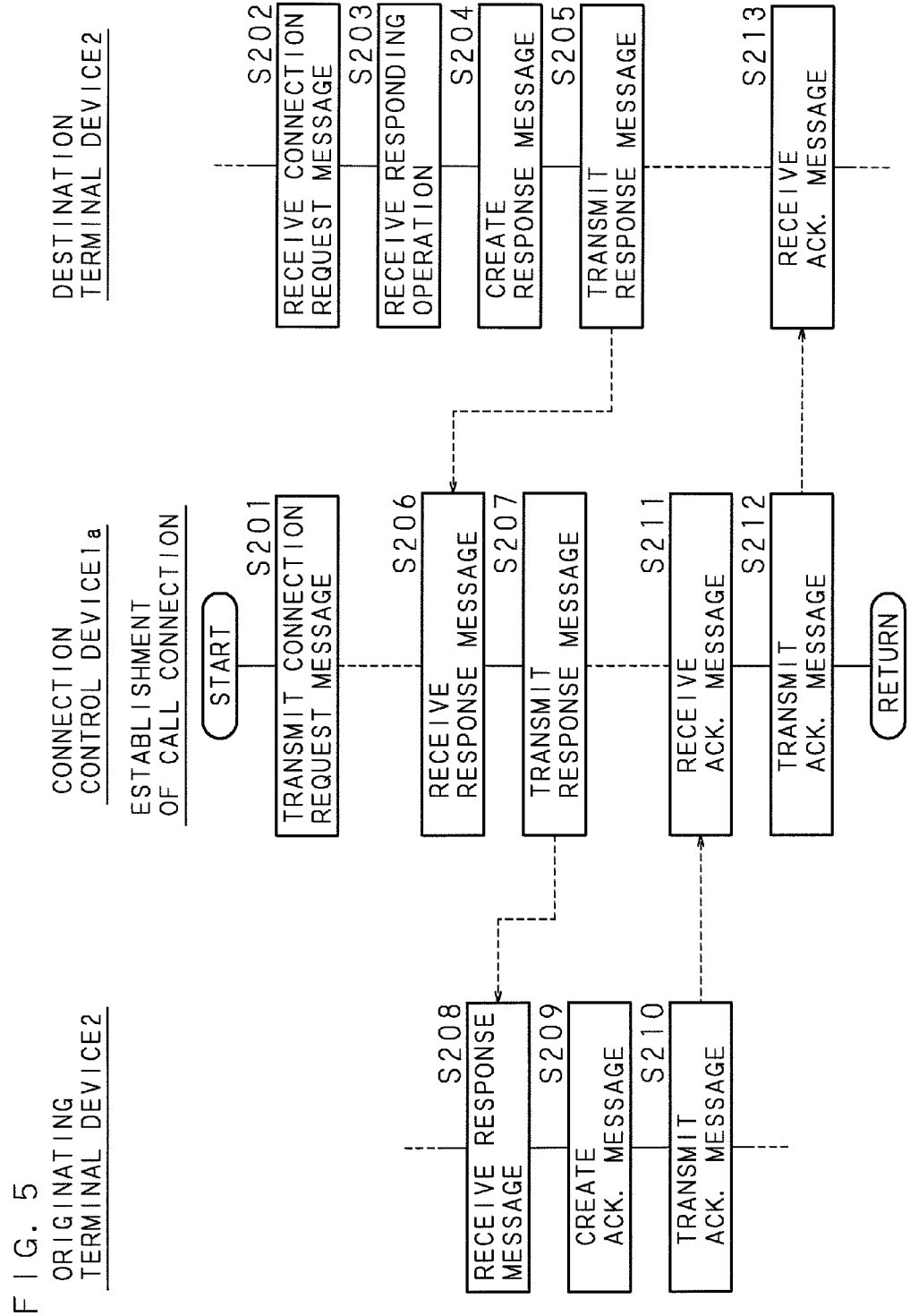
FIG. 5 is a flowchart showing the procedure to be performed by the CPU of the connection control device to establish a call connection between terminal devices in the telephony system of Embodiment 1.

The process of establishing a call connection shown in step S15 is realized by causing the CPU 11 of the connection control device 1a to perform the process of transmitting the received connection request message to the destination terminal device 2, sometimes via other connection control devices 1b, 1c, . . . , and receiving messages in response to the connection request message from other connection control devices 1b, 1c, . . . , the originating terminal device 2 and the destination terminal device 2. FIG. 5 is a flowchart showing the procedure for establishing a call connection between the terminal devices 2 and 2 by the CPU 11 of the connection control device 1a in the telephony system of Embodiment 1.

In response to the connection request message received from the originating terminal device 2 in step S14 shown in FIG. 4, the CPU 11 of the connection control device 1a specifies the IP address of the destination terminal device 2 based on the corresponding relation between the stored SIP addresses and IP addresses of the terminal devices 2, 2, . . . , and transmits the connection request message to the destination terminal device 2 through the connection section 15 (step S201).

Note that when the CPU 11 of the connection control device 1a can not directly communicate with the destination terminal device 2 for the connection request message received from the originating terminal device 2, it transmits the received connection request message through the communication section 15 to other connection control devices 1b, 1c, . . . which belong to the same network as the destination terminal device 2 and are capable of communicating with the destination terminal device 2. In this case, the CPU 11 of the connection control devices 1b, 1c, . . . belonging to the same network as the destination terminal device 2 transmits the connection request message to the destination terminal device 2.

The CPU 21 of the destination terminal device 2 receives the connection request message through the communication section 27 (step S202), and receives the user's responding operation through the operating section 24 (step S203). When the destination terminal device 2 receives the user's responding operation, it creates a response message to the connection request (step S204), and transmits it to the connection control device 1a through the communication section 27 (step S205). The CPU 11 of the connection control device 1a receives the response message to the connection request from the destination terminal device 2 (step S206), and transmits the received response message to the originating terminal device 2 (step S207).

The CPU 21 of the originating terminal device 2 receives the response message (step S208), creates an acknowledgment message for the response message (step S209), and transmits it to the connection control device 1a (step S210). The CPU 11 of the connection control device 1a receives the acknowledgment message (step S211), and transmits the acknowledgment message to the destination terminal device 2 (step S212). The CPU 21 of the destination terminal device 2 receives the acknowledgment message (step S213). Thus, the connection control device 1a establishes a call connection and realizes IP telephone services between the terminal devices 2, 2, . . . .

As described in the explanation of processing above, the terminal devices 2, 2, . . . are identified by the SIP addresses, and a message requesting the establishment of a call connection is transmitted from the originating terminal device 2 to the destination terminal device 2 via the connection control devices 1a, 1b, 1c to establish a call connection.

Figure 6:
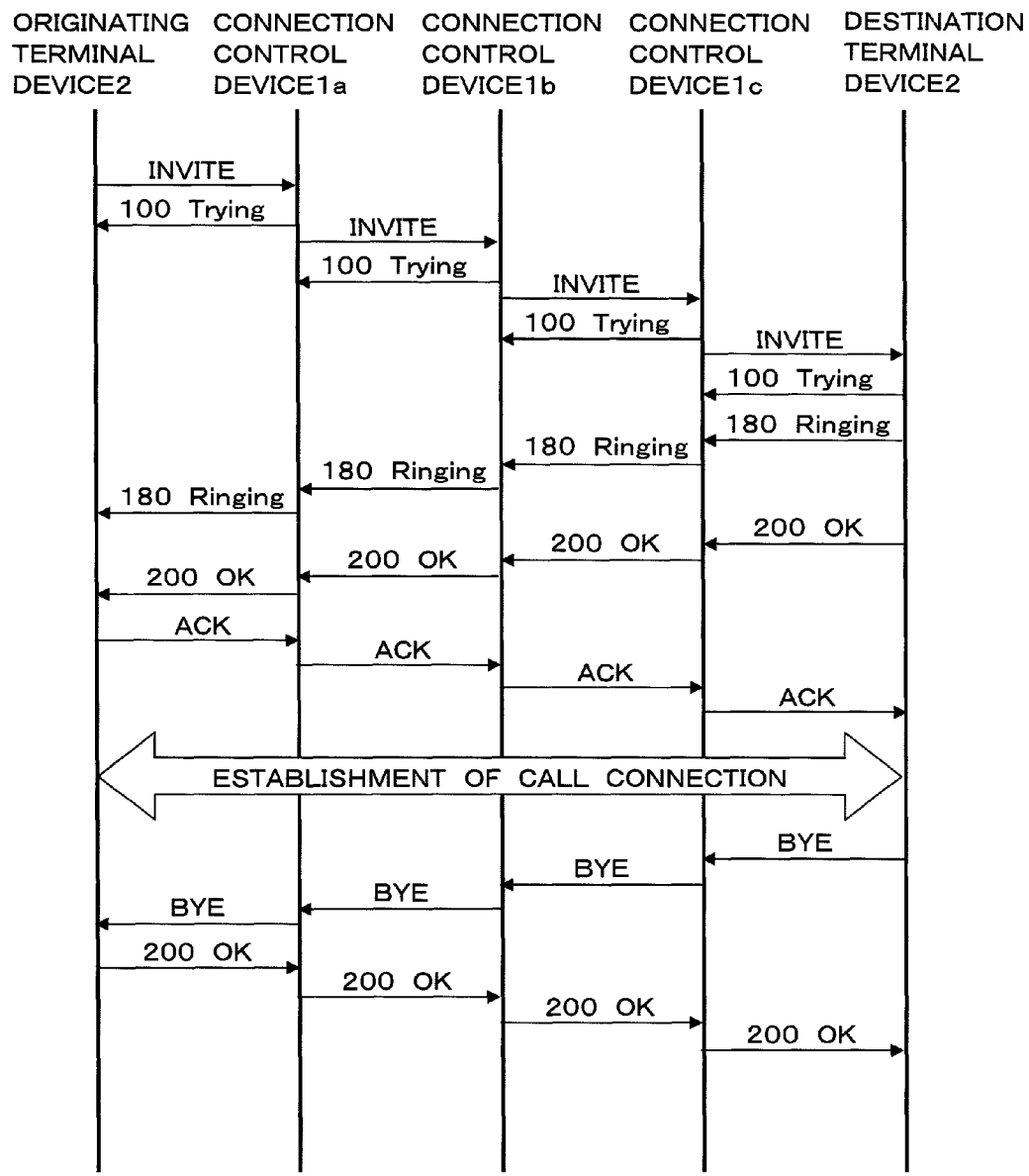
FIG. 6 is a sequence view showing the flow of messages exchanged after the establishment of a call connection corresponding to a connection request until the call connection is disconnected when a connection request message is transmitted from one terminal device in the telephony system of Embodiment 1.

Next, referring to FIG. 6, the following will explain in detail the flow of messages based on SIP which are exchanged between the connection control devices 1a, 1b, 1c, . . . and the terminal devices 2, 2, . . . in the process of establishing a call connection by the CPU 11 of the connection control device 1a.

FIG. 6 is a sequence view showing the flow of messages exchanged after the establishment of a call connection corresponding to a connection request until the disconnection of the call connection when the connection request message is transmitted from one terminal device 2 in the telephony system of Embodiment 1.

The messages to be exchanged between the connection control devices 1a, 1b, 1c, . . . and the terminal devices 2, 2, . . . are text data created based on SIP. The messages based on SIP include request messages such as an INVITE message for requesting the establishment of a call connection, a BYE message for requesting the disconnection of a call connection, and an ACK (Acknowledgement) message for requesting the process of responding to an INVITE message. For a request message, there are also response messages such as a message indicating that the process for the request is in progress, a message indicating that the request is accepted, and a message indicating the contents of an error that occurs with respect to the request. Further, a response message identifies and indicates the status of a process corresponding to a request message by a status code composed of numbers. The status codes include "100" (Trying) indicating that the process corresponding to the request is in progress, "180" (Ringing) indicating ringing for a connection request, and "200" (OK) indicating that the process has been completed successfully.

In the example shown in FIG. 6, when the originating terminal device 2 transmits an INVITE message representing a connection request with respect to a destination terminal device 2 to the connection control device 1a belonging to the same network, the connection control device 1a analyzes the received INVITE message, and transmits to the originating terminal device 2 a response message indicating with the status code "100" that processing is in progress. SIP provides that a response message indicating "100" shall be transmitted as a provisional response when processing is in progress with respect to the INVITE message.

The connection control device 1a obtains the IP address of the connection control device 1c belonging to the same network as the destination terminal device 2 that is the destination of the INVITE message from other device having a DNS (Direct Network Server) function, not shown. When the INVITE message is transmitted to the connection control device 1c based on the obtained IP address, the connection control device 1a can recognize that the INVITE massage should be transmitted via the connection control device 1b. Therefore, the CPU 11 of the connection control device 1a transmits the INVITE message to the connection control device 1b. At this time, the SIP address of the device via which the INVITE message was transmitted is added to the INVITE message transmitted from the device to device.

Similarly, the connection control device 1b transmits the received INVITE message to the connection control device 1c, and transmits a response message indicating "100" to the connection control device 1a. Further, the connection control device 1c similarly transmits the received INVITE message to the destination terminal device 2, and transmits a response message indicating "100" to the connection control device 1b.

After transmitting the response message indicating "100" to the connection control device 1c, the destination terminal device 2 further transmits to the connection control device 1c a response message indicating with the status code "180" that process of calling the user is being performed in response to the INVITE message. SIP provides that a response message indicating "180" shall be transmitted as a provisional response when calling is being performed with respect to the INVITE message. Note that in the response message indicating "180", the SIP address of a device via which the message is transmitted, which is described in the received INVITE message, is described as a route via which the response message should be transmitted.

When the connection control device 1c receives the response message indicating "180", it reads the SIP address of the connection control device 1b via which the message should be transmitted, and transmits the received response message indicating "180" to the connection control device 1b. Similarly, the connection control device 1b transmits the received response message indicating "180" to the connection control device 1a. Further, the connection control device 1a transmits the received response message indicating "180" to the originating terminal device 2.

When the destination terminal device 2 detects that the user performed an operation to respond to an incoming call, it transmits to the connection control device 1c a response message indicating with the status code "200" that calling has been successfully completed. SIP provides that the response message indicating "200" shall be transmitted as a successful response indicating that calling has been successfully completed. Similarly to the response message indicating "180", in the response message indicating "200", the SIP address of a device via which the message is transmitted, which is described in the received INVITE message, is also described as a route via which the response message should be transmitted.

When the connection control device 1c receives the response message indicating "200", it reads the SIP address of the connection control device 1b via which the message should be transmitted, and transmits the received response message indicating "200" to the connection control device 1b. Similarly, the connection control device 1b transmits the received response message indicating "200" to the connection control device 1a, and then the connection control device 1a further receives the received response message indicating "200" and transmits it to the originating terminal device 2.

When the originating terminal device 2 receives the response message indicating "200", it transmits to the connection control device 1a an ACK message indicating receipt of the response message responding to the incoming call for the transmitted INVITE message. SIP provides that an ACK message shall be transmitted when a response message responding to an INVITE message is received. In the ACK message, the SIP addresses of the connection control devices 1a, 1b and 1c are described as a route via which the ACK message should be transmitted. The connection control device 1a which received the ACK message from the originating terminal device 2 reads the SIP address of the connection control device 1b via which the message should be transmitted, and transmits the ACK message to the connection control device 1b. Similarly, the connection control device 1b transmits the received ACK message to the connection control device 1c, and then the connection control device 1c further transmits the received ACK message to the destination terminal device 2.

Described in the INVITE message transmitted from the originating terminal device 2 to the destination terminal device 2 is the identification number of a communication port used by the originating terminal device 2 to receive packets including voice data of the call. The destination terminal device 2 can read and recognize the identification number of the communication port from the received INVITE message. Moreover, in the response message indicating "200" transmitted from the destination terminal device 2 to the originating terminal device 2, the identification number of a communication port used by the destination terminal device 2 is described. The originating terminal device 2 can read and recognize the identification number of the communication port from the received response message indicating "200".

Thus, since the originating terminal device 2 and the destination terminal device 2 exchange packets including voice data between the recognized communication ports based on RTP (Real-time Transport Protocol), voice data are exchanged between the users using the respective devices, and a call connection is established. Hence, the call becomes available between the user using the originating terminal device 2 and the user using the destination terminal device 2.

Thereafter, when the originating terminal device 2 receives the user's operation to terminate the call, it transmits a BYE message for requesting the termination of the call connection to the connection control device 1a. On the other hand, when the destination terminal device 2 receives the user's operation to terminate the call, it transmits a BYE message to the connection control device 1c. The example shown in FIG. 6 illustrates the case where the destination terminal device 2 received the user's operation to terminate the call. In the BYE message transmitted to the connection control device 1c by the destination terminal device 2, the SIP addresses of the connection control devices 1a, 1b and 1c are described as a route via which the message should be transmitted. The connection control device 1c reads the SIP address of the connection control device 1b via which the message should be transmitted from the received BYE message, and transmits the BYE message to the connection control device 1b. Similarly, the connection control device 1b transmits the received BYE message to the connection control device 1a, and then the connection control device 1a further transmits the received BYE message to the originating terminal device 2.

The originating terminal device 2 which received the BYE message closes the communication port used for receiving packets including voice data, and transmits to the connection control device 1a a response message indicating with the status code "200" that it received the BYE message. In the response message indicating "200", as the SIP addresses of devices via which the message should be transmitted, which were read from the BYE message, the SIP addresses of the connection control devices 1a, 1b and 1c are described as a route via which this response message should be transmitted.

The connection control device 1a which received the response message indicating "200" reads the SIP address of the connection control device 1b via which the message should be transmitted from the description about the route via which the message should be transmitted, and transmits the response message indicating "200" to the connection control device 1c. Similarly, the connection control device 1c transmits the response message indicating "200" to the destination terminal device 2. The destination terminal device 2 which received the response message indicating "200" closes the communication port used for receiving packets including voice data and finishes processing.

Here, the following will explain examples of the messages based on SIP which are exchanged during the above-mentioned processing. FIG. 7 is an explanatory view showing one example of INVITE messages created by the terminal devices 2, 2, . . . to request the establishment of a call connection with other terminal devices 2, 2, . . . in the telephony system of Embodiment 1. A message specified by SIP is composed of a first line shown by (a) in FIG. 7, a header section shown by (b) in FIG. 7, and a body shown by (c) in FIG. 7.

In the first line shown by (a) in FIG. 7, the title of the message is described. In the case of a request message, the method name of a requested process and the SIP address of a destination device subject to processing are described. In a response message to a request message, a status code is described. In the case of the INVITE message shown in FIG. 7, the method name "INVITE" and the SIP address identifying the destination terminal device 2 are described in the first line shown by (a) in FIG. 7.

In the header section shown by (b) in FIG. 7, a plurality of headers showing information about transmission and reception of the message are described. The headers are described separately so that one line is used for each header, and the numbers of the headers may vary. The headers include a From header for indicating the source of the message, a To header for indicating the destination of the message, a Via header showing a route of devices via which the message was transmitted, and a Route header indicating a specified route for transmitting the message.

In the message body shown by (c) in FIG. 7, information showing the contents of each message is described. The message body may be omitted in a response message. In the case of the INVITE message shown in FIG. 7, the message body is described according to SDP (Session Description Protocol) indicating communication information for converting multi media data such as sounds or pictures.

The INVITE message shown in FIG. 7 indicates that the terminal device 2 identified by the SIP address represented by UserD@west.net is the source, and that this is a connection request message to be transmitted to a terminal device 2 identified by the SIP address represented by UserJ@east.net. Moreover, the From header in the header section indicates that the user who transmitted the message is "Ken" in addition to the SIP address of the source. In the Via header in the header section, the SIP address of a device via which the INVITE message was transmitted is described. In the example shown in FIG. 7, in the Via header, as a route through which the message was transmitted and received, west.net as a domain of a network to which the source terminal device 2 of the INVITE message belongs is described.

The above description explains a case where a call connection is established by exchanging request messages, such as an INVITE message, and response messages between the connection control devices 1a, 1b, 1c and the terminal devices 2, 2, . . . . On the other hand, there is a possibility that any one of the connection control devices 1a, 1b and 1c on the route of the INVITE message may not carry out the call processing for establishing a call connection due to a shortage of hardware resources for the INVITE message transmitted from the originating terminal device 2 to the destination terminal device 2. For example, there may be a case where the connection control device 1a falls into a congested state, such as when the CPU utilization of the CPU 11 of the connection control device 1a is 80% or more and the message transmission and reception process is delayed, or when a large number of call connections are established through the connection control device 1a and a packet loss occurs frequently in exchanging packets based on RTP. When the connection control devices 1a, 1b, 1c, . . . are in a congested state, deterioration occurs in the quality of IP telephone services, such as a delay of call processing, failure of establishing a call connection, and interrupted voice communication due to a packet loss, and it is necessary to avoid such deterioration.

Hence, the telephony system determines whether or not the connection control device 1a is in a congested state, and when the connection control device 1a is in a congested state, an attempt is made to solve the congested state by performing the process of forcefully disconnecting already established call connections and restricting the establishment of a new call connection. The following will explain a process to be executed by the connection control device 1a in the telephony system to solve the congested state. Note that, for the sake of convenience of explanation, a state other than the congested state will be hereinafter referred to as a normal state in which the establishment of a call connection is executable without a processing delay.

First, the process of determining whether or not the connection control device 1a is in a congested state will be explained. The CPU 11 of the connection control device 1a determines whether it is in a congested state by the function of the congestion determining means 111 based on the determination results of the CPU utilization determining means 112 for determining whether the CPU utilization is equal to or higher than a predetermined threshold value and the traffic determining means 113 for determining whether traffic is equal to or higher than a predetermined threshold value. The CPU 11 of the connection control device 1a may determine that it is in a congested state when either the determination result of the CPU utilization determining means 112 or the traffic determining means 113 is equal to or higher than the predetermined threshold value, or when both of the determination results are equal to or higher than the predetermined threshold values by the congestion determining means 111. Or the CPU 11 of the connection control device 1a may determine that it is in a congested state until a determination is made by the function of the congestion determining means 111 that both of the determination results of the CPU utilization determining means 112 and the traffic determining means 113 are not higher than the predetermined threshold values. The CPU 11 of the connection control device 1a repeatedly make a determination as to whether or not it is in a congested state based on the criteria at certain time intervals of, for example, 1 second, by using the function of the congestion determining means 111.

By making a determination as to whether or not the connection control device 1a is in a congested state at certain time intervals by using the function of the congestion determining means 111, the CPU 11 of the connection control device 1a can determine whether the connection control device 1a is in a congested state or normal state. The CPU 11 of the connection control device 1a indicates whether it is currently in a congested state or normal state by data such as a flag, and stores the data in the storage section 13. When a determination is made that the connection control device 1a has changed into a congested state from a normal state, the CPU 11 of the connection control device 1a transmits a restriction start notice signal indicating that the establishment of a call connection should be restricted from the congestion determining means 111 to the call processing means 116 so that the call processing means 116 can recognize that restriction against the establishment of a call connection has started. On the other hand, when the CPU 11 of the connection control device 1a determines using the function of the congestion determining means 111 that the connection control device 1a has changed into the normal state from the congested state, a restriction cancellation notice signal to cancel the restriction against the establishment of a call connection is transmitted from the congestion determining means 111 to the call processing means 116.

Figure 8:
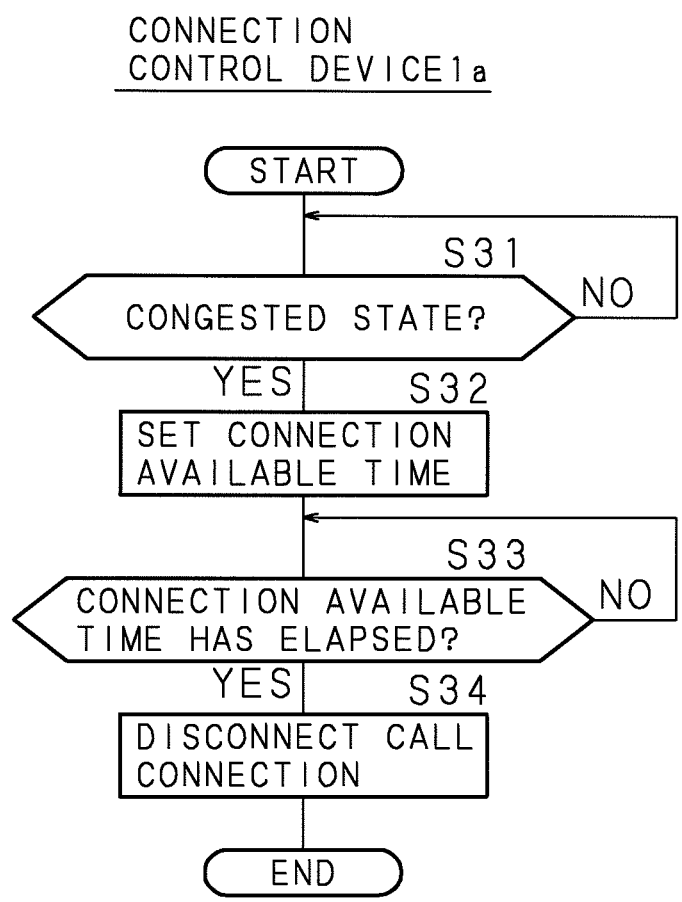
FIG. 8 is a flowchart showing the procedure for disconnecting an established call connection when the CPU of the connection control device determines that the connection control device is in a congested state in the telephony system of Embodiment 1.

Next, the following will explain the process of disconnecting already established call connections after a determination that the connection control device 1a is in a congested state until the connection control device 1a turns into the normal state in the telephony system. FIG. 8 is a flowchart showing the procedure for disconnecting established call connections when the CPU 11 of the connection control device 1a determines that the connection control device 1a is in a congested state in the telephony system of Embodiment 1.

The CPU 11 of the connection control device 1a determines through the call processing means 116 whether or not the connection control device 1a is in a congested state (step S31) by using the function of the congestion determining means 111 as described above. When a determination is made that the connection control device 1a is not in a congested state (S31: NO), the connection control device 1a returns to the process in step S31, and repeatedly determines whether or not the connection control device 1a is in a congested state by using the function of the congestion determining means 111. The CPU 11 of the connection control device 1a determines whether or not the connection control device 1a is in a congested state based on whether or not the call processing means 116 has received a restriction start notice signal transmitted using the function of the congestion determining means 111.

When a determination is made that the connection control device 1a is in a congested state (S31: YES), the CPU 11 of the connection control device 1a sets a predetermined connection available time for an already established call connection (step S32). The CPU 11 of the connection control device 1a determines whether or not the predetermined connection available time has elapsed for an already established call connection (step S33). The CPU 11 of the connection control device 1a measures the connection time of the established call connection by using time information based on the timer section 14.

When a determination is made that the predetermined connection available time has not elapsed for the already established call connection (S33: NO), the CPU 11 of the connection control device 1a returns to the process in step S33 and continues to make a determination as to whether not the predetermined connection available time has elapsed. By using the function of the connection available time managing means 115, the CPU 11 of the connection control device 1a determines whether or not the established connection has exceeded the predetermined connection available time at certain time intervals of, for example, 1 second, until it receives a restriction cancellation notice signal after receiving a restriction start notice signal through the call processing means 116.

When a determination is made that the predetermined connection available time has elapsed for the already established call connection (S33: YES), the CPU 11 of the connection control device 1a forcefully disconnects the call connection (step S34). When a determination is made that the connection time has exceeded the connection available time by using the function of the connection available time managing means 115 of the call controlling means 114, the CPU 11 of the connection control device 1a forcefully disconnects the established call connection by using the function of the call controlling means 114. For a call connection which had already been established when a determination was made that the connection control device 1a was in a congested state, the call connection is disconnected when a determination is made that the connection available time has elapsed after the determination that the connection control device 1a is in a congested state. It may also be possible to disconnect the already established call connections when a determination is made that the respective connection times have exceeded the connection available time, instead of using the time at which a determination was made that the connection control device 1a was in a congested time as the start point.

The connection available time until the CPU 11 of the connection control device 1a disconnects the already established call connection by using the function of the call controlling means 114 is set based on the performance of hardware resource of the connection control device 1a.

Next, the following will explain the process of restricting the establishment of a new call connection, and calculating a wait time until the establishment of a call connection becomes available and notifying the wait time when a connection request is received in the telephony system. When the connection control device 1a is in a congested state, the CPU 11 of the connection control device 1a does not establish a call connection in response to a new call connection establishment request, but stores the request as a reserved call, calculates the wait time until the establishment of the call connection becomes available and notifies the wait time.

After the time at which the determination is made that the connection control device 1a is in a congested state, when the CPU 11 of the connection control device 1a receives an INVITE message requesting the establishment of a new call connection from one terminal device 2, it does not perform call processing in a range exceeding the number of call connections that can be established in the congested state. In this case, the CPU 11 reads the character string in the INVITE message by using the function of the call processing means 116, associates the SIP address of the originating terminal device 2 and the SIP address of the destination terminal device 2, which are described in the From header and To header, with each other, and stores the INVITE message on a reservation list 132 as a reserved call in the order in which INVITE messages are received. Moreover, the CPU 11 of the connection control device 1a defines a time at which the establishment of a call connection becomes available as a reservation time, and further stores it in association with the SIP addresses of the originating and destination terminal devices 2 and 2 stored on the reservation list 132.

If the connection control device 1a is in a congested state, the CPU 11 of the connection control device 1a does not perform call processing when it receives an INVITE message requesting the establishment of a new call connection from one terminal device 2. Therefore, the CPU 11 of the connection control device 1a transmits a response message indicating with the status code "503" that an error occurred during processing performed in the connection control device 1a in response to the request message, instead of transmitting a response message indicating the status code "100". In this case, the CPU 11 of the connection control device 1a calculates a wait time until the establishment of a call connection becomes available with respect to the INVITE message from one terminal device 2, and states it in the response message indicating "503".

The wait time is a period of time until a reservation time at which it becomes possible to establish a call connection for a reserved call corresponding to the received INVITE message. After determining through the call processing means 116 that the connection control device 1a is in a congested state by using the function of the congestion determining means 111, the CPU 11 of the connection control device 1a forcefully disconnects already established call connections when the respective connection available times elapse. Therefore, since there is an available hardware resource that can be used for the establishment of a call connection, it is possible to establish the call connection. Thus, a reservation time is set at a time after the connection available time of a call connection which has already been established when a determination is made that the connection control device 1a is in a congested state, or a call connection of a reserved call received and stored on a reservation list beforehand by the connection control device 1a.

Therefore, the CPU 11 of the connection control device 1a finds a reservation time, calculates the time until the found reservation time as the wait time, and describes the calculated wait time by providing a Call-After header in the header section of a response message indicating "503", which is to be transmitted to one terminal device 2 as the source of the INVITE message. It may be possible to describe the reservation time in the Call-After header instead of the wait time.

The CPU 11 of the connection control device 1a notifies the wait time information by describing it in the Call-After header, and does not use the generally used Retry-After header. This is because since it is provided that entire communications shall be restricted to devices which transmit error messages by using the Retry-After header, if the CPU 11 of the connection control device 1a transmits an error response message stating the wait time information in the Retry-After header, receiving messages other than an INVITE message is also restricted.

FIG. 9 is an explanatory view showing one example of a response message transmitted by the CPU 11 of the connection control device 1a in the telephony system of Embodiment 1 in response to an INVITE message received during a congested state. In the first line of the example message shown by (a) in FIG. 9, "503 Service Unavailable" representing the title of the response message is described. In the header section, the Call-After header shown by (b) in FIG. 9 is provided. In the example shown in FIG. 9, "56" is stated as a value for the Call-After header, and indicates that the wait time is 56 seconds. The CPU 11 of the connection control device 1a creates a response message with "503" stating the wait time as the value for the Call-After header as shown in FIG. 9 by using the function of the SIP message creating means 117, and transmits it to the originating terminal device 2.

Figure 10:
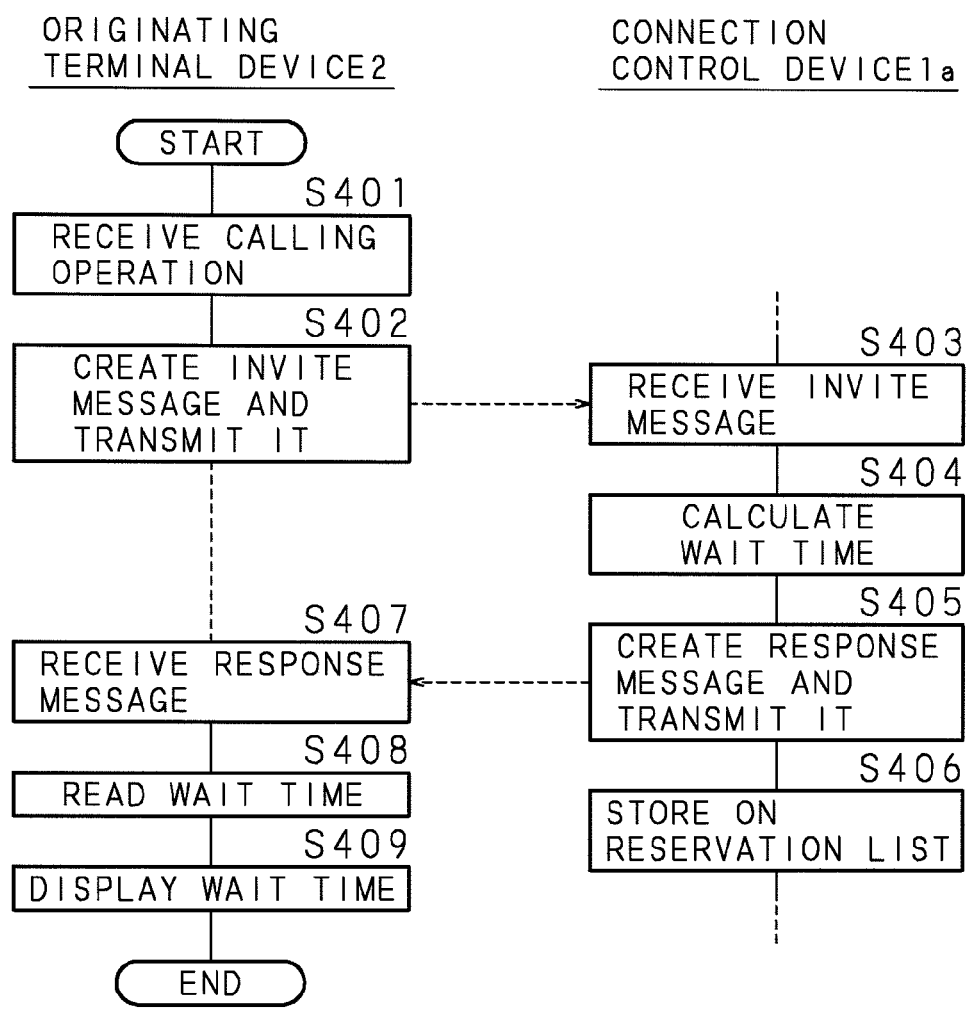
FIG. 10 is a flowchart showing the procedure to be performed when the CPU of a connection control device in a congested state receives an INVITE message from one terminal device in the telephony system of Embodiment 1.

Next, the following will explain the procedure to be performed by the CPU 11 of the connection control device 1a when an INVITE message is transmitted from one terminal device 2 at the time the connection control device 1a is in a congested state. FIG. 10 is a flowchart showing the procedure to be performed when the CPU 11 of the connection control device 1a in a congested state receives an INVITE message from one terminal device 2 in the telephony system of Embodiment 1.

The user of one terminal device 2 performs a calling operation to communicate with other user using other terminal device 2 by inputting a phone number or an account unique to the called user, or the SIP address of the other terminal device 2 used by the called user. The CPU 21 of the one terminal device 2 receives the user's calling operation executed by the input of the SIP address, phone number or account (step S401), creates an INVITE message based on the received SIP address of the other terminal device 2, and transmits the INVITE message to the connection control device 1a through the communication section 27 (step S402).

The CPU 11 of the connection control device 1a receives the INVITE message through the communication section 15 (step S403). Since a restriction start signal was received from the congestion determining means 111 through the call processing means 116 and a determination was made that the connection control device 1a is in a congested state, the CPU 11 of the connection control device 1a does not perform the process of establishing a call connection. The CPU 11 of the connection control device 1a calculates a wait time until a reservation time at which the process of establishing a call connection becomes available for the received INVITE message (step S404). By using the function of the SIP message creating means 117, the CPU 11 of the connection control device 1a creates a response message with "503" describing the calculated wait time in the Call-After header in the header section, and transmits it to the originating terminal device 2 through the communication section 15 (step S405). Moreover, by using the function of the call processing means 116, the CPU 11 of the connection control device 1a stores the received INVITE message, the SIP addresses of the originating terminal device 2 and the destination terminal device 2 and the reservation time in association with each other as a reserved call on the reservation list 132 (step S406).

The CPU 21 of the terminal device 2 receives a response message transmitted from the connection control device 1a through the communication section 27 (step S407), reads the wait time described in the Call-After header in the header section of the response message (step S408), displays it on a monitor of the display section 26 so that the user can see the wait time (step S409), and finishes processing.

Since the user who sees the display of the wait time can recognize that a call connection will not be established until the wait time elapses, he/she waits until the wait time elapses without performing the calling operation. At this time, after seeing the display of the wait time, the user may perform a disconnecting operation to finish the operation for establishing a call connection.

Then, after the elapse of the wait time, the user performs the calling operation again. In this case, the CPU 21 of the terminal device 2 which received the calling operation transmits an INVITE message in the same manner as in the above-mentioned steps S401 and S402. After the elapse of the wait time, the CPU 21 of the terminal device 2 forcefully disconnects the currently established call connections. Therefore, the hardware resource is available for establishing a call connection corresponding to the received INVITE message. Thus, after the elapse of the wait time, the CPU 11 of the connection control device 1a which received the INVITE message performs the process of establishing a call connection in the same manner as in step S403.

Through the processing described above, the connection control device 1a in a congested state calculates the wait time for the received INVITE message, based on the order of reserved calls reserved previously and the time until forcefully disconnecting the call, transmits it to the originating terminal device 2, and stores a reserved call on the reservation list 132, thereby solving the problem of unequal opportunity for establishing call connections. When the originating terminal device 2 transmits an INVITE message again to the connection control device 1a after the elapse of the wait time, the connection control device 1a which receives the INVITE message has an available hardware resource necessary for call processing. Therefore, the process of establishing a call connection is performed in response to the INVITE message. Hence, the user of the originating terminal device 2 can certainly make a call.

Next, referring to a specific example, the following will explain the calculation of the wait time shown in S404 in the procedure performed by the CPU 11 of the connection control device 1a with respect to the INVITE message received during a congested state shown in FIG. 10.

The process performed by the CPU 11 of the connection control device 1a to calculate the wait time will be explained. When a new INVITE message is received during the congested state, the CPU 11 of the connection control device 1a sets a reservation time, based on a time of forcefully disconnecting a call connection which has already been established when moved into the congested state, and a time of forcefully disconnecting a call connection of a reserved call stored on the reservation list 132 beforehand by the connection control device 1a after the elapse of the connection available time.

The reservation time is set in an order in which the INVITE messages are received. In order to set a reservation time when a new INVITE message is received during the congested state, the CPU 11 of the connection control device 1a temporarily stores a time very close to the forceful disconnection of an already established call connection as the next reservation time. Further, the CPU 11 of the connection control device 1a temporarily stores the number of calls that can be processed at the next reservation time as an available call counter in the storage section 13. The CPU 11 of the connection control device 1a stores the next reservation time and the available call counter for the next reservation time every time an INVITE message is received and stored on the reservation list 132. Note that the present embodiment is not limited to this structure, and it may be possible to calculate and set a reservation time every time an INVITE message is received.

It is also possible to set the same reservation time for a plurality of reserved calls. The number of call connections that can be reserved for the same reservation time is set according to the performance of the hardware resource of the connection control device 1a. For example, when the number of calls for which the CPU 11 of the connection control device 1a can establish call connections in one second is determined by the performance, it may be possible to set that number of calls as an upper limit of call connections that can be reserved for the same reservation time. More specifically, for example, when the number M of call connections that can be established in the busiest one hour is determined by the performance of the CPU 11 of the connection control device 1a, the memory capacity and the performance of a network card, then the number m of calls that can be processed to establish call connections in one second is given by m=M/3600 (calls/s). Therefore, when the number of reserved calls for the same reservation time exceeds the number m of calls that can be processed to establish call connections in one second, a time at which the established call connection is disconnected next after the expiration of the connection available time is set as a reservation time.

Similarly, the connection available time is set according to the performance of the hardware resource of the connection control device 1a. For example, when the maximum number of call connections that can be established at the same time (maximum simultaneous connection limit N) in the congested state by the CPU 11 of the connection control device 1a is determined based on factors such as the performance of the CPU 11 of the connection control device 1a, the memory capacity and the performance of a network memory card, it is possible to set the connection available time by using the maximum simultaneous connection limit N. By setting the time required for establishing call connections corresponding to the maximum simultaneous connection limit N as the connection available time, it is possible to calculate a time which is almost the upper limit in a range of not causing a delay in call connection processing even in the congested state. In this case, a connection available time t can be calculated by t=N/m(s) based on the maximum simultaneous connection limit N and the number m of calls that can be connected in one second. When a longer time than the required time is set as the connection available time, there is a possibility that the congested state may not be solved in the busiest time. On the other hand, when a shorter time than the required time is set as the connection available time, it is possible to solve the congested state earlier, but there is an increasing possibility that users who experience forceful disconnection of call connections may be unsatisfied. Note that a time determined as the longest call connection time for securing quality based on actual measurements and stored in the storage section 13 in advance by the operation of the operator of the connection control device 1a may be set as the connection available time.

FIG. 11 is an explanatory view showing an example of a method of calculating the wait time by the CPU 11 of the connection control device 1a in a congested state in Embodiment 1. Time is plotted on the horizontal axis. The CPU utilization of the CPU 11 of the connection control device 1a at each time is shown by percentage. In (a) of FIG. 11, the status of each of already established call connections is shown in time sequence. In (b) of FIG. 11, the status of each of call connections stored as reserved calls is shown in time sequence. The reserved calls shown in the lower part indicates that their connection requests were received late. Note that the character strings such as UserA and UserB are shown by omitting the SIP addresses identifying the terminal devices 2, 2, . . . .

FIG. 11 illustrates an example in which CPU utilization 80% is set as a threshold value used for determining a congested state by the CPU 11 of the connection control device 1a with the congestion determining means 111. Further, this example explains the case where 8 is set as the maximum simultaneous connection limit N when the connection control device 1a is in the congested state.

(a) in FIG. 11 shows that call connections have been established between the terminal devices 2 and 2 represented by UserA and UserB, UserC and UserD, UserE and UserF, UserG and UserH, UserI and UserJ, and UserK and UserL, respectively, at time $t_1$. Moreover, it is shown that a call connection has been established between the terminal devices 2 and 2 represented by UserM and UserN since time $t_2$. Similarly, it is shown that a call connection has been established between the terminal devices 2 and 2 represented by UserO and UserP since time $t_3$.

It is shown that, at time $t_6$, the call connections between the terminal devices 2 and 2 represented by UserA and UserB, the UserC and userD, the UserE and UserF, the UserG and UserH, UserI and UserJ, and UserK and UserL, respectively, are forcefully disconnected, and call connections are established between the terminal devices 2 and 2 represented by UserQ and UserR, UserS and UserT, UserU and UserV, UserW and UserX, UserY and UserZ, and User1 and User2. Moreover, it is shown that, at time $t_7$, the call connection between the terminal devices 2 and 2 represented by UserM and UserN is forcefully disconnected, and a call connection is established between the terminal devices 2 and 2 represented by User3 and User4. Similarly, it is shown that, at time $t_8$, the call connection between the terminal devices 2 and 2 represented by UserO and UserP is forcefully disconnected, and a call connection is established between the terminal devices 2 and 2 represented by User5 and User6.

(b) in FIG. 11 shows that the CPU 11 of the connection control device 1$a$ sequentially received INVITE messages for call connections between the terminal devices 2, 2 represented by UserQ and UserR, UserS and UserT, User U and UserV, UserW and UserX, UserY and UserZ at time $t_4$, and sequentially received INVITE messages for call connections between the terminal devices represented by User1 and User2, User3 and user4, User5 and User6, User7 and User8 at time $t_5$.

In the example shown in FIG. 11, the CPU utilization reaches 80% at time $t_1$, and the CPU 11 of the connection control device 1$a$ determines that it is in a congested state through the call processing means 116 by using the functions of the CPU utilization determining means 112 and congestion determining means 111. Accordingly, the CPU 11 of the connection control device 1$a$ performs the process of disconnecting the established call connections after the elapse of the connection time and restricting the establishment of a call connection after time $t_1$ until the congested state is solved.

Regarding the establishment of a call connection between UserM and UserN at time $t_2$ and the establishment of a call connection between UserO and UserP at time $t_3$, they are executed by the CPU 11 of the connection control device 1$a$ because the number of call connections does not exceed 8 indicating the maximum simultaneous connection limit in the congested state.

When the CPU 11 of the connection control device 1$a$ in the congested state receives an INVITE message for a call connection between the terminal devices 2 and 2 represented by UserQ and UserR at time $t_4$, it calculates the wait time as follows.

As the next reservation time, the CPU 11 of the connection control device 1$a$ in the congested state temporally stores a time very close to a forceful disconnection of call connections which have been established at time $t_4$. In the example shown in FIG. 11, when an INVITE message is received for a call connection between the terminal devices 2 and 2 represented by UserQ and UserR at time $t_4$, the time stored as the next reservation time is time $t_6$. Moreover, the CPU 11 of the connection control device 1$a$ in the congested state stores the available call counter for the next reservation time, and the available call counter for the next reservation time $t_6$ when the INVITE message is received for a call connection between the terminal devices 2 and 2 represented by UserQ and UserR is 6. This is because the number of call connections established continuously after disconnecting six call connections at time $t_6$ is 2 with respect to 8 indicating the maximum simultaneous connection limit in the congested state.

Therefore, for the INVITE message received for a call connection between the terminal devices 2 and 2 represented by UserQ and UserR, the CPU 11 of the connection control device 1$a$ in the congested state sets the reservation time at time $t_6$, stores the request as a reserved call, and calculates the time from the received time $t_4$ to the reservation time $t_6$ as the wait time.

After storing the reserved call for UserQ and UserR on the reservation list 132, the CPU 11 of the connection control device 1$a$ in the congested state stores time $t_6$ as the next reservation time and stores 5 as the available call counter for the reservation time $t_6$.

Similarly, for the next INVITE messages received at time $t_4$ for call connections between the terminal devices 2 and 2 represented by UserS and UserT, UserU and UserV, UserW and UserX, and UserY and UserZ, the CPU 11 of the connection control device 1$a$ in the congested state sets the reservation time at time $t_6$, stores these requests as reserved calls, and calculates the time from the received time $t_4$ to the reservation time $t_6$ as the wait time. In addition, the CPU 11 of the connection control device 1$a$ in the congested state subtracts 1 from the available call counter and stores the resulting number whenever storing a reserved call on the reservation list 132. Therefore, after the reserved call is stored for UserY and UserZ, 1 is stored as the available call counter for the next reservation time $t_6$.

Next, when the CPU 11 of the connection control device 1$a$ in the congested state receives an INVITE message for a call connection between the terminal devices 2 and 2 represented by User1 and User2 at time $t_5$, it calculates the wait time as follows.

The available call counter for the next reservation time $t_6$ is 1 when the INVITE message for a call connection between the terminal devices 2 and 2 represented by User1 and User2 is received. Therefore, the CPU 11 of the connection control device 1$a$ sets time $t_6$ as the reservation time for the INVITE message for the call connection between the terminal devices 2 and 2 represented by User1 and User2, stores the request as a reserved call, and calculates the time from the received time $t_5$ to the reservation time $t_6$ as the wait time.

The available call counter for the next reservation time $t_6$ becomes 0 after the CPU 11 of the connection control device 1$a$ in the congested state stores the reserved call for User1 and User2 on the reservation list, and it becomes impossible to further set time $t_6$ as a reservation time and store a reserved call on the reservation list 132. Therefore, the CPU 11 of the connection control device 1$a$ sets time $t_7$ as the next reservation time, and stores 1 as the available call counter for the reservation time $t_7$. This is because the number of call connections established continuously after disconnecting one call connection at time $t_7$ is 7 with respect to 8 indicating the maximum simultaneous connection limit in the congested state.

Next, when an INVITE message for a call connection between the terminal devices 2 and 2 represented by User3 and User4 is received at time $t_5$, the CPU 11 of the connection control device 1$a$ in the congested state calculates the wait time as follows.

The available call counter for the next reservation time $t_7$ is 1 when the INVITE message for a call connection between the terminal devices 2 and 2 represented by User1 and User2 is received. Therefore, the CPU 11 of the connection control device 1$a$ sets time $t_7$ as the reservation time for the INVITE message for a call connection between the terminal devices 2 and 2 represented by User3 and User4, stores the request as a reserved call, and calculates the time from the received time $t_5$ to the reservation time $t_7$ as the wait time.

After the CPU 11 of the connection control device 1$a$ in the congested state stores the reserved call for User3 and User4 on the reservation list 132, the available call counter for the next reservation time $t_7$ becomes 0, and it becomes impossible to further set the time $t_7$ as a reservation time and store a reserved call on the reservation list 132. Therefore, the CPU 11 of the connection control device 1$a$ sets time $t_8$ as the next reservation time and stores 1 as the available call counter for the reservation time $t_8$. This is because the number of call connections established continuously after disconnecting one call connection at time $t_8$ is 7 with respect to 8 indicating the maximum simultaneous connection limit in the congested state.

Next, when an INVITE message for a call connection between the terminal devices 2 and 2 represented by User5 and User6 is received at time $t_5$, the CPU 11 of the connection control device 1*a* in the congested state calculates the wait time as follows.

The available call counter for the next reservation time $t_8$ is 1 when the INVITE message for a call connection between the terminal devices 2 and 2 represented by User5 and User6 is received. Therefore, the CPU 11 of the connection control device 1*a* sets the time $t_8$ as the reservation time for the INVITE message for a call connection between the terminal devices 2 and 2 represented by User5 and User6, stores the request as a reserved call, and calculates the time from the received time $t_5$ to the reservation time $t_8$ as the wait time.

As described above, the CPU 11 of the connection control device 1*a* in the congested state finds the reservation time for a received INVITE message and calculates the wait time.

Next, by referring to a specific example, the following will explain the process of storing a reserved call on the reservation list 132 at S406 in the procedure performed by the CPU 11 of the connection control device 1*a* for an INVITE message received during the congested state shown in FIG. 10.

FIG. 12 is an explanatory view showing one example of a reservation list stored in the storage section 13 by the CPU 11 of the connection control device 1*a* in Embodiment 1. Stored on the reservation list 132 are the SIP addresses of the originating terminal devices 2 used by the source users, the SIP addresses of the destination terminal devices 2 used by the destination users, and the reservation times at which the establishment of call connections between the respective originating and destination terminal devices 2 and 2 becomes available. When the CPU 11 of the connection control device 1*a* receives an INVITE message during the congested state and tries to store the request as a reserved call, it finds a reservation time as shown in FIG. 11, reads the SIP address of the originating terminal device 2 and the SIP address of the destination terminal device 2 from the received INVITE message, and stores them on the reservation list 132. The following will explain FIG. 12 by abbreviating an SIP address identified by UserQ@west.net as UserQ and also abbreviating other SIP addresses in the same manner.

A reservation time stored when the CPU 11 of the connection control device 1*a* stores a reserved call on the reservation list 132 is a reservation time found as shown in FIG. 11. The example shown in FIG. 12 indicates that call connections between the terminal devices 2, 2 represented by UserQ and UserR, UserS and UserT, UserU and UserV, UserW and UserX, UserY and UserZ, and User1 and User2 are stored as reserved calls by setting time $t_6$ as the reservation time. Similarly, it is shown that a call connection between the terminal devices 2, 2 represented by User3 and User4 is stored as a reserved call by setting time $t_7$ as the reservation time, and that a call connection between the terminal devices 2, 2 represented by User5 and User6 is stored as a reserved call by setting time $t_8$ as the reservation time.

By reading the reservation list 132 stored as described above by using the functions of the call processing means 116 of the call controlling means 114, the CPU 11 of the connection control device 1*a* can determine that it is possible to establish call connections between the terminals devices 2, 2 represented by UserQ and UserR, UserS and UserT, UserU and UserV, UserW and UserX, UserY and UserZ, and User1 and User2 at time $t_6$.

In Embodiment 1, the connection control device 1*a* in the congested state calculates the connection available time and disconnects already established call connections, and, when the connection control device 1*a* receives an INVITE message directly from the originating terminal device 2, it further calculates the wait time and transmits a response message stating the wait time in the Call-After header to the originating terminal device 2 which transmitted the INVITE message. However, the present embodiment is not limited to this structure, and it may be possible to adopt a structure in which, when the connection control device 1*b* to which the connection control device 1*a* transfers the INVITE message falls into a congested state instead of the connection control device 1*a* which received the INVITE message directly from the originating terminal device 2, the connection control device 1*b* calculates a connection available time and disconnects already established call connections, and further calculates the wait time and transmits a response message stating the wait time to the connection control device 1*a*. In this case, the connection control device 1*a* which received the response message stating the wait time transmits the response message to the originating terminal device 2.

Embodiment 2

In Embodiment 1, the CPU 11 of the connection control device 1*a* in the congested state performs the process of storing a reserved call on the reservation list 132 for a received INVITE message. In Embodiment 2, the CPU 11 of the connection control device 1*a* automatically performs the process of establishing a call connection corresponding to a reserved call after the elapse of the wait time, based on the reservation time stored on the reservation list 132.

Since the hardware structure of a telephony system in Embodiment 2 is similar to that in Embodiment 1, the explanation thereof will be omitted. By using the same codes as in Embodiment 1, the following will explain about a process in which the connection control device 1*a* automatically establishes a call connection based on the stored reservation list 132.

Figure 13:
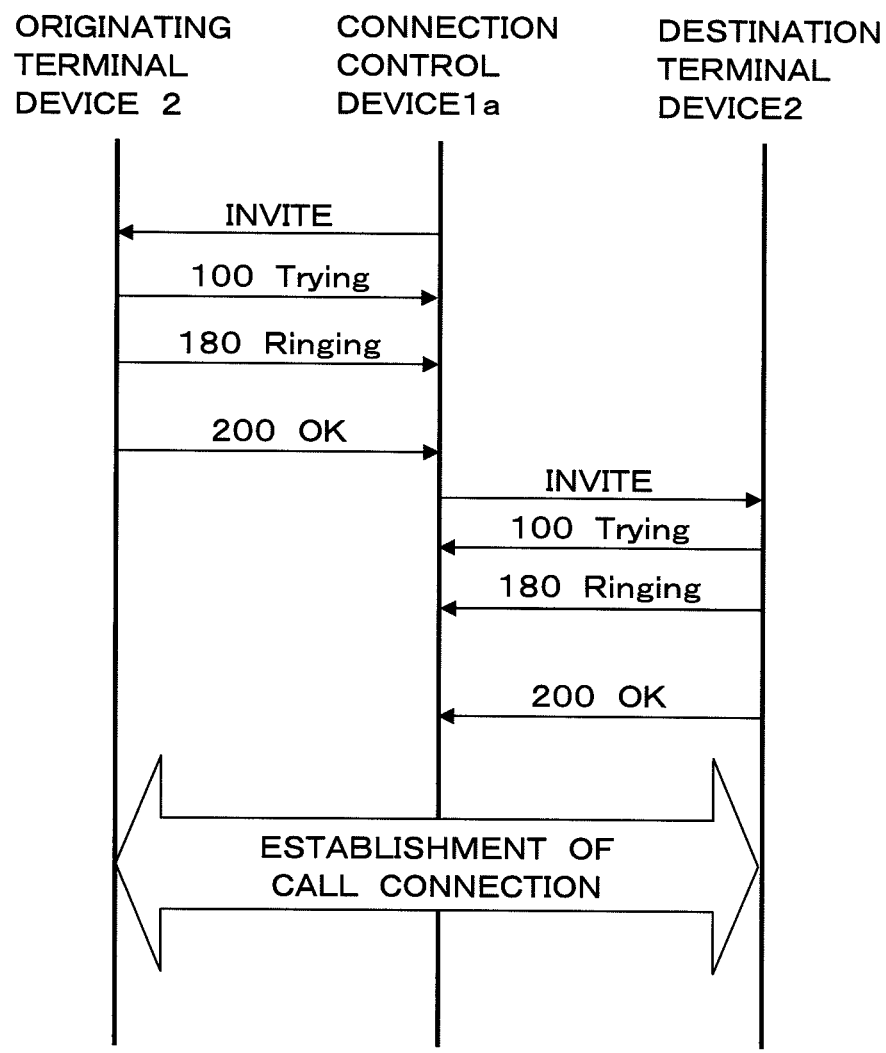
FIG. 13 is a sequence view showing a flow of messages exchanged between a connection control device and a terminal devices in a telephony system of Embodiment 2 until a call connection is established between the originating terminal device and destination terminal device of a reserved call after the elapse of the wait time.

FIG. 13 is a sequence view showing a flow of messages exchanged between the connection control device 1*a* and the terminal devices 2, 2 in the telephony system of Embodiment 2 until a call connection is established between the originating terminal device 2 and the destination terminal device 2 of a reserved call after the elapse of the wait time. For one reserved call stored on the reservation list 132, when the CPU 11 of the connection control device 1*a* determines that the wait time has elapsed after receiving the INVITE message and the reservation time has come, it creates an INVITE message by designating the connection control device 1*a* as the source and the originating terminal device 2 as the destination by using the function of the SIP message creating means 117. The CPU 11 of the connection control device 1*a* transmits the created INVITE message to the originating terminal device 2 of the reserved call.

The CPU 21 of the originating terminal device 2 which received the INVITE message transmits a response message indicating "100" according to the SIP rules to the connection control device 1*a*, and further transmits a response message indicating "180" representing ringing to the connection control device 1*a*. When the CPU 21 of the originating terminal device 2 detects through the operation section 24 that the user of the originating terminal device 2 has performed an operation in response to the incoming call, it transmits a response message indicating "200" to the connection control device 1*a*. In the body of the response message indicating "200", a port number of the originating terminal device 2 for exchanging RTP packets is described according to SDP. Hence, the CPU 11 of the connection control device 1a which received the response message indicating "200" from the originating terminal device 2 can read the port number of the originating terminal device 2 from the message body by using the function of the call processing means 116.

Moreover, the CPU 11 of the connection control device 1a which received the response message indicating "200" from the originating terminal device 2 transmits an INVITE message to the destination terminal device 2 of the reserved call. The CPU 21 of the destination terminal device 2 transmits response messages indicating "100" and "180" to the connection control device 1a. When the CPU 21 detects the user's responding operation, it notifies the port number for exchanging RTP packets by transmitting a response message indicating "200" to the connection control device 1a.

Thus, for the reserved call stored on the reservation list 132, a call connection is established between the originating terminal device 2 and the destination terminal device 2 after the elapse of the wait time. The call connection is disconnected when the ports for exchanging RTP packets of the originating terminal device 2 and the destination terminal device 2 are closed by a transmission of a BYE message from either of the terminal devices 2, and processing is finished.

Figure 14:
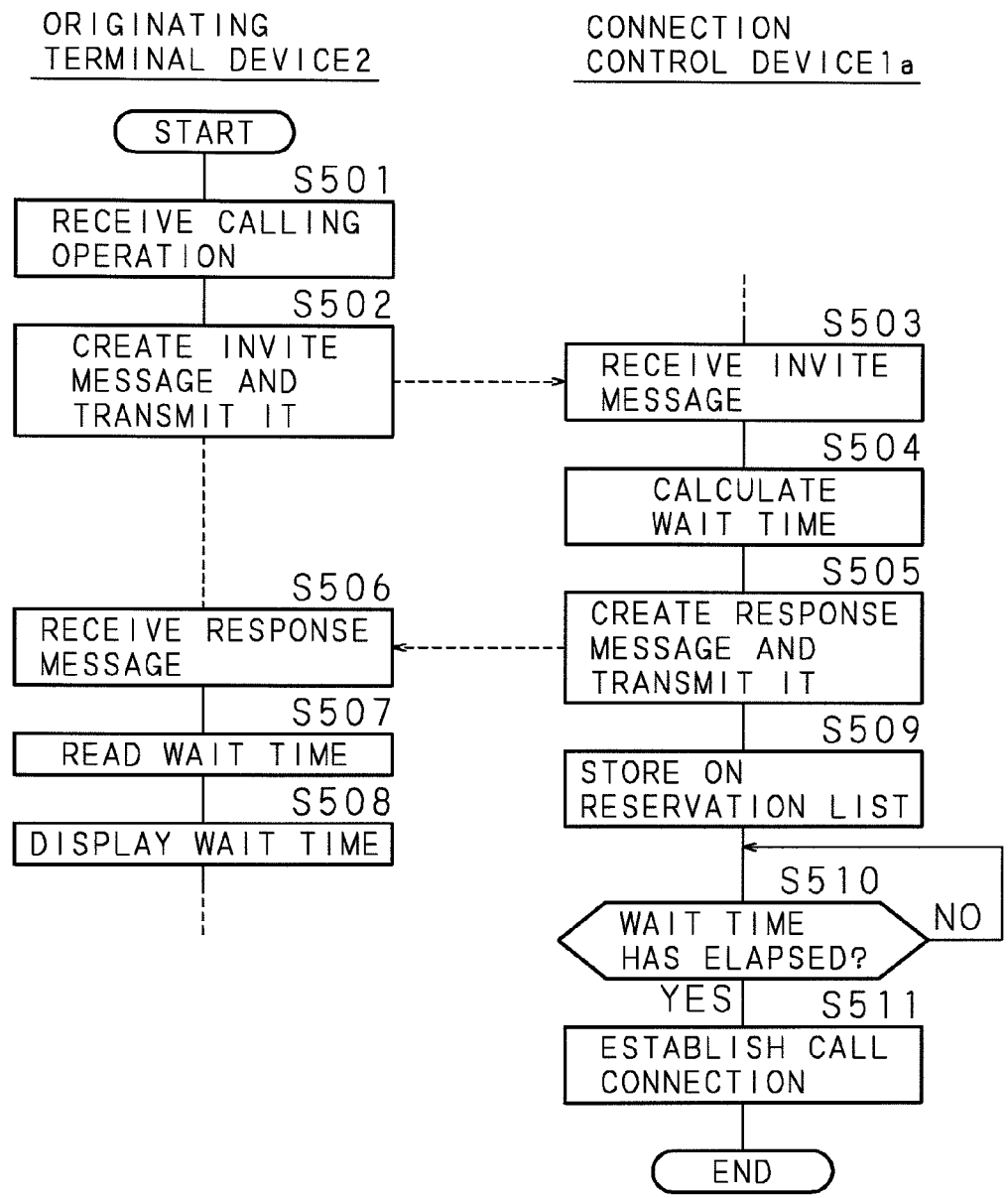
FIG. 14 is a flowchart showing the procedure to be performed by the CPU of the connection control device to establish a call connection when the wait time elapses after receiving an INVITE message from one terminal device during a congested state in the telephony system of Embodiment 2.

Next, the following will explain the procedure to be performed by the CPU 11 of the connection control device 1a to establish a call connection after the elapse of the wait time since the reception of an INVITE message from one terminal device 2 when the connection control device 1a is in a congested state. FIG. 14 is a flowchart showing the procedure for establishing a call connection after the wait time when the CPU 11 of the connection control device 1a in a congested state receives an INVITE message from one terminal device 2 in telephony system of Embodiment 2.

The user of one terminal device 2 performs a calling operation to communicate with other user using other terminal device 2 by inputting the phone number or account unique to the called user, or the SIP address of the other terminal device 2 used by the called user. The CPU 21 of the one terminal device 2 receives the user's calling operation executed by the input of the SIP address, phone number or account (step S501), creates an INVITE message based on the received SIP address of the other terminal device 2, and transmits the INVITE message to the connection control device 1a through the communication section 27 (step S502).

The CPU 11 of the connection control device 1a receives the INVITE message through the communication section 15 (step S503). Since a restriction start signal was received from the congestion determining means 111 through the call processing means 116 and a determination was made that the connection control device 1a is in a congested state, the CPU 11 of the connection control device 1a does not perform the process of establishing a call connection. The CPU 11 of the connection control device 1a calculates a wait time until a reservation time at which the process of establishing a call connection becomes available for the received INVITE message (step S504). By using the function of the SIP message creating means 117, the CPU 11 of the connection control device 1a creates a response message with "503" stating the calculated wait time in the Call-After header in the header section, and transmits it to the originating terminal device 2 through the communication section 15 (step S505).

The CPU 21 of the terminal device 2 receives the response message transmitted from the connection control device 1a through the communication section 27 (step S506), reads the wait time stated in the Call-After header in the header section of the response message (step S507), and displays it on the monitor of the display section 26 so that the user can see the wait time (step S508).

On the other hand, the CPU 11 of the connection control device 1a stores on the reservation list 132 the SIP addresses of the originating terminal device 2 and the destination terminal device 2 and the reservation time read from the received INVITE message by the function of the call controlling means 114 (step S509). The CPU 11 of the connection control device 1a obtains the time from the timer section 14, and determines whether or not the wait time has elapsed after receiving the INVITE message, based on whether or not the reservation time has come (step S510). When the CPU 11 of the connection control device 1a determines that the wait time has not elapsed (S510: NO), it returns to the process in step S510 and repeats the process until a determination is made that the wait time has elapsed. At this time, the repetition cycle is determined at certain time intervals of, for example, 0.5 seconds.

When the CPU 11 of the connection control device 1a determines that the wait time has elapsed (S510: YES), it transmits an INVITE message to the originating terminal device 2 of the reserved call and performs the process of establishing a call connection by further transmitting the INVITE message to the destination terminal device 2 when it receives a response message (step S511).

Thus, when the user of the originating terminal device 2 obtains information about the wait time without establishing a call connection for a connection request, a call connection will be automatically established with respect to the user's connection request after the wait time elapses and the reservation time comes. Therefore it is not necessary for the user to call again by himself or herself. Moreover, since call connections are automatically established in the order in which the INVITE messages are received by the connection control device 1a, it is possible to solve unequal opportunity to establish calls among users.

Embodiment 3

Figure 15:
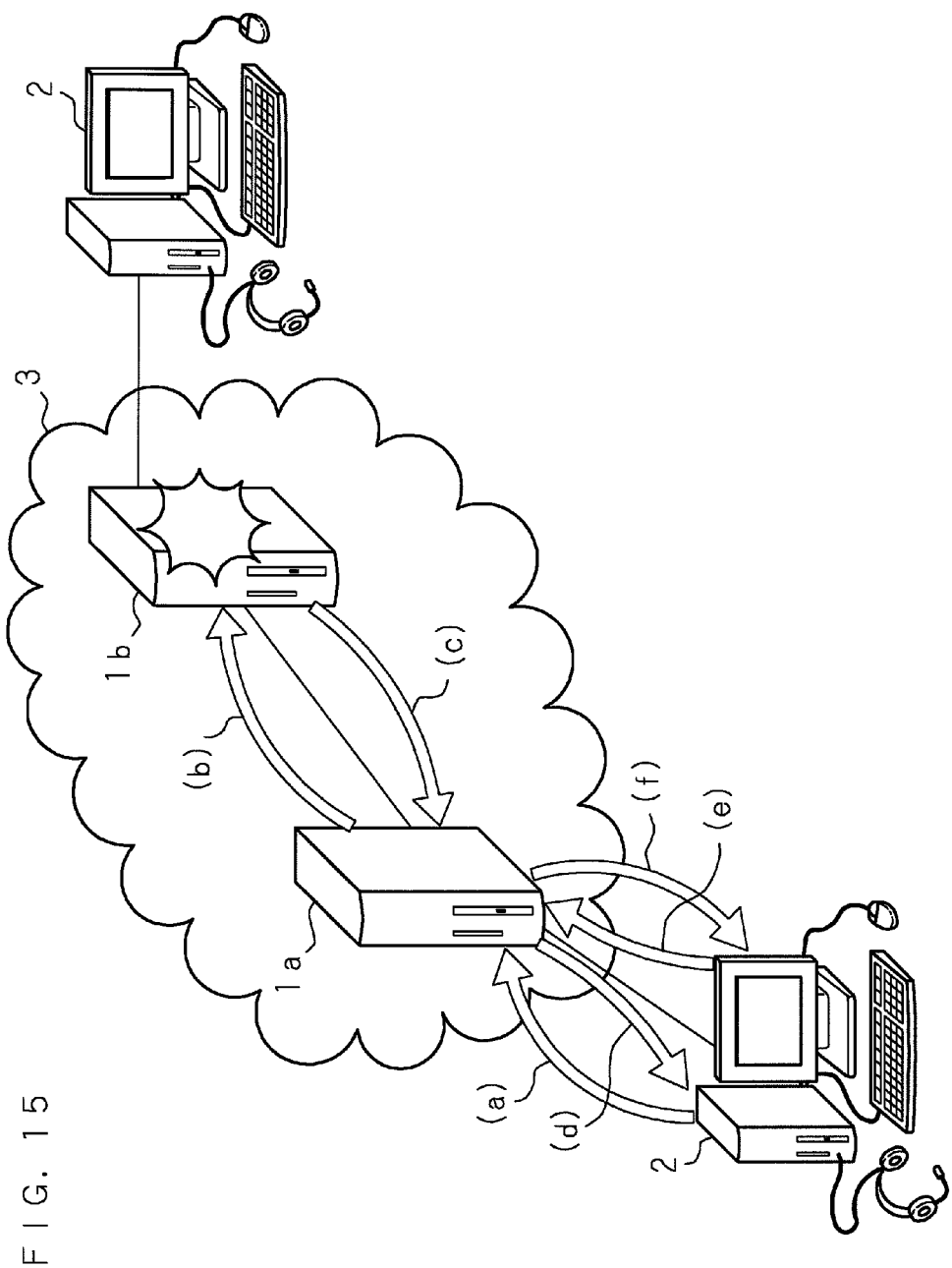
FIG. 15 is an explanatory view showing conceptually a process in which when a connection control device in a telephony system of Embodiment 3 is in a congested state, other connection control device discards a connection request from a terminal device.

In Embodiment 3, after storing reserved calls for INVITE messages received during a congested state, the connection control devices 1a, 1b, 1c, . . . discard INVITE messaged received again. FIG. 15 is an explanatory view showing conceptually a process in which, when the connection control device 1b in a telephony system of Embodiment 3 is in a congested state, other connection control device 1a discards a connection request from the terminal device 2. In Embodiments 1 and 2, when one terminal device 2 transmits an INVITE message as a connection request to other terminal device 2 as shown by (a) in FIG. 15, the connection control device 1a on the route of the INVITE message transmits the INVITE message to the connection control device 1b as shown by (b) in FIG. 15. Moreover, since the connection control device 1b is in the congested state, it stores a reserved call for the received INVITE message and transmits a calculated wait time as shown by (c) in FIG. 15. The connection control device 1a transmits the received wait time to the originating terminal device 2 as shown by (d) in FIG. 15.

In Embodiment 3, the connection control device 1a on the route of the INVITE message stores information about the reserved call, which was stored on the reservation list 132 by the connection control device 1b in the congested state, as restriction information based on the notice of the wait time from the connection control device 1b in the congested state. As shown by (e) in FIG. 15, when an INVITE message is transmitted from the originating terminal device 2 before the wait time elapses, the CPU 11 of the connection control device 1a in Embodiment 3 discards the received INVITE message without transmitting it to the connection control device 1b. In this case, as shown by (f) in FIG. 15, the CPU 11 of the connection control device 1a transmits information indicating that the INVITE message was discarded. The connection control device 1a near the originating terminal device 2 discards the INVITE message if the SIP addresses of the originating and destination terminal devices 2 and 2 of the received INVITE message respectively match the SIP addresses of the originating and destination terminal devices 2 and 2 of a reserved call stored as the restriction information and if the INVITE message was received before the reservation time.

Since the hardware structure of the telephony system in Embodiment 3 is similar to that in Embodiment 1, the detailed explanation thereof will be omitted. By using the same codes as in Embodiment 1, the following will explain the process of discarding the INVITE message transmitted again when any one of the connection control devices 1a, 1b, 1c, ... on the route of an SIP message is in a congested state.

As illustrated in Embodiments 1 and 2, when the CPU 11 of the connection control device 1a receives an INVITE message from one terminal device 2 and stores it on the reservation list 132 without establishing a call connection, it notifies wait time information. In order to notify the wait time information, the CPU 11 of the connection control device 1a transmits a response message indicating "503" describing the Call-After header. Therefore, the connection control device 1a can detect the fact that other connection control devices 1b, 1c, ... are in the congested state because a response message received in response to the transfer of the INVITE message received from the originating terminal device 2 is a response message indicating "503" and describes the Call-After header in the header section.

Accordingly, when the CPU 11 of the connection control device 1a receives a response message with "503" describing the Call-After header, it reads from the response message by using the function of the call controlling means 114 the SIP addresses of the originating terminal device 2 and destination terminal device 2 and the wait time for the reservation call stored on the reservation list 132 by other connection control devices 1b, 1c, ... in the congested state. Then, the CPU 11 of the connection control device 1a stores the read SIP addresses of the originating terminal device 2 and destination terminal device 2 and the reservation time calculated from the wait time as restriction information in the storage section 13. The CPU 11 of the connection control device 1a discards an INVITE message corresponding to a call connection matching a call connection between the terminal devices 2 and 2 corresponding to the stored restriction information.

Moreover, when the wait time corresponding to the call connection stored as the restriction information has elapsed and the reservation time comes, the CPU 11 of the connection control device 1a deletes the information stored as the restriction information, so that the corresponding INVITE message is not discarded.

In Embodiment 3, when the CPU 11 of the connection control device 1a discards an INVITE message before elapse of the wait time, it returns a response message indicating "503" in the same manner as in notifying the wait time in Embodiments 1 and 2. In this case, the CPU 11 of the connection control device 1a transmits a response message with "503" stating the wait time until the reservation time in the Call-After header in the same manner as in notifying the wait time in Embodiment 1. At this time, the Retry-After header is not used. Since it is provided that communications shall be entirely restricted to a device which transmitted an error message using the Retry-After header, the Retry-After header does not meet the purpose of restricting calls by identifying the SIP address of the originating terminal device 2 and the SIP address of the destination terminal device 2 for each call. Further, in order to use the Retry-After header for controlling each call in this embodiment, it is necessary to change the interpretation of the Retry-After header, and therefore the use of the Retry-After header is not practical.

Figure 16:
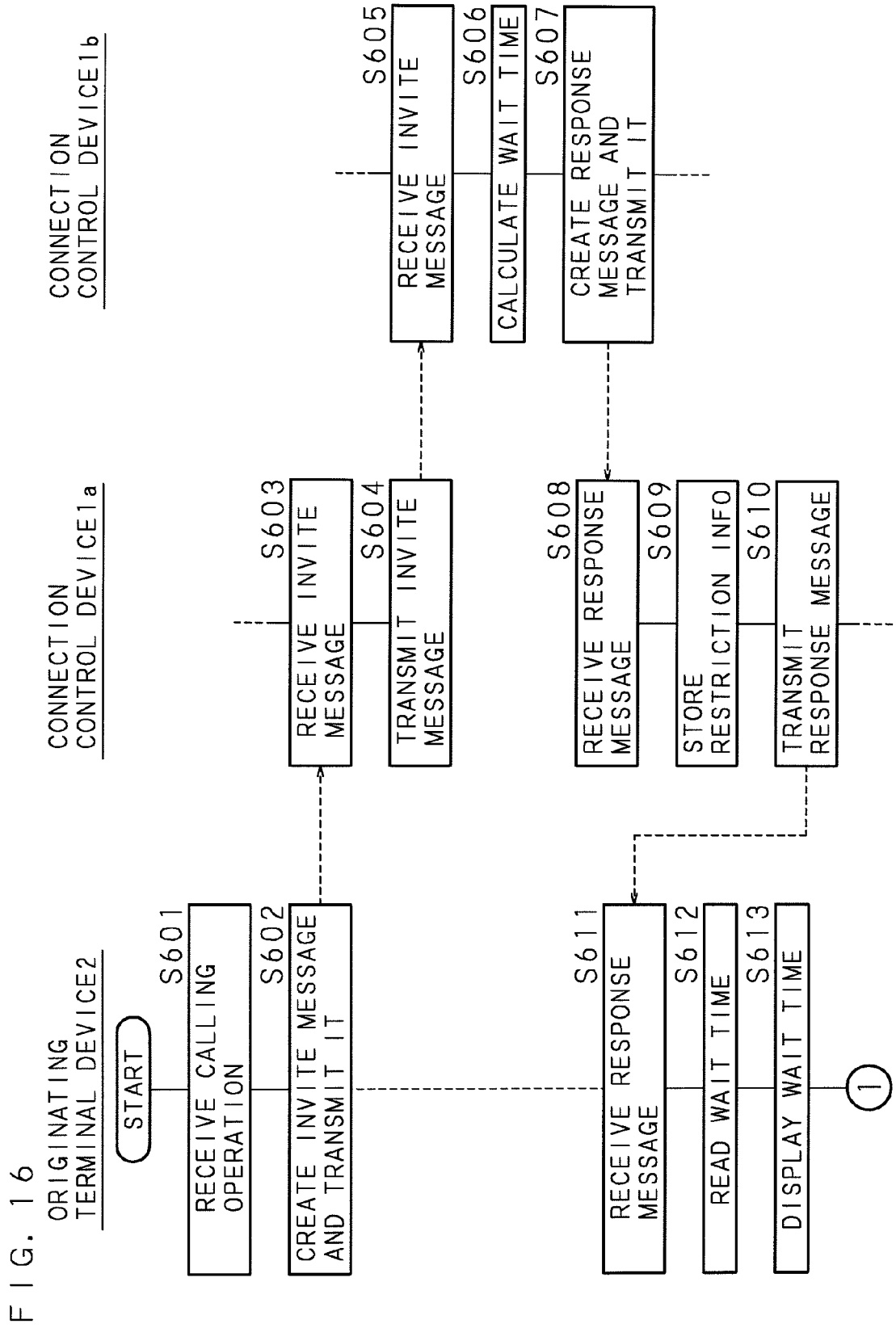
FIG. 16 is a flowchart showing the procedure to be performed by the CPU of the connection control device to discard an INVITE message corresponding to a call connection matching a reserved call stored in other connection control device in a congested state in the telephony system of Embodiment 3.
Figure 17:
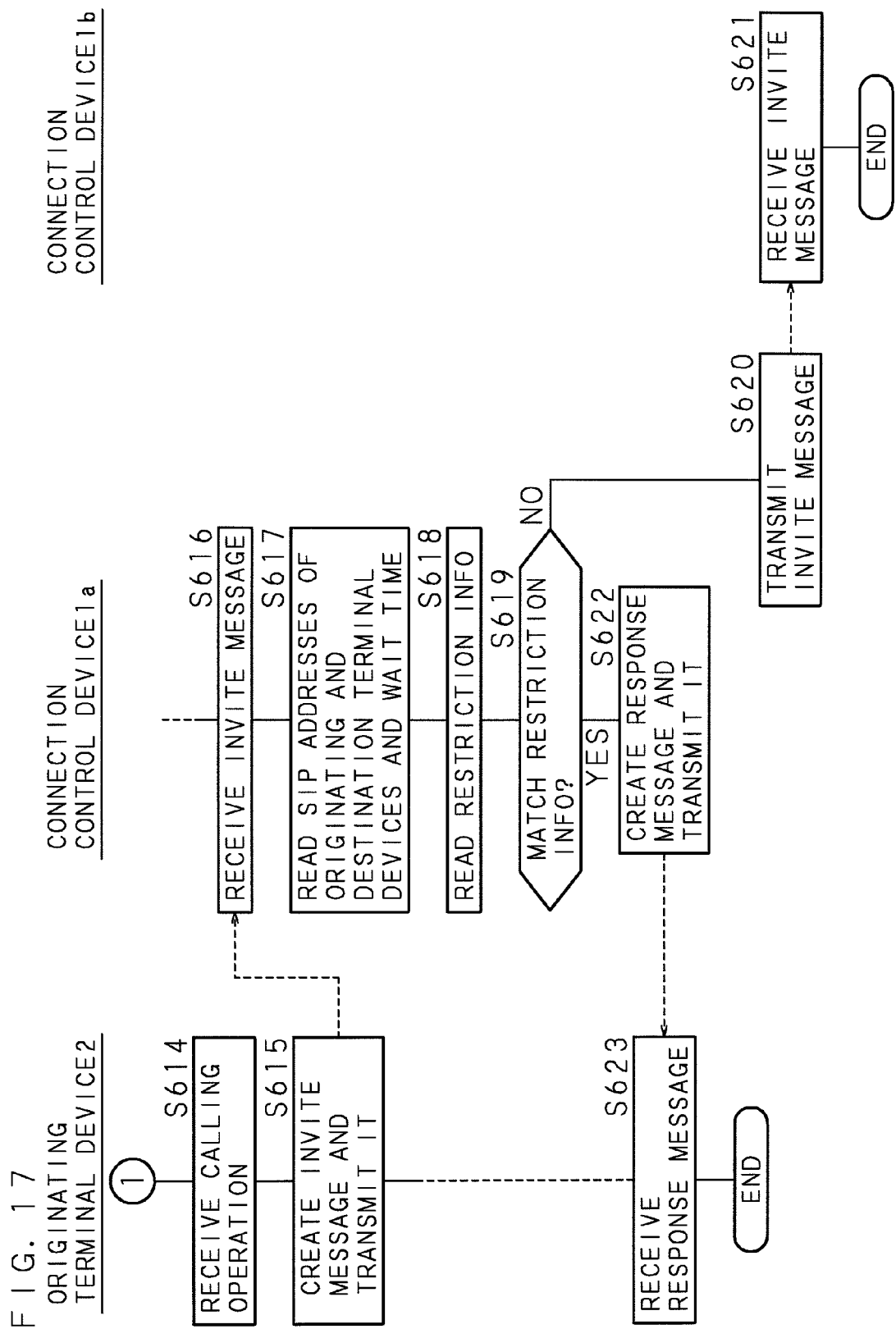
FIG. 17 is a flowchart showing the procedure to be performed by the CPU of the connection control device to discard an INVITE message corresponding to a call connection matching a reserved call stored in other connection control device in a congested state in the telephony system of Embodiment 3.

Next, the following will explain the process of discarding an INVITE message from the originating terminal device 2 by the connection control device 1a when the connection control device 1b is in a congested state among the connection control devices 1a, 1b and 1c on the route of the INVITE message from one terminal device 2 to other terminal device 2 in the telephony system of Embodiment 3. FIGS. 16 and 17 are a flowchart showing the procedure performed by the CPU 11 of the connection control device 1a to discard an INVITE message corresponding to a call connection matching a reserved call stored in other connection control device 1b in a congested state in the telephony system of Embodiment 3.

The CPU 21 of the one terminal device 2 receives a user's calling operation executed by the input of the SIP address, phone number or account (step S601), creates an INVITE message based on the received SIP address of other terminal device 2, and transmits the INVITE message to the connection control device 1a through the communication section 27 (step S602). The CPU 11 of the connection control device 1a receives the INVITE message through the communication section 15 (step S603), specifies the destination of the INVITE message, and transmits the INVITE message to the connection control device 1b through the connection section 15 (step S604).

The CPU 11 of the connection control device 1b receives the INVITE message through the communication section 15 (step S605). Since a restriction start signal was received from the congestion determining means 111 through the call processing means 116 and a determination was made that the connection control device 1a is in the congested state, the CPU 11 of the connection control device 1b does not perform the process of establishing a call connection, and calculates a wait time until a reservation time at which the process of establishing a call connection becomes available for the received INVITE message (step S606). By using the function of the SIP message creating means 117, the CPU 11 of the connection control device 1b creates a response message with "503" stating the calculated wait time in the Call-After header in the header section, and transmits it to the connection control device 1a through the communication section 15 (step S607).

The CPU 11 of the connection control device 1a receives the response message indicating "503" (step S608), and stores the reservation time calculated based on the SIP addresses of the originating and destination terminal devices 2 and 2 and the wait time obtained from the received response message indicating "503" as the restriction information in the storage section 13 (step S609). The CPU 11 of the connection control device 1a transmits the response message indicating "503" to the originating terminal device 2 through the communication section 15 (step S610).

The CPU 21 of the originating terminal device 2 receives the response message indicating "503" through the communication section 27 (step S611), reads the wait time from the Call-After header in the received response message indicating "503" (step S612), and displays it on the monitor of the display section 26 so that the user can see the wait time (step S613).

Thereafter, even though the displayed wait time has not elapsed and the reservation time has not come, the user may sometimes perform a calling operation. In this case, the CPU 21 of the originating terminal device 2 receives the user's calling operation (step S614), creates an INVITE message for the received calling operation, and transmits it to the connection control device 1*a* through the communication section 27 (step S615).

The CPU 11 of the connection control device 1*a* receives the INVITE message through the communication section 15 (step S616), and reads the SIP addresses of the originating and destination terminal devices 2 and 2 and the wait time from the header section of the INVITE message (step S617). The CPU 11 of the connection control device 1*a* reads the restriction information stored in the storage section 13 (step S618), and determines whether or not the SIP addresses of the originating and destination terminal devices 2 and 2 read from the received INVITE message match the SIP addresses of the originating and destination terminal devices 2 and 2 stored as the restriction information (step S619). When a determination is made that neither of the read SIP addresses of the originating and destination terminal devices 2 and 2 matches the SIP addresses of the originating and destination terminal devices 2 and 2 stored as the restriction information (S619: NO), the CPU 11 of the connection control device 1*a* transmits the INVITE message to the connection control device 1*b* through the communication section 15 (step S620). The CPU 11 of the connection control device 1*b* receives the INVITE message (step S621), transmits a response message indicating "503" to the connection control device 1*a* if it is in the congested state, or transmits the INVITE message to the destination terminal device 2, establishes a call connection and finishes processing if it is in the normal state.

When a determination is made that both of the read SIP addresses of the originating and destination terminal devices 2 and 2 match the SIP addresses of the originating and destination terminal devices 2 and 2 stored as the restriction information (S619: YES), the CPU 11 of the connection control device 1*a* transmits a response message indicating "503" to the originating terminal device 2 to discard the INVITE message (step S622). The CPU 21 of the originating terminal device 2 receives the response message indicating "503" to discard the INVITE message (step S623), and finishes processing.

Thereafter, before the wait time elapses and the reservation time comes, if the originating terminal device 2 transmits an INVITE message as a connection request to the same destination terminal device 2, the connection request is discarded by transmitting the response message indicating "503" from the connection control device 1*a*. Thus, since the received INVITE message is not transmitted to the connection control device 1*b* in the congested state, unnecessary transmission and reception are not performed, and it is possible to recover from the congested state early.

Embodiment 3 is illustrated as a structure in which the subscriber information 131 and restriction information are stored in the storage sections 13 of the connection control devices 1*a*, 1*b*, 1*c*, . . . . However, the present embodiment is not limited to this and may further comprise another device for storing the subscriber information so that the device for storing the subscriber information stores the restriction information. In this case, the device for storing the subscriber information writes or reads the restriction information upon a write request or a read request from the connection control devices 1*a*, 1*b*, 1*c*, . . . .

Embodiment 4

In a telephony system of Embodiment 4, a subscriber information storing device for storing the subscriber information 131 and restriction information which are stored in the storage sections 13 of the connection control devices 1*a*, 1*b*, 1*c*, . . . in Embodiment 3 is provided separately from the connection control devices 1*a*, 1*b*, 1*c*, . . . . Hence, when the connection control device 1*a* in the congested state stores a reserved call, if it stores the reserved call as restriction information in the subscriber information storing device, it is also possible to read the reserved call as the restriction information from other connection control devices 1*b*, 1*c*, . . . .

Figure 18:
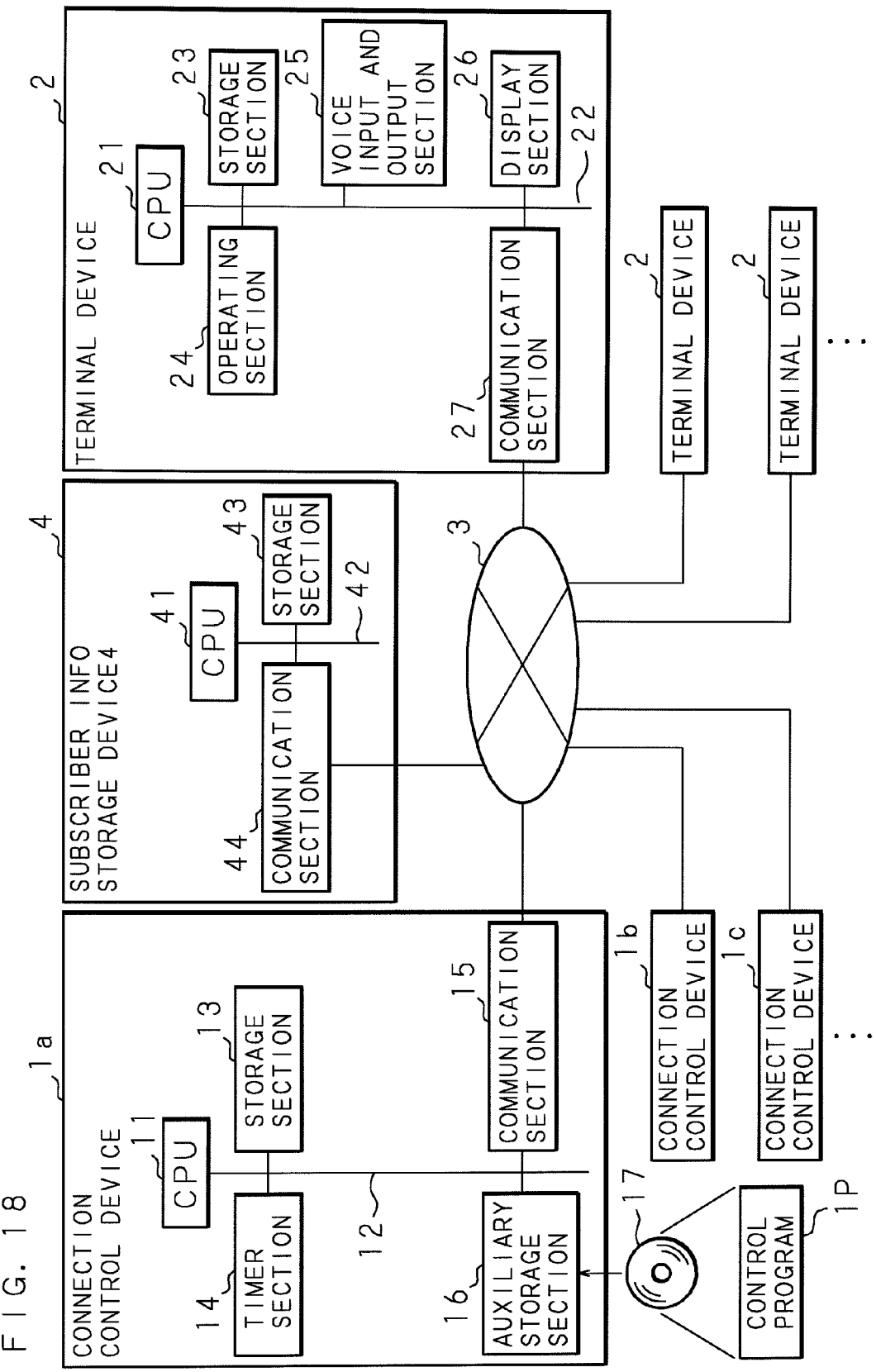
FIG. 18 is a block diagram showing the structure of a telephony system of Embodiment 4.

FIG. 18 is a block diagram showing the structure of the telephony system of Embodiment 4. The telephony system of Embodiment 4 is composed of connection control devices 1*a*, 1*b*, 1*c*, . . . , terminal devices 2, 2, . . . , a packet switched network 3, and a subscriber information storing device 4. Since the hardware structures of the connection control devices 1*a*, 1*b*, 1*c*, . . . , and terminal devices 2, 2, . . . are the same as in Embodiment 1, the explanation thereof will be omitted, and the same codes as in Embodiment 1 will be used for explanations.

The subscriber information storing device 4 constituting the telephony system in Embodiment 4 is a server computer having a packet switching function in the packet switched network 3. The subscriber information storing device 4 is connected to the packet switched network 3 and can communicate with the connection control devices 1*a*, 1*b*, 1*c*, . . . .

The subscriber information storing device 4 comprises at least a CPU 41 for controlling the entire device, an internal bus 42 for connecting later-described hardware devices, a storage section 43 for storing the subscriber information and restriction information, and a communication section 44 (receiving section, transmitting section) for connecting to the packet switched network 3. The subscriber information storing device 4 stores in the storage section 43 the subscriber information indicating the corresponding relation between the SIP addresses and phone numbers of users of an IP telephone service in association with the IP addresses of the terminal devices 2, 2, . . . used by the users. Further, the subscriber information storing device 4 stores the restriction information in the storage section 43. In Embodiment 3, the restriction information is information which is stored on the reservation list 132 in the storage section 13 by the connection control device 1*b* in a congested state and further stored in the storage section 13 by the connection control device 1*a*, and includes the SIP addresses of the originating and destination terminal devices 2 and 2 and the reservation time.

When the CPU 41 of the subscriber information storing device 4 receives a read request for the subscriber information from the connection control devices 1*a*, 1*b*, 1*c*, . . . through the communication section 44, it transmits the subscriber information stored in the storage section 43 to the connection control devices 1*a*, 1*b*, 1*c*, . . . through the communication section 44. When the CPU 41 receives a write request for the subscriber information from the connection control devices 1*a*, 1*b*, 1*c*, . . . through the communication section 44, it stores the subscriber information in the storage section 43.

Moreover, the subscriber information storing device 4 stores the reservation times of reserved calls stored on the reservation list 132 in the storage sections 13 of the connection control devices 1*a*, 1*b*, 1*c*, . . . and the SIP addresses of the originating and destination terminal devices 2 and 2 in the storage section 43 as restriction information for discarding INVITE messages corresponding to connection requests matching the reserved calls. When the CPU 41 of the subscriber information storing device 4 receives restriction information write requests from the connection control devices 1*a*, 1*b*, 1*c*, . . . through the communication section 44, it stores them. Further, in response to restriction information read requests from the connection control devices 1a, 1b, 1c, ..., the CPU 41 of the subscriber information storing device 4 transmits the restriction information to the connection control devices 1a, 1b, 1c, ... through the communication section 44. Thus, the connection control devices 1a, 1b, 1c can read the restriction information from the subscriber information storing device 4.

Since the connection control device 1a is in the congested state, it can not perform the call connection process even when it receives an INVITE message. Therefore, the CPU 11 of the connection control device 1a gives a notice to the originating terminal device 2 to transmit the INVITE message to other connection control device 1b without transmitting the message to the connection control device 1a by using the function of call processing means 116 of the call controlling means 114. SIP provides that a response message indicating with the status code "302" (hereinafter referred to as a response message indicating "302") that the INVITE message should be transmitted to other connection control device 1b shall be transmitted in order to notify that the INVITE message should be transmitted to the other connection control device 1b.

FIG. 19 is an explanatory view showing one example of a response message transmitted to the originating terminal device 2 when the connection control device 1a of Embodiment 4 is in the congested state. In the first line shown by (a) in FIG. 19, "302 Moved Temporarily" representing the title of the response message is described. In the header section, the SIP address of other connection control device 1b to which the INVITE message should be transmitted first when retransmitting the INVITE message is described in the Contact header shown by (b) in FIG. 19. The connection control device 1a transmits the response message indicating "302" describing the SIP address of the connection control device 1b in the Contact header in response to the INVITE message received during the congested state. It is thus possible to control a message so as not to be transmitted to the connection control device 1a in the congested state from the originating terminal device 2 which received the response message indicating "302".

In the example shown in FIG. 19, it is shown that when retransmitting the INVITE message with respect to the INVITE message transmitted from UserQ@west.net, a connection control device to which the INVITE message should be transmitted first needs to be changed from the connection control device 1a identified by the SIP address 192.168.2.130 represented by the name of west.net to the connection control device 1b identified by the SIP address 192.168.5.180. Therefore, in the Contact header shown by (b) in FIG. 19, it is indicated that the terminal device 2 used by UserQ has been changed to belong to the same network as the connection control device 1b identified by the SIP address 192.168.5.180. Thereafter, the terminal device 2 used by UserQ is identified by the SIP address UserQ@192.168.5.180, instead of the SIP address UserQ@west.net.

Meanwhile, in the connection control device 1a in the congested state, reserved calls have already been stored on the reservation list 132. In other words, the CPU 11 of the connection control device 1a stores the SIP addresses of the originating and destination terminal devices 2 and 2 of the INVITE message received from the originating terminal device 2 and the reservation time as a reserved call on the reservation list 132 in the storage section 13. At this time, the CPU 11 of the connection control device 1a stores the restriction information in the subscriber information storage device 4 by transmitting a reservation information write request to the subscriber information storage device 4 through the communication section 15. When other connection control devices 1b, 1c, ... receive the INVITE message through the communication sections 15, they obtain the restriction information by transmitting a read request to the subscriber information storage device 4, and discard the INVITE message if a call connection corresponding to the received INVITE message matches a call connection corresponding to a reserved call included in the obtained restriction information.

Figure 20:
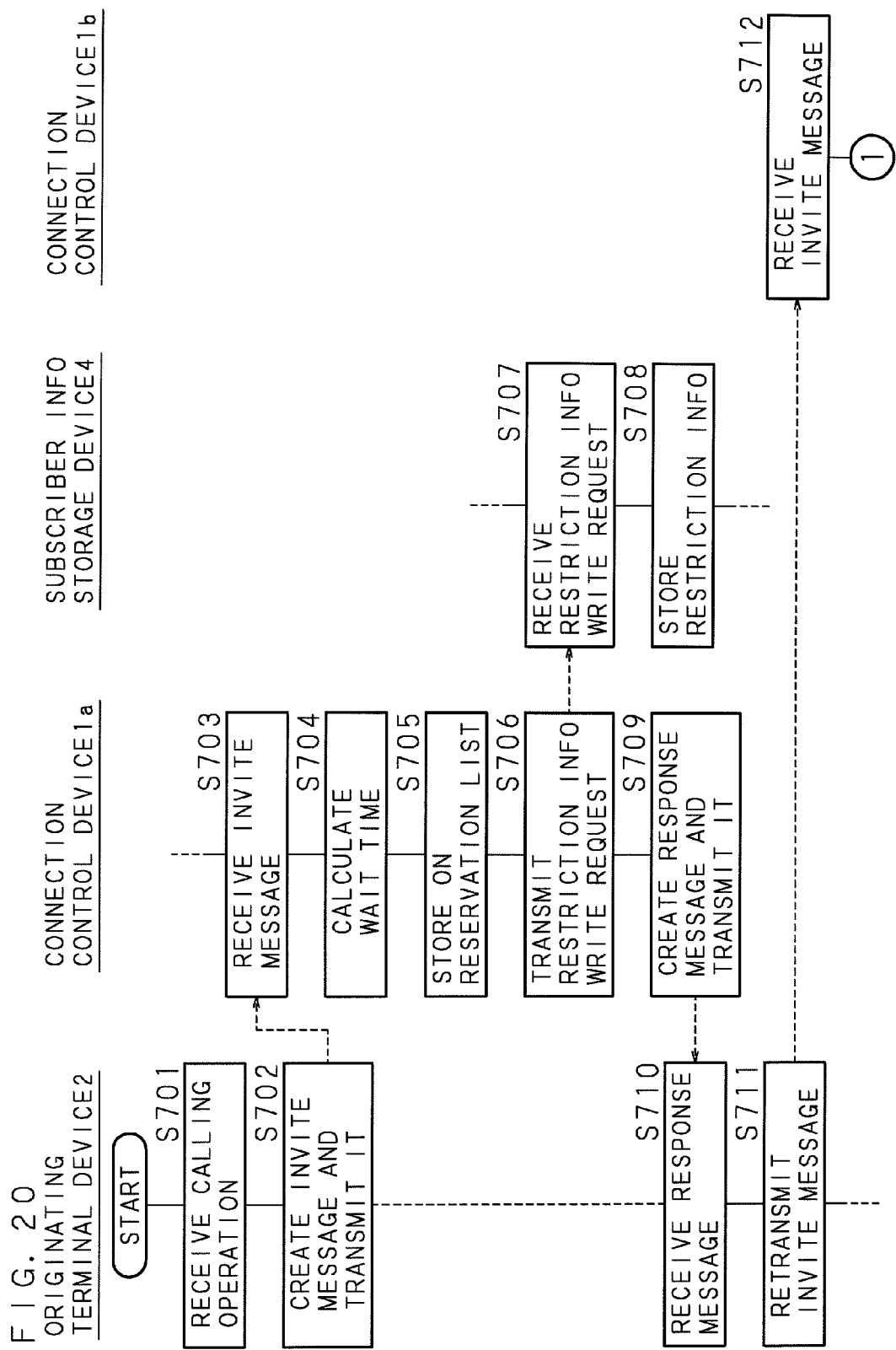
FIG. 20 is a flowchart showing the procedure for discarding a connection request based on restriction information in a terminal device, a connection control device and a subscriber information storing device of the telephony system of Embodiment 4.

FIGS. 20 and 21 are a flowchart showing the procedure for discarding a connection request based on restriction information in the terminal devices 2, 2, ..., the connection control devices 1a, 1b, and the subscriber information storing device 4 in the telephony system of Embodiment 4.

The user of one terminal device 2 performs a calling operation to communicate with other user using other terminal device 2 by inputting the phone number or account unique to the called user, or the SIP address of the other terminal device 2 used by the called user. The CPU 21 of the one terminal device 2 receives the user's calling operation executed by the input of the SIP address, phone number or account (step S701), creates an INVITE message based on the received SIP address of the other terminal device 2, and transmits the INVITE message to the connection control device 1a through the communication section 27 (step S702). The CPU 11 of the connection control device 1a receives the INVITE message through the communication section 15 (step S703).

Since a restriction start signal was received from the congestion determining means 111 through the call processing means 116 and a determination was made that the connection control device 1a is in the congested state, the CPU 11 of the connection control device 1a does not perform the process of establishing a call connection. The CPU 11 of the connection control device 1a calculates a wait time until a reservation time at which the process of establishing a call connection becomes available for the received INVITE message (step S704). By using the function of the call processing means 116, the CPU 11 of the connection control device 1a stores a reserved call on the reservation list 132 for the received INVITE message (step S705). The CPU 11 of the connection control device 1a transmits a write request to the subscriber information storing device 4 through the communication section 15 to store the SIP addresses of the originating terminal device 2 and destination terminal device 2 and the reservation time obtained from the received INVITE message as restriction information (step S706).

The CPU 41 of the subscriber information storing device 4 receives the restriction information write request through the communication section 44 (step S707), and stores the restriction information in the storage section 43 (step S708).

After transmitting the restriction information write request to the subscriber information storing device 4, the CPU 11 of the connection control device 1a creates a response message indicating "302" to cause the originating terminal device 2 to transmit the INVITE message to other connection control device 1b by using the function of the SIP message creating means 117, and transmits it to the originating terminal device 2 through the communication section 15 (step S709).

The CPU 21 of the originating terminal device 2 receives the response message indicating "302" through the communication section 27 (step S710), reads the SIP address of the connection control device 1b from the description in the Contact header, and retransmits the INVITE message to the connection control device 1b through the communication section 27 (step S711).

The CPU 11 of the connection control device 1b receives the INVITE message from the originating terminal device 2 through the communication section 15 (step S712), and reads the SIP addresses of the originating and destination terminal device 2 and 2 and the wait time from the header section of the INVITE message (step S713). The CPU 11 of the connection control device 1b transmits a restriction information read request to the subscriber information storing device 4 through the communication section 15 (step S714).

The CPU 41 of the subscriber information storing device 4 receives the restriction information read request through the communication section 44 (step S715), reads the restriction information (step S716), and transmits the information to the connection control device 1b through the communication section 44 (step S717).

The CPU 11 of the connection control device 1b receives the restriction information through the communication section 15 (step S718), and determines whether a call connection corresponding to the received INVITE message matches a call connection contained in the restriction information, based on whether or not the SIP addresses of the originating and destination terminal device 2 and 2 read from the received INVITE message match the SIP addresses of the originating and destination terminal devices 2 and 2 included in the restriction information (step S719). When a determination is made that a call connection corresponding to the received INVITE message matches a call connection corresponding to the restriction information (S719: YES), the CPU 11 of the connection control device 1b creates a response message indicating "503" and transmits it to the originating terminal device 2 (step S720).

The originating terminal device 2 receives the response message indicating "503" (step S721) and finishes processing. Thereafter, even when the INVITE message is transmitted again from the originating terminal device 2 to the connection control device 1b, a response message indicating "503" is transmitted from the connection control device 1b in the same manner until the wait time elapses, and therefore the INVITE message is discarded.

When a determination is made that a call connection corresponding to the received INVITE message does not match a call connection included in the restriction information (S719: NO), the CPU 11 of the connection control device 1b transmits the INVITE message to the destination terminal device 2, or other connection control devices 1c, . . . on the route for transmitting the message to the destination terminal device 2, establishes a call connection (step S722), and finishes processing.

With processing described above, in the telephony system of Embodiment 4, even when other connection control device 1b receives an INVITE message for a connection request which has already been stored on the reservation list 132 by the connection control device 1a and ensured an opportunity for establishing a call connection, the connection request is discarded, thereby solving the problem of unequal communication opportunity. Moreover, it is possible to split the process of receiving and discarding the INVITE message with other connection control device 1b which is not in the congested state, and it is possible to prevent the INVITE message from being transmitted to the connection control device 1a in the congested state, thereby solving the congested state early.

Embodiment 5

In Embodiment 5, if priority call information indicating whether or not a connection should be given priority is described in an INVITE message that is a connection request received from the originating terminal device 2, even when the connection control devices 1a, 1b, 1c, . . . are in the congested state, they try to establish a call connection irrespectively of the order in which reserved calls are stored on the reservation list 132.

Since the hardware structure of a telephony system of Embodiment 5 is the same as in Embodiment 1 or 4, the explanation thereof will be omitted. By using the same codes as in Embodiment 1, the following will explain the process of trying to establish a call connection even in the congested state when an INVITE message contains the priority call information indicating that a priority call should be connected.

FIG. 22 is an explanatory view showing one example in which priority call information is described in an INVITE message transmitted by a terminal device 2 of Embodiment 5. The priority call information indicating that priority should be given for connection is described in the Priority header in the header section of the INVITE message shown by (a) in FIG. 22. The priority call information includes "emergency" indicating an emergency call, "immediately" indicating a call that is not an emergency call but should be connected immediately, and "normal" indicating a normal call. In the example shown in FIG. 22, "emergency" indicating an emergency call is described in the Priority header. Even when the CPU 11 of the connection control devices 1a, 1b, 1c, . . . which receive such an INVITE message is in the congested state, if it reads an emergency call from the header section of the INVITE message, it switches the order of reserved calls stored on the reservation list 132 to give priority to the priority call. Moreover, the CPU 11 tries to establish a call connection for the priority call.

Figure 23:
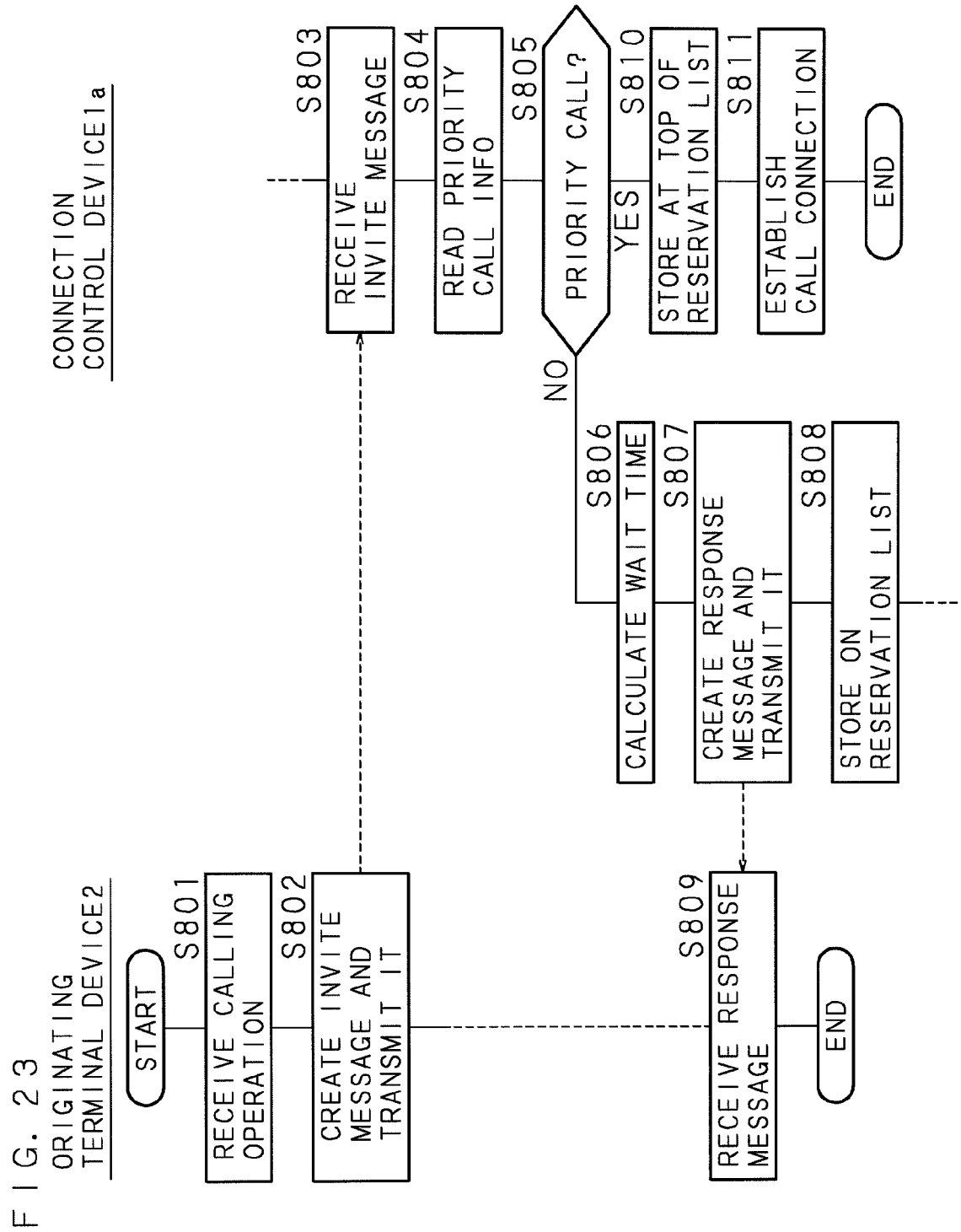
FIG. 23 is a flowchart of the procedure for establishing a call connection even in the congested state in response to the INVITE message containing priority call information by terminal devices and a connection control device in a telephony system of Embodiment 5.

FIG. 23 is a flowchart of the procedure for establishing a call connection even in the congested state in response to an INVITE message describing priority call information by the terminal devices 2 and the connection control device 1a in the telephony system of Embodiment 5.

The user of one terminal device 2 performs a calling operation to communicate with other user using other terminal device 2 by inputting the phone number or account unique to the called user, or the SIP address of the other terminal device 2 used by the called user. The CPU 21 of the other terminal device 2 receives the user's calling operation executed by the input of the SIP address, phone number or account (step S801), creates an INVITE message based on the received SIP address of the other terminal device 2, and transmits the INVITE message to the connection control device 1a through the communication section 27 (step S802).

The CPU 11 of the connection control device 1a receives the INVITE message through the communication section 15 (step S803). Since a restriction start signal was received from the congestion determining means 111 and a determination was made that the connection control device 1a is in the congested state, the CPU 11 of the connection control device 1a reads the priority call information from the Priority header of the received INVITE message (step S804), and determines whether or not the read priority call information indicates a priority call given priority for connection (step S805). When the CPU 11 of the connection control device 1a determines that the read priority call information does not indicate a priority call (S805: NO), it calculates a wait time (step S806), creates a response message indicating "503" and transmits it through the communication section 15 (step S807), and stores the INVITE message, the SIP addresses of the originating and destination terminal devices 2 and 2 and the reservation time in association with each other on the reservation list 132 by using the function of the call controlling means 114 (step S808). The originating terminal device 2 receives the response message indicating "503" through the communication section 27 (step S809) and finishes processing, and waits until the user performs a calling operation after the elapse of the wait time.

When the CPU 11 of the connection control device 1a determines that the read priority call information indicates a priority call (S805: YES), it switches the order of the calls on the reservation list 132 by using the function of the call processing means 116 so that the SIP addresses of the originating and destination terminal devices 2 and 2 and the reservation time of the received INVITE message are stored at the top of the stored reserved calls (step S810). Further, the CPU 11 of the connection control device 1a performs the process of establishing a call connection in response to the received INVITE message even when it is in the congested state (step S811), and finishes processing.

Hence, when information representing a priority call is described in an INVITE message that is a connection request, even if the connection control device 1a is in the congested state, the process of establishing a call connection is performed, and therefore it is possible to establish a call connection for a call which is given priority for connection, such as an emergency call.

Embodiment 6

In Embodiment 3, after reaching the reservation time, the stored restriction information is deleted so as not to discard the corresponding INVITE message. On the other hand, in Embodiment 6, for an INVITE message of a connection request corresponding to a call connection received during the congested state and stored on the reservation list 132, even after the call connection is established after the wait time, the restriction information is not deleted from the reservation list 132 until a predetermine time elapses, and a retransmitted INVITE message is discarded.

Since the hardware structure of a telephony system of Embodiment 6 is the same as in Embodiment 1, the explanation thereof will be omitted. By using the same codes as in Embodiment 1, the following will explain the process of deleting the stored restriction information on the reservation list after a predetermined time elapses since the establishment of a call connection.

Figure 24:
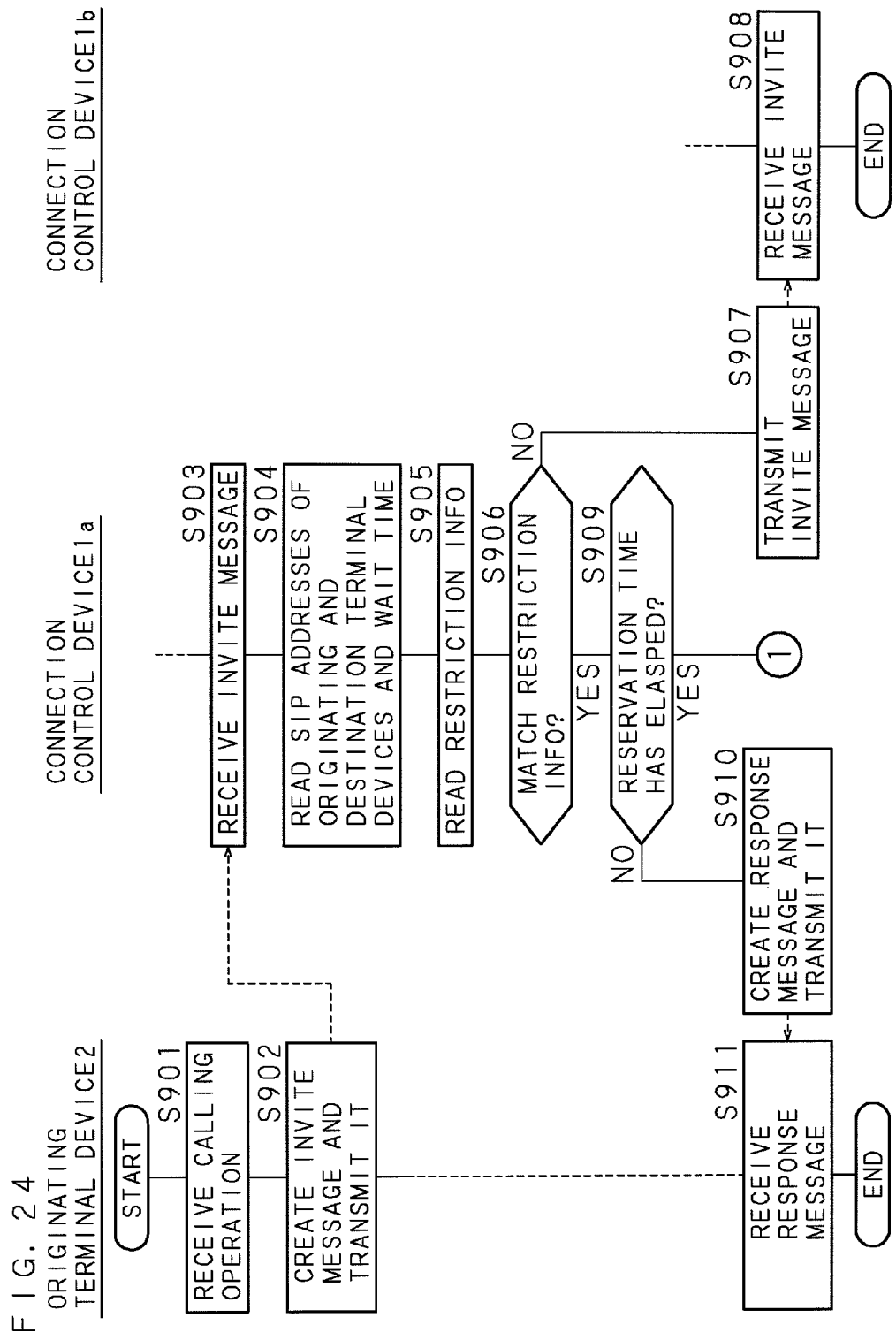
FIG. 24 is a flowchart of the procedure for deleting the stored restriction information after the elapse of a predetermined time with respect to an established call connection by terminal devices and a connection control device in a telephony system of Embodiment 6.
Figure 25:
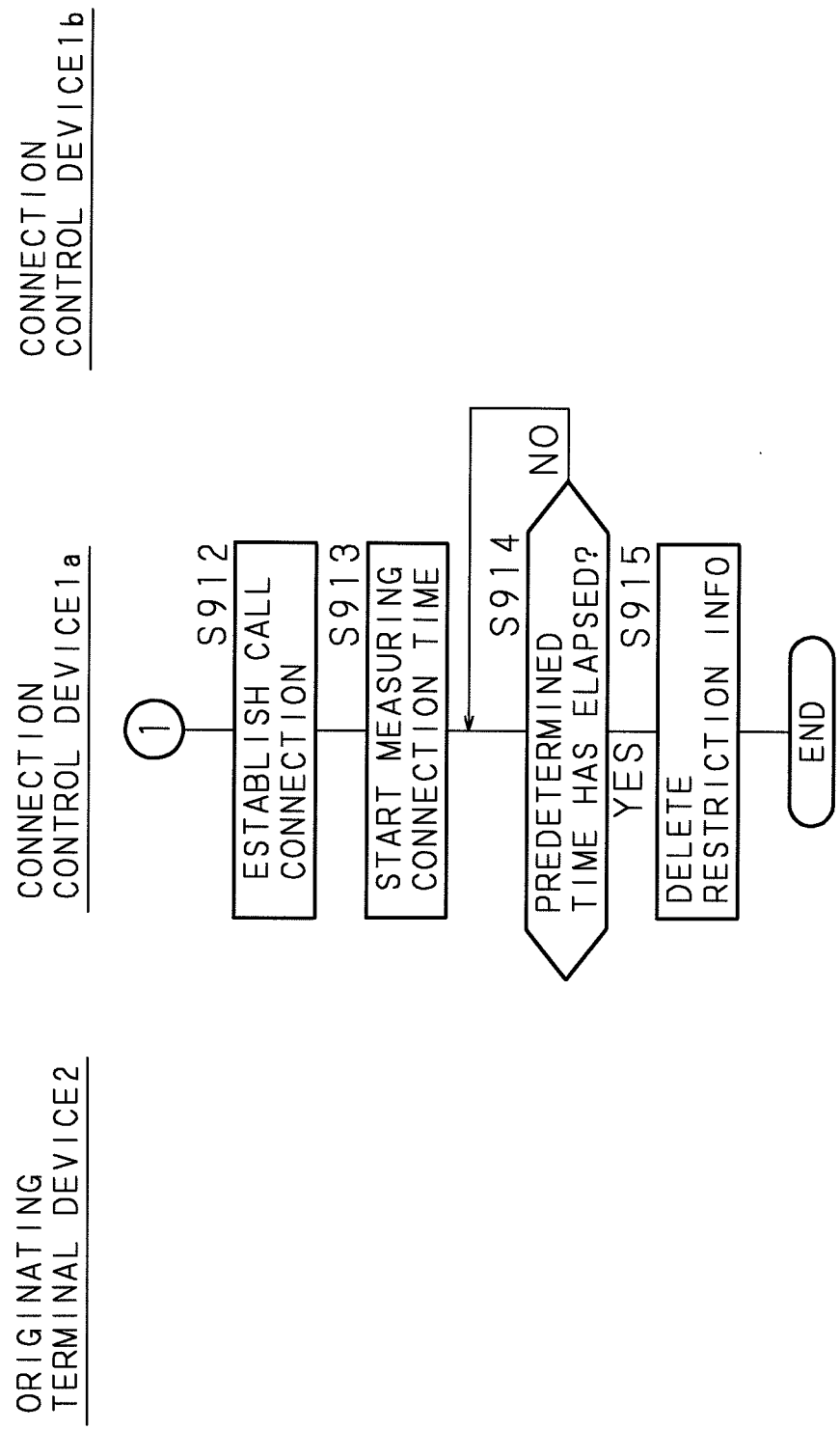
FIG. 25 is a flowchart of the procedure for deleting the stored restriction information after the elapse of a predetermined time with respect to an established call connection by terminal devices and the connection control device in the telephony system of Embodiment 6.

FIGS. 24 and 25 are a flowchart showing the procedure for deleting the stored restriction information after a predetermined time elapses with respect to the established call connection by the terminal devices 2 and the connection control device 1a in the telephony system of Embodiment 6. The flowchart shown in FIGS. 24 and 25 illustrates the process to be performed on an INVITE message received after the CPU 11 of the connection control device 1a stores the restriction information in the storage section 13 when the connection control device 1b via which the INVITE message is transmitted is in the congested state in Embodiment 6. Note that when other connection control device 1c is in the congested state, it may be possible to store the restriction information in the subscriber information storing device 4 as illustrated in Embodiment 4, and the CPU 11 of the connection control device 1a may obtain the restriction information from the subscriber information storing device 4.

The CPU 21 of one terminal device 2 receives the user's calling operation executed by the input of the SIP address, phone number, or account (step S901), creates an INVITE message based on the received SIP address of other terminal device 2, and transmits the INVITE message to the connection control device 1a through the communication section 27 (step S902). The CPU 11 of the connection control device 1a receives the INVITE message through the communication section 15 (step S903), and reads the SIP addresses of the originating and destination terminal devices 2 and 2 and the wait time from the header section of the INVITE message (step S904).

The CPU 11 of the connection control device 1a reads the restriction information stored in the storage section 13 (step S905), and determines whether or not the SIP addresses of the originating and destination terminal devices 2 and 2 read with respect to the received INVITE message match the SIP addresses of the originating and destination terminal devices 2 and 2 stored as the restriction information (step S906). When a determination is made that neither of the read SIP addresses of the originating and destination terminal devices 2 and 2 matches the SIP addresses of the originating and destination terminal devices 2 and 2 stored as the restriction information (S906: NO), the CPU 11 of the connection control device 1a transmits the INVITE message to the connection control device 1b through the communication section 15 (step S907). The CPU 11 of the connection control device 1b receives the INVITE message (step S908), transmits a response message indicating "503" to the connection control device 1a if it is in the congested state, or transmits the INVITE message to the destination terminal device 2, establishes a call connection and finishes processing if it is in the normal state.

When a determination is made that both of the read SIP addresses of the originating and destination terminal devices 2 and 2 match the SIP addresses of the originating and destination terminal devices 2 and 2 stored as the restriction information (S906: YES), the CPU 11 of the connection control device 1a determines whether or not the reservation time has elapsed (step S909). When a determination is made that the reservation time has not elapsed (S909: NO), the CPU 11 of the connection control device 1a transmits a response message indicating "503" to the originating terminal device 2 to discard the INVITE message (step S910). The CPU 21 of the originating terminal device 2 receives the response message with "503" indicating the discard of the INVITE message (step S911) and finishes processing.

When a determination is made that the reservation time has elapsed (S909: YES), the CPU 11 of the connection control device 1a establishes a call connection (step S912), and starts measuring the connection time from the establishment of the call connection (step S913). The CPU 11 of the connection control device 1a determines at fixed time intervals whether or not the connection time exceeds a predetermined time, such as, for example, five minutes (step S914). When a determination is made that the predetermined time has not elapsed (S914: NO), the CPU 11 of the connection control device 1a returns to the process in step S914, and waits until a determination is made that the predetermined time has elapsed.

When a determination is made that the predetermined time has elapsed (S914: YES), the CPU 11 of the connection control device 1a deletes the stored restriction information from the storage section 13 (step S915) and finishes processing.

Until the CPU 11 of the connection control device 1a determines in step S914 that the predetermined time has elapsed, the SIP addresses of the originating and destination terminal devices 2 and 2 of the call connection established in step S912, which are stored as the restriction information remain without being deleted. Therefore, it is considered that the SIP addresses of the originating and destination terminal devices 2 and 2 of the call connection corresponding to the received INVITE message match the SIP addresses of the originating and destination terminal devices 2 and 2 stored as the restriction information, and a response message indicating "503" is returned to discard the received INVITE message. Note that although the reservation time has elapsed, the call connection has already been established, and therefore a flag, etc. indicating that the call connection has already been established is also stored as restriction information so as to prevent the CPU 11 of the connection control device 1a from proceeding to the process of establishing a call connection of step S912. Thus, when the CPU 11 of the connection control device 1a receives an INVITE message, if the INVITE message matches a call connection corresponding to the restriction information including the stored flag which indicates that the call connection corresponding to the received INVITE message has already been established, it is possible to discard the connection request by transmitting a response message indicating "503".

With processing described above, since the same connection request as that for an already established call connection is discarded until the predetermined time elapses, even when the user who already established a call repeats calling again, a call connection is not established, thereby ensuring opportunity for other users to establish call connections. It is thus possible to solve the problem of unequal opportunity to establish calls.

Embodiment 7

In Embodiment 7, when disconnecting an established call connection due to the elapse of the connection available time, a request message describing disconnection information indicating the time until the disconnection is transmitted to the corresponding terminal devices 2 and 2.

Since the structure of a telephony system of Embodiment 7 is the same as those of Embodiments 1 through 6, the explanation thereof will be omitted. By using the same codes as in Embodiments 1 through 6, the following will explain about a request message to be transmitted to the terminal devices 2 and 2 before the CPU 11 of the connection control devices 1a, 1b, 1c, . . . executes the disconnection of call connections.

In order to notify a connection available time to the terminal devices 2 and 2 which have already established a call connection, the CPU 11 of the connection control devices 1a, 1b, 1c, . . . in the telephony system of Embodiment 7 provides the X-Poss-Timer header stating the connection available time in the header section of an INFO message used based on SIP, and transmits the message when exchanging information between the terminal devices 2, 2 and the connection control devices 1a, 1b, 1c, . . . .

FIG. 26 is an explanatory view showing one example of a request message transmitted by the connection control device 1a of Embodiment 7 before disconnecting an established call connection. In the first line shown by (a) in FIG. 26, "INFO" method representing the title of the message is described. In the X-Poss-Timer header shown by (b) in FIG. 26, the connection available time until disconnecting the call connection is stated. The example of FIG. 26 shows that the call connection will be disconnected after further 60 seconds elapse.

By using the function of the connection available time managing means 115 of the call controlling means 114, the CPU 11 of the connection control devices 1a, 1b, 1c, . . . calculates a time until the expiration of the connection available time of an established call connection, and creates an INFO message stating the time by using the function of the SIP message creating means 117. The CPU 11 of the connection control devices 1a, 1b, 1c, transmits the created INFO message to the originating and destination terminal devices 2 and 2.

The terminal device 2 which received the INFO message can read the time until the disconnection from the description in the X-Poss-Timer header and can display the time until the disconnection on a monitor or the like of the display section 26. Note that the information about the time until the disconnection, which is read from the X-Poss-Timer header, may be converted by voice synthesis so that it can be recognized as voice, and may be outputted through a voice input/output section 25.

Thus, since the users on the phone can be notified of the time until disconnection beforehand, it is possible to prevent the users from feeling stress due to sudden disconnection of the call.

In Embodiments 1 through 7, a terminal device composed of a PC creates a connection request based on SIP and transmits it to a connection control device. However, the terminal device is not limited to a PC, and it may be possible to use a terminal device such as a router having a voice to digital data conversion function and the function of creating a connection request based on SIP and transmitting it to the connection control device. In this case, a telephone terminal device is used as a terminal having a call function.

As this description may be embodied in several forms without departing from the spirit of essential characteristics thereof, the present embodiments are therefore illustrative and not restrictive, since the scope is defined by the appended claims rather than by the description preceding them, and all changes that fall within metes and bounds of the claims, or equivalence of such metes and bounds thereof are therefore intended to be embraced by the claims.

What is claimed is:

1. A telephony system comprising:
a plurality of terminal devices; and
a connection control device capable of communicating with the terminal devices, wherein
one terminal device includes a transmitting section for transmitting a connection request for requesting establishment of a call connection with other terminal device to said connection control device,
said connection control device includes:
a storage section;
a receiving section for receiving the connection request;
a controller capable of:
establishing a call connection corresponding to the received connection request;
determining whether or not the connection control device is in a congested state, based on whether a usage of at least one of hardware resources necessary for call processing to establish a call connection is equal to or more than a predetermined threshold value;
setting a connection available time until disconnecting an established call connection, when determined that the connection control device is in the congested state;
measuring a connection time of an established call connection;
disconnecting, while the connection control device is in the congested state, any established call connection for which the connection time exceeds the connection available time;
if a connection request is received from one terminal device while the connection control device is in the congested state, storing connection information containing terminal identification information identifying each of originating and destination terminal devices corresponding to the received connection request in the storage section according to an order in which connection requests are received; and calculating a wait time until establishment of a call connection between terminal devices corresponding to the stored connection information becomes available, based on the connection available time and the order in which connection requests are received; and a transmitting section for transmitting time information indicating the wait time to the originating terminal device; and the telephony system further comprising:

a plurality of said connection control devices, wherein if a connection request is received from one terminal device when determined that one connection control device is in a congested state, the transmitting section of the one connection control device transmits to other connection control device the connection information and time information indicating the wait time corresponding to the received connection request, said controller of other connection control device is further capable of:

storing the connection information and time information received from said one connection control device in the storage section;

determining, when a connection request from one terminal device is received, whether or not the terminal identification information about originating and destination terminal devices corresponding to the received connection request matches that in the stored connection information;

when determined that they match, determining whether or not the corresponding wait time has elapsed; and discarding the received connection request if the wait time has not elapsed.

2. The telephony system according to claim 1, wherein said controller of said connection control device is further capable of:

storing the time information indicating the wait time in the storage section for each stored connection information;

determining whether or not the wait time has elapsed; and establishing a call connection between the corresponding terminal devices when determined that the wait time has elapsed.

3. The telephony system according to claim 1, further comprising a storing device capable of communicating with said connection control device and storing connection information, wherein said connection control device further transmits the stored connection information and time information corresponding to the connection information to said storing device, and said storing device includes:

a receiving section for receiving connection information and time information corresponding to the connection information from said connection control device;

a storage section for storing terminal identification information identifying each of originating and destination terminal devices corresponding to the received connection information and the time information corresponding to the connection information as a connection list; and a transmitting section for transmitting the connection list to said connection control device.

4. The telephony system according to claim 3, wherein the receiving section of said connection control device receives the connection list from the storing device when it receives a connection request from one terminal device, said controller of said connection control device is further capable of:

determining whether or not the terminal identification information about originating and destination terminal devices corresponding to the received connection request matches that in the connection information included in the received connection list;

when determined that they match, reading the corresponding time information from the received connection list;

determining whether or not the wait time shown by the read time information has elapsed; and discarding the received connection request if the wait time has not elapsed.

5. The telephony system according to claim 1, wherein said controller of said connection control device is further capable of:

measuring a post connection time since the establishment of a call connection between terminal devices corresponding to the stored connection information;

determining whether or not the post connection time has exceeded a predetermined time; and deleting the stored connection information after a determination is made that the predetermined time has elapsed.

6. The telephony system according to claim 1, wherein said controller of said connection control device is further capable of:

determining, when a connection request from one terminal device is received, whether or not the connection request contains priority call information representing a priority call given priority for connection;

when determined that the connection request contains priority call information, switching an order of the stored connection information to give priority to the received connection request; and trying to establish a call connection corresponding to the received connection request irrespectively of whether or not said connection control device is in a congested state.

7. The telephony system according to claim 1, wherein the transmitting section of said connection control device transmits disconnection information indicating the connection available time to a terminal device corresponding to the connection request for a call connection to be disconnected.

8. The telephony system according to claim 1, wherein said controller of said connection control device is further capable of setting a time obtained by dividing the number of call connections capable of being simultaneously established by the number of call connections capable of being call-processed within a certain time as the connection available time when a determination is made that said connection control device is in the congested state.

9. The telephony system according to claim 1, wherein said controller of said connection control device is further capable of calculating a time until expiration of a connection available time set for an established call connection, or a time until expiration of the connection available time for a call connection corresponding to connection information received earlier, as the wait time.

10. A telephony system comprising:

a plurality of terminal devices; and a connection control device capable of communicating with the terminal devices, wherein one terminal device includes means for transmitting a connection request for requesting establishment of a call connection with other terminal device to said connection control device, and said connection control device includes:

means for receiving the connection request;

means for establishing a call connection corresponding to the received connection request;

congestion determining means for determining whether or not the connection control device is in a congested state, based on whether a usage of at least one of hardware resources necessary for call processing to establish a call connection is equal to or more than a predetermined threshold value;

setting means for setting a connection available time until disconnecting an established call connection, when said congestion determining means determines that the connection control device is in the congested state;

means for measuring a connection time of an established call connection;

means for disconnecting, while the connection control device is in the congested state, any established call connection for which the connection time exceeds the connection available time;

means for storing, if a connection request is received from one terminal device while the connection control device is in the congested state, connection information containing terminal identification information identifying each of originating and destination terminal devices corresponding to the received connection request according to an order in which connection requests are received;

calculating means for calculating a wait time until establishment of a call connection between terminal devices corresponding to the stored connection information becomes available, based on the connection available time and the order in which connection requests are received; and means for transmitting time information indicating the wait time to the originating terminal device; and the telephony system further comprising:

a plurality of said connection control devices, wherein one connection control device includes means for transmitting, if a connection request is received from one terminal device when said congestion determining means determines that the connection control device is in a congested state, the connection information and time information indicating a wait time corresponding to the received connection request to other connection control device, and other connection control device includes:

means for storing the connection information and time information received from said one connection control device;

means for determining, when a connection request from one terminal device is received, whether or not terminal identification information about the originating and destination terminal devices corresponding to the received connection request matches that in the stored connection information;

means for determining whether or not the corresponding wait time has elapsed, when determined that they match; and means for discarding the received connection request if the wait time has not elapsed.

11. The telephony system according to claim 10, wherein said connection control device further includes:

means for storing the time information indicating the wait time for each stored connection information;

determining means for determining whether or not the wait time has elapsed; and means for establishing a call connection between the corresponding terminal devices when said determining means determines that the wait time has elapsed.

12. The telephony system according to claim 10, further comprising a storing device capable of communicating with said connection control device and storing connection information, wherein said connection control device further transmits the stored connection information and time information corresponding to the connection information to said storing device, and said storing device includes:

means for receiving connection information and time information corresponding to the connection information from said connection control device;

means for storing terminal identification information identifying each of originating and destination terminal devices corresponding to the received connection information and the time information corresponding to the connection information as a connection list; and means for transmitting the connection list to said connection control device.

13. The telephony system according to claim 12, wherein said connection control device includes:

means for receiving the connection list from the storing device when it receives a connection request from one terminal device;

means for determining whether or not the terminal identification information about the originating and destination terminal devices corresponding to the received connection request matches that in the connection information included in the received connection list;

means for reading the corresponding time information from the received connection list when determined that they match;

means for determining whether or not a wait time shown by the read time information has elapsed; and means for discarding the received connection request if the wait time has not elapsed.

14. The telephony system according to claim 10, wherein said connection control device includes:

means for measuring a post connection time since establishment of a call connection between terminal devices corresponding to the stored connection information;

progress determining means for determining whether or not the post connection time has exceeded a predetermined time; and means for deleting the stored connection information after said progress determining means determines that the predetermined time has elapsed.

15. The telephony system according to claim 10, wherein said connection control device includes:

means for determining, when a connection request from one terminal device is received, whether or not the connection request contains priority call information representing a priority call given priority for connection;

means for switching an order of the stored connection information to give priority to the received connection request when determined that the connection request contains priority call information; and means for trying to establish a call connection corresponding to the received connection request irrespectively of whether or not said connection control device is in a congested state.

16. The telephony system according to claim 10, wherein said connection control device includes means for transmitting disconnection information indicating the connection available time to a terminal device corresponding to the connection request for a call connection to be disconnected.

17. The telephony system according to claim 10, wherein when said congestion determining means determines that said connection control device is in the congested state, said setting means sets a time obtained by dividing the number of call connections capable of being simultaneously established by the number of call connections capable of being call-processed within a certain time as the connection available time.

18. The telephony system according to claim 10, wherein said calculating means calculates a time until expiration of a connection available time set for an established call connection by said setting means, or a time until expiration of the connection available time for a call connection corresponding to connection information received earlier, as the wait time.

19. A connection control method by receiving from one terminal device a connection request for requesting establishment of a call connection with other terminal device, and establishing a call connection corresponding to the received connection request, comprising the steps of:
   determining, by a connection control device, whether or not the connection control device is in a congested state, based on whether a usage of at least one of hardware resources necessary for call processing to establish a call connection is equal to or more than a predetermined threshold value;
   setting a connection available time until disconnecting an established call connection, when determined that the connection control device is in the congested state;
   measuring a connection time of an established call connection;
   disconnecting, while the connection control device is in the congested state, any established call connection for which the connection time exceeds the connection available time;
   if a connection request is received from one terminal device while the connection control device is in the congested state, storing connection information containing terminal identification information identifying each of originating and destination terminal devices corresponding to the received connection request according to an order in which connection requests are received;
   calculating a wait time until establishment of a call connection between terminal devices corresponding to the stored connection information becomes available, based on the connection available time and the order in which connection requests are received;
   transmitting information indicating the wait time to the originating terminal device;
   storing the connection information and time information received from outside in said storage section;
   when a connection request is received, determining whether or not terminal identification information about originating and destination terminal devices corresponding to the received connection request matches that in the stored connection information;
   when determined that they match, determining whether or not the corresponding wait time has elapsed; and
   discarding the received connection request if the wait time has not elapsed.

20. A connection control device comprising:
   a storage section;
   a receiving section for receiving from one terminal device a connection request for requesting establishment of a call connection with other terminal device;
   a controller capable of:
   establishing a call connection corresponding to the received connection request;
   determining whether or not the connection control device is in a congested state, based on whether a usage of at least one of hardware resources necessary for call processing to establish a call connection is equal to or more than a predetermined threshold value;
   setting a connection available time until disconnecting an established call connection, when determined that the connection control device is in the congested state;
   measuring a connection time of an established call connection;
   disconnecting, while the connection control device is in the congested state, any established call connection for which the connection time exceeds the connection available time;
   if a connection request is received while the connection control device is in the congested state, storing connection information containing terminal identification information identifying each of originating and destination terminal devices corresponding to the received connection request in the storage section according to an order in which connection requests are received; and
   calculating a wait time until establishment of a call connection between terminal devices corresponding to the stored connection information becomes available, based on the connection available time and the order in which connection requests are received; and
   a transmitting section for transmitting time information indicating the wait time, wherein said receiving section and said transmitting section transmit or receive the connection information and the time information to or from outside, and
   said controller is further capable of:
   storing the connection information and time information received from outside in said storage section;
   when a connection request is received, determining whether or not terminal identification information about originating and destination terminal devices corresponding to the received connection request matches that in the stored connection information;
   when determined that they match, determining whether or not the corresponding wait time has elapsed; and
   discarding the received connection request if the wait time has not elapsed.

21. The connection control device according to claim 20, wherein said controller is further capable of:
   storing the time information indicating the wait time in the storage section for each stored connection information;
   determining whether or not the wait time has elapsed; and
   establishing a call connection between the corresponding terminal devices when determined that the wait time has elapsed.

22. The connection control device according to claim 20, wherein said controller is further capable of:
   measuring a post connection time since establishment of a call connection between terminal devices corresponding to the stored connection information;
   determining whether the post connection time has exceeded a predetermined time; and deleting the stored connection information after a determination is made that the predetermined time has elapsed.

23. The connection control device according to claim 20, wherein said controller is further capable of;
   determining, when a connection request is received, whether or not the connection request contains priority call information representing a priority call given priority for connection;
   when determined that the connection request contains priority call information, switching an order of the stored connection information to give priority to the received connection request; and
   trying to establish a call connection corresponding to the received connection request irrespectively of whether or not said connection control device is in a congested state.

24. The connection control device according to claim 20, wherein the transmitting section transmits disconnection information indicating the connection available time.

25. A connection control device comprising:
   means for receiving from one terminal device a connection request for requesting establishment of a call connection with other terminal device;
   means for establishing a call connection corresponding to the received connection request;
   congestion determining means for determining whether or not the connection control device is in a congested state, based on whether a usage of at least one of hardware resources necessary for call processing to establish a call connection is equal to or more than a predetermined threshold value;
   setting means for setting a connection available time until disconnecting an established call connection, when said congestion determining means determines that the connection control device is in the congested state;
   means for measuring a connection time of an established call connection;
   means for disconnecting, while the connection control device is in the congested state, any established call connection for which the connection time exceeds the connection available time;
   means for storing, if a connection request is received from one terminal device while the connection control device is in the congested state, connection information containing terminal identification information identifying each of originating and destination terminal devices corresponding to the received connection request according to an order in which connection requests are received;
   calculating means for calculating a wait time until establishment of a call connection between terminal devices corresponding to the stored connection information becomes available, based on the connection available time and the order in which the connection requests are received;
   means for transmitting time information indicating the wait time;
   means for transmitting and receiving the connection information and the time information to or from outside;
   means for storing the connection information and time information received from outside;
   means for determining, when a connection request is received, whether or not the terminal identification information about originating and destination terminal devices corresponding to the received connection request matches that in the stored connection information;
   means for determining whether or not the corresponding wait time has elapsed, when determined that they match; and
   means for discarding the received connection request if the wait time has not elapsed.

26. The connection control device according to claim 25, further comprising:
   means for storing the time information indicating the wait time for each stored connection information;
   determining means for determining whether or not the wait time has elapsed; and
   means for establishing a call connection between the corresponding terminal devices when said determining means determines that the wait time has elapsed.

27. The connection control device according to claim 25, further comprising:
   means for measuring a post connection time since establishment of a call connection between terminal devices corresponding to the stored connection information;
   progress determining means for determining whether or not the post connection time has exceeded a predetermined time; and
   means for deleting the stored connection information after said progress determining means determines that the predetermined time has elapsed.

28. The connection control device according to claim 25, further comprising:
   means for determining, when a connection request is received, whether or not the connection request contains priority call information representing a priority call given priority for connection;
   means for switching an order of the stored connection information to give priority to the received connection request when determined that the connection request contains priority call information; and
   means for trying to establish a call connection corresponding to the received connection request irrespectively of whether or not said connection control device is in a congested state.

29. The connection control device according to claim 25, further comprising means for transmitting disconnection information indicating the connection available time.

30. A non-transitory recording medium storing a computer program for causing a computer capable of communicating with a plurality of terminal devices to receive from one terminal device a connection request for requesting establishment of a call connection with other terminal device and establish a call connection corresponding to the received connection request, said computer program comprising:
   a step of causing the computer to determine whether or not the computer is in a congested state, based on whether a usage of at least one of hardware resources necessary for call processing to establish a call connection is equal to or more than a predetermined threshold value;
   a step of causing the computer to set a connection available time until disconnecting an established call connection, when a determination is made that the computer is in the congested state;
   a step of causing the computer to measure a connection time of an established call connection;
   a step of causing the computer to disconnect, while the connection control device is in the congested state, any established call connection for which the connection time exceeds the connection available time;
   a step of causing the computer, if a connection request is received while the computer is in the congested state, to store connection information containing terminal identification information identifying each of originating and destination terminal devices corresponding to the received connection request according to an order in which connection requests are received;

a step of causing the computer to calculate a wait time until establishment of a call connection between terminal devices corresponding to the stored connection information becomes available, based on the connection available time and the order in which connection requests are received;

a step of causing the computer to transmit time information indicating the wait time;

a step of causing the computer to transmit and receive the connection information and the time information to or from outside;

a step of causing the computer to store the connection information and time information received from outside;

a step of causing, when a connection request is received, the computer to determine whether or not the terminal identification information about originating and destination terminal devices corresponding to the received connection request matches that in the stored connection information;

a step of causing, when determined that they match, the computer to determine whether or not the corresponding wait time has elapsed; and a step of causing the computer to discard the received connection request if the wait time has not elapsed.

31. The non-transitory recording medium according to claim 30, wherein said computer program further comprises:

a step of causing the computer to store the time information indicating the wait time for each stored connection information;

a step of causing the computer to determine whether or not the wait time has elapsed; and a step of causing the computer to establish a call connection between the corresponding terminal devices when determined that the wait time has elapsed.

32. The non-transitory recording medium according to claim 30, wherein said computer program further comprises:

a step of causing the computer to measure a post connection time since establishment of a call connection between terminal devices corresponding to the stored connection information;

a step of causing the computer to determine whether or not the post connection time has exceeded a predetermined time; and a step of causing the computer to delete the stored connection information after a determination is made that the predetermined time has elapsed.

33. The non-transitory recording medium according to claim 30, wherein said computer program further comprises:

a step of causing, when a connection request is received, the computer to determine whether or not the connection request contains priority call information representing a priority call given priority for connection;

a step of causing, when determined that the connection request contains priority call information, the computer to switch an order of the stored connection information to give priority to the received connection request; and a step of causing the computer to try to establish a call connection corresponding to the received connection request irrespectively of whether or not it is in a congested state.

34. The non-transitory recording medium according to claim 30, wherein said computer program further comprises a step of causing the computer to transmit disconnection information indicating the connection available time.

* * * * *